(12) United States Patent
Jang et al.

(10) Patent No.: US 12,726,707 B2
(45) Date of Patent: Sep. 1, 2026

(54) CAMERA DEVICE HAVING A MOVABLY SUPPORTED IMAGE SENSOR

(71) Applicant: LG INNOTEK CO., LTD., Seoul (KR)

(72) Inventors: Hyeon Jun Jang, Seoul (KR); Hyun Soo Kim, Seoul (KR); Jung Cheol Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 10 days.

(21) Appl. No.: 18/709,651

(22) PCT Filed: Oct. 24, 2022

(86) PCT No.: PCT/KR2022/016281
§ 371 (c)(1),
(2) Date: May 13, 2024

(87) PCT Pub. No.: WO2023/085643
PCT Pub. Date: May 19, 2023

(65) Prior Publication Data

US 2025/0016448 A1 Jan. 9, 2025

(30) Foreign Application Priority Data

Nov. 12, 2021 (KR) ........................ 10-2021-0155695
Nov. 12, 2021 (KR) ........................ 10-2021-0155698
Nov. 12, 2021 (KR) ........................ 10-2021-0155699

(51) Int. Cl.
*H04N 23/68* (2023.01)
*G03B 13/36* (2021.01)
(Continued)

(52) U.S. Cl.
CPC ........... *H04N 23/687* (2023.01); *G03B 30/00* (2021.01); *H04N 23/51* (2023.01); *H04N 23/54* (2023.01); *G03B 13/36* (2013.01)

(58) Field of Classification Search
CPC ...... H04N 23/687; H04N 23/51; H04N 23/54; H04N 23/55; H04N 23/57; H04N 23/60;
(Continued)

(56) References Cited

U.S. PATENT DOCUMENTS 11,385,523 B2 * 7/2022 Tanaka .................. H04N 23/57
12,055,841 B2 * 8/2024 Noh ......................... G02B 7/02
(Continued)

FOREIGN PATENT DOCUMENTS

CN 110892704 A 3/2020
CN 114726970 A * 7/2022 ............ H04N 23/55
(Continued)

OTHER PUBLICATIONS

International Search Report dated Jan. 20, 2023 in International Application No. PCT/KR2022/016281.
(Continued)

*Primary Examiner* — Padma Haliyur
(74) *Attorney, Agent, or Firm* — SALIWANCHIK, LLOYD & EISENSCHENK

(57) ABSTRACT

The present embodiment relates to a camera device, comprising: a base; a cover member disposed on the base; a housing disposed between the base and the cover member, an image sensor disposed within the base; a connecting substrate that movably supports the image sensor, and a spacing member disposed between the connecting substrate and a side plate of the cover member in a direction perpendicular to an optical axis direction.

19 Claims, 43 Drawing Sheets

(51) Int. Cl.
*G03B 30/00* (2021.01)
*H04N 23/51* (2023.01)
*H04N 23/54* (2023.01)

(58) Field of Classification Search
CPC .......... G03B 30/00; G03B 13/36; G03B 5/00; G03B 3/10; G03B 2205/0038; G03B 2205/0069; H02K 41/0356
See application file for complete search history.

(56) References Cited

U.S. PATENT DOCUMENTS

| | | | | |
|---|---|---|---|---|
| 2015/0160428 | A1* | 6/2015 | Kudoh | H04N 23/55<br>359/511 |
| 2018/0027155 | A1* | 1/2018 | Nakamura | G02B 7/04<br>348/374 |
| 2019/0384034 | A1* | 12/2019 | Min | H02K 41/0356 |
| 2020/0083793 | A1 | 3/2020 | Han | |
| 2020/0150377 | A1* | 5/2020 | Han | G03B 17/12 |
| 2020/0192187 | A1 | 6/2020 | Lee | |
| 2020/0241314 | A1* | 7/2020 | Takimoto | H04N 23/54 |
| 2022/0019132 | A1* | 1/2022 | Noh | G03B 17/12 |
| 2022/0137486 | A1* | 5/2022 | Oh | H04N 23/55<br>359/554 |
| 2022/0377240 | A1* | 11/2022 | Wu | G02B 27/646 |
| 2023/0353858 | A1 | 11/2023 | Oh | |
| 2024/0056658 | A1* | 2/2024 | Liu | H04N 23/67 |

FOREIGN PATENT DOCUMENTS

| | | | | |
|---|---|---|---|---|
| KR | 10-2015-0142196 | A | 12/2015 | |
| KR | 10-2016-0112126 | A | 9/2016 | |
| KR | 10-2018-0110796 | A | 10/2018 | |
| KR | 10-2018-0113730 | A | 10/2018 | |
| KR | 10-2019-0001299 | A | 1/2019 | |
| KR | 10-2019-0038146 | A | 4/2019 | |
| KR | 10-2019-0089600 | A | 7/2019 | |
| KR | 10-2020-0114252 | A | 10/2020 | |
| KR | 10-2021-0060035 | A | 5/2021 | |
| KR | 10-2021-0083141 | A | 7/2021 | |
| WO | WO-2020139028 | A1 * | 7/2020 | H04N 23/55 |
| WO | WO-2020197149 | A1 * | 10/2020 | G02B 7/023 |

OTHER PUBLICATIONS

Supplementary European Search Report dated Aug. 21, 2025 in European Application No. 22893066.5.

Office Action dated Apr. 6, 2026 in Korean Application No. 10-2021-0155695.

Office Action dated Apr. 9, 2026 in Korean Application No. 10-2021-0155698.

Office Action dated Apr. 9, 2026 in Korean Application No. 10-2021-0155699.

* cited by examiner

FIG. 48(a)
FIG. 48(b)
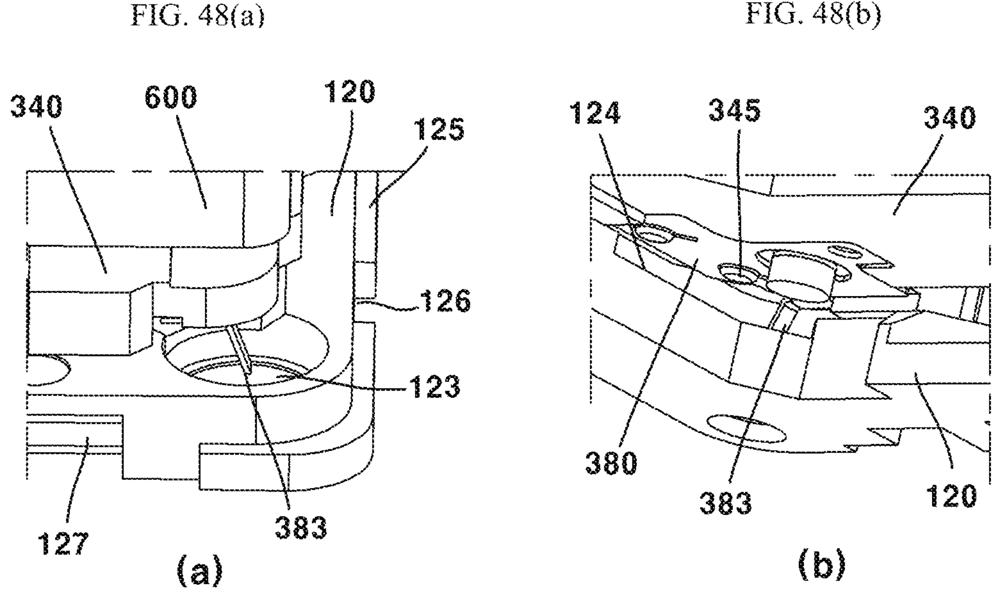
FIG. 49
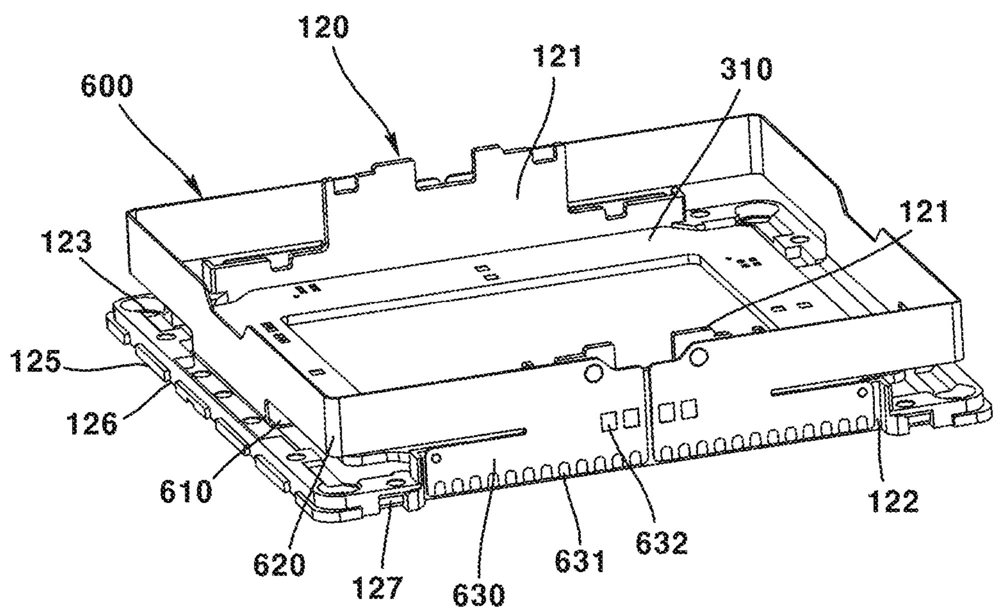

FIG. 53
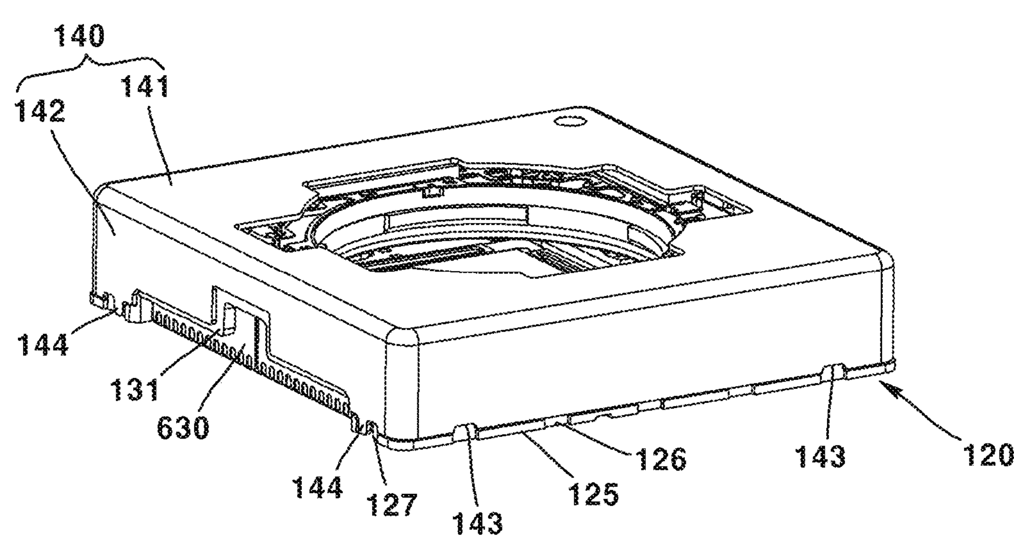
FIG. 54(a)
FIG. 54(b)
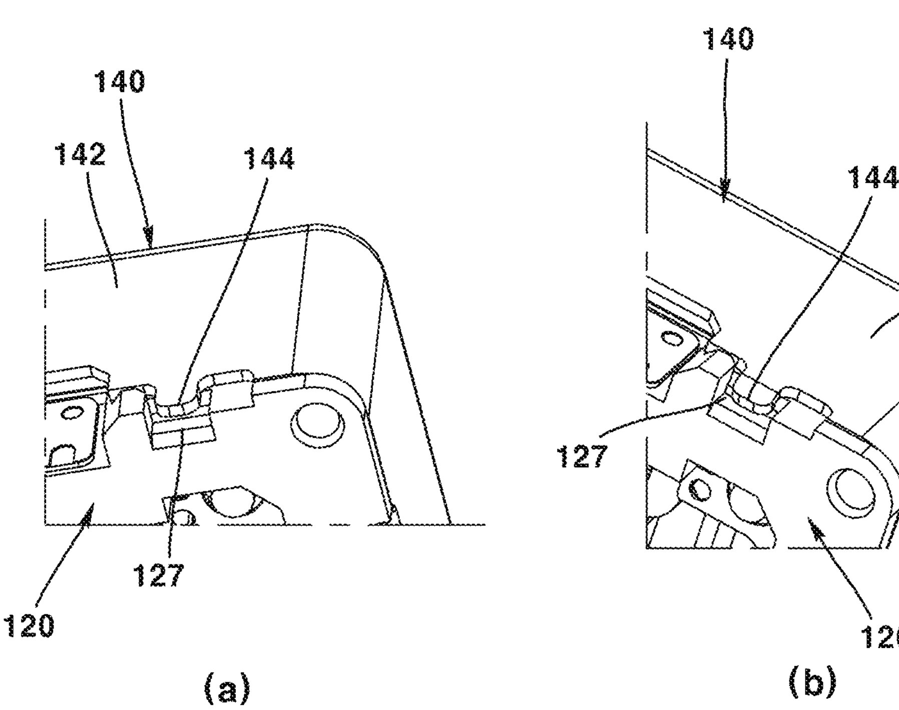

CAMERA DEVICE HAVING A MOVABLY SUPPORTED IMAGE SENSOR

CROSS-REFERENCE TO RELATED APPLICATIONS

This application is the U.S. national stage application of International Patent Application No. PCT/KR2022/016281, filed Oct. 24, 2022, which claims the benefit under 35 U.S.C. § 119 of Korean Application Nos. 10-2021-0155695, filed Nov. 12, 2021; 10-2021-0155698, filed Nov. 12, 2021; and 10-2021-0155699, filed Nov. 12, 2021; the disclosures of each of which are incorporated herein by reference in their entirety.

TECHNICAL FIELD

The teachings in accordance with exemplary and non-limiting embodiments of this invention relate generally to a camera device.

BACKGROUND OF THE INVENTION

A camera device is a device that takes pictures or videos of a subject, and is mounted on optical devices such as smartphones, drones, and vehicles.

In order to improve image quality, camera devices require image stabilization (Optical Image Stabilization, OIS) to compensate for image shake caused by user movement. In camera devices, image stabilization is performed by moving the lens perpendicular to the optical axis.

However, due to the recent trend of high pixelation, the diameter of the lens has increased, which increases the weight of the lens, and it is difficult to secure electromagnetic force to move the lens within a limited space.

DISCLOSURE

Technical Field

An exemplary embodiment of the present invention aims to provide a camera device that performs an image stabilization function by moving an image sensor.

The present embodiment seeks to provide a camera device that drives an image sensor in three axes, namely x-axis shift, y-axis shift, and z-axis rolling.

Technical Solution

In one general aspect of the present invention, there may be provided a camera device, comprising:

a base;

a cover member disposed on the base;

a housing disposed between the base and the cover member;

an image sensor disposed within the base;

a connecting substrate that movably supports the image sensor; and a spacing member disposed between the connecting substrate and a side plate of the cover member in a direction perpendicular to an optical axis direction.

Preferably, but not necessarily, the spacing member may be a wing part extending from the housing.

Preferably, but not necessarily, the spacing member may be a separate member from the housing.

In another general aspect of the present invention, there may be provided a camera device, comprising:

a base;

a cover member disposed on the base;

a housing disposed between the base and the cover member;

an image sensor disposed within the base; and a connecting substrate that movably supports the image sensor, wherein the housing may include a wing part interposed between the connecting substrate and the side plate of the cover member.

Preferably, but not necessarily, the housing may be coupled with the base and the cover member.

Preferably, but not necessarily, the image sensor may move in a direction perpendicular to the optical axis direction, and in the direction perpendicular to the optical axis direction, the base, the connecting substrate, the wing part of the housing and the side plate of the cover member may be sequentially arranged.

Preferably, but not necessarily, the distance between the connecting substrate and the side plate of the cover member in the direction perpendicular to the optical axis direction may be greater than or equal to the thickness of the wing part of the housing.

Preferably, but not necessarily, the camera device may further comprise: a first substrate; and a second substrate spaced apart from the first substrate and electrically connected to the image sensor, wherein the connecting substrate may include: a connecting part connecting to the second substrate; a terminal part engaging the first substrate; and an extension part connecting the connecting part to the terminal part.

Preferably, but not necessarily, the terminal part of the connecting substrate may be disposed in the optical axis direction, and a plurality of terminals may be disposed at the bottom of the terminal part of the connecting substrate.

Preferably, but not necessarily, the plurality of terminals of the connecting substrate may be disposed inwardly of the wing part of the housing.

Preferably, but not necessarily, the base may comprise a protrusion upwardly protruding, the terminal part of the connecting substrate may be fixed to the protrusion by an adhesive member, and at least a portion of the terminal part of the connecting substrate may be disposed between the protrusion of the base and the wing part of the housing.

Preferably, but not necessarily, the extension part of the connecting substrate may be spaced apart from the side plate of the cover member.

Preferably, but not necessarily, the housing may comprise first and second lateral surfaces disposed opposite each other, and third and fourth lateral surfaces disposed opposite each other, the wing part is formed on each of the first and second lateral surfaces of the housing, the housing may include a protrusion protruding outwardly from each of the third and fourth lateral surfaces of the housing and contacted with the cover member.

Preferably, but not necessarily, the housing may be fixed to the base or the cover member.

Preferably, but not necessarily, the camera device may comprise: a bobbin disposed in the housing; and a lens coupled with the bobbin, the bobbin comprising a protrusion protruding from an inner peripheral surface of the bobbin, the lens may comprise a groove formed on an outer peripheral surface of the lens, the groove of the lens may comprise a first groove extending in an optical axis direction from a lower surface of the lens, and a second groove extending from the first groove in a direction perpendicular to the optical axis direction and spaced apart from a lower end of the first groove, wherein at least a portion of the protrusions of the bobbin may be disposed on the second groove of the lens.

Preferably, but not necessarily, the camera device may comprise a first magnet and a first coil for moving the image sensor in a direction perpendicular to the optical axis direction with respect to the base; and a second magnet and a second coil for moving the lens in the optical axis direction.

Preferably, but not necessarily, the camera device may comprise a sensing magnet disposed on the bobbin; a third substrate disposed in the housing; and a sensor disposed on the third substrate and detecting the sensing magnet, in a direction perpendicular to the optical axis direction, wherein a portion of the third substrate may be disposed between the connecting substrate and the wing part of the housing.

In still another general aspect of the present invention, there may be provided an optical apparatus comprising: a body; a camera device disposed on the body; and a display disposed on the body and outputting a video or image taken by the camera device.

In still another general aspect of the present invention, there may be provided a camera device, comprising: a housing; a bobbin disposed within the housing; a substrate spaced apart from the housing; an image sensor electrically connected to the substrate; a drive (driving) magnet disposed in the housing; an AF coil disposed in the bobbin; an OIS coil disposed in the substrate; and a sensing magnet disposed on the bobbin, the driving magnet comprising first and second magnets disposed opposite each other, and third and fourth magnets disposed opposite each other, wherein a distance between the first magnet and the third magnet is greater than a distance between the first magnet and the fourth magnet, and the sensing magnet may be disposed between the first magnet and the third magnet.

Preferably, but not necessarily, the sensing magnet may overlap the first magnet and the third magnet in a direction perpendicular to the optical axis direction.

Preferably, but not necessarily, the sensing magnet may overlap the first magnet and the third magnet in a direction perpendicular to the inner surface of the first magnet.

Preferably, but not necessarily, the camera device may comprise a calibration magnet disposed on the bobbin, the calibration magnet being disposed between the second magnet and the fourth magnet.

Preferably, but not necessarily, each of the first to fourth magnets may include an AF magnet disposed in a position corresponding to the AF coil and an OIS magnet disposed in a position corresponding to the OIS coil.

Preferably, but not necessarily, each of the first to fourth magnets may include a first width, which is a length between the inner and outer surfaces, and a second width, which is a length between the two sides, wherein the first width of the first magnet and the first width of the third magnet may be the same, and the second width of the first magnet may be longer than the second width of the third magnet.

Preferably, but not necessarily, the OIS coil may include a first coil corresponding to the first magnet, a second coil corresponding to the second magnet, a third coil corresponding to the third magnet, and a fourth coil corresponding to the fourth magnet, wherein the second width of the first magnet may be larger than the width in the corresponding direction of the first coil, and the second width of the third magnet may be equal to or smaller than the width in the corresponding direction of the third coil.

Preferably, but not necessarily, all of the first to fourth coils may be formed of the same size.

Preferably, but not necessarily, the OIS coil may include a first coil corresponding to the first magnet, a second coil corresponding to the second magnet, a third coil corresponding to the third magnet, and a fourth coil corresponding to the fourth magnet, wherein the second width of the first magnet is greater than a first length in a corresponding direction of the first coil, the second width of the third magnet is greater than a second length in a corresponding direction of the third coil, and the first length is greater than the second length.

Preferably, but not necessarily, the housing may include first and second corners disposed opposite each other, and third and fourth corners disposed opposite each other, wherein the first magnet is disposed between the first and fourth corners of the housing, and the second magnet may be disposed between the first and third corners of the housing.

Preferably, but not necessarily, the first magnet may be disposed closer to the first corner than to the fourth corner, and the second magnet may be disposed closer to the third corner than to the first corner.

Preferably, but not necessarily, the distance between the first magnet and the fourth corner may be shorter than the distance between the third magnet and the first corner, and the distance between the first magnet and the first corner may be equal to the distance between the third magnet and the third corner.

Preferably, but not necessarily, the camera device may comprise: a sensing substrate disposed in the housing; and a driver IC disposed on the sensing substrate, and the driver IC may include a Hall element for sensing the sensing magnet.

Preferably, but not necessarily, the camera device may comprise an upper elastic member connecting the housing and the bobbin, the upper elastic member comprising first and second upper elastic units spaced apart from each other, each of the first and second upper elastic units electrically connecting the AF coil and the sensing substrate.

Preferably, but not necessarily, the driver IC may be disposed on an inner surface of the sensing substrate, the first upper elastic unit may be coupled to the inner surface of the sensing substrate, and the second upper elastic unit may be coupled to an outer surface opposite the inner surface of the sensing substrate.

In still another general aspect of the present invention, there may be provided an optical apparatus comprising: a body; a camera device disposed on the body; and a display disposed on the body and outputting a video or image taken by the camera device.

In still further general aspect of the present invention, there may be provided a camera device, comprising: a housing; a holder spaced apart from the housing; a first substrate disposed on the holder; an image sensor electrically connected to the first substrate; a magnet disposed on the housing; and a coil disposed on a top surface of the holder and positioned in a corresponding position to the magnet, the holder comprising a protrusion protruding from the top surface of the holder and disposed within the coil, and the protrusion of the holder may protrude above the coil.

Preferably, but not necessarily, the protrusion of the holder and the coil may overlap the magnet in an optical axis direction, and the distance in the optical axis direction between the coil and the magnet may be longer than the distance in the optical axis direction between the protrusion of the holder and the magnet.

Preferably, but not necessarily, when the holder is moved upwards, the protrusion of the holder may be in contact with the magnet.

Preferably, but not necessarily, the coil may be disposed wound around the protrusion of the holder.

Preferably, but not necessarily, the coil may include first to fourth coils, the protrusion of the holder may include first to fourth protrusions corresponding to the first to fourth coils, and each of the first to fourth protrusions of the holder may include four protrusions spaced apart from each other.

Preferably, but not necessarily, the camera device may comprise a second substrate spaced apart from the first substrate; and a connecting substrate connecting the first substrate and the second substrate, the connecting substrate including a connecting part connecting the first substrate, a terminal part connecting the second substrate, and an extension part connecting the connecting part and the terminal part, the holder including a first stopper part projecting outwardly from the extension part of the connecting substrate.

Preferably, but not necessarily, the camera device may comprise a base disposed on the second substrate; and a cover member disposed on the base and receiving the housing therein, wherein, in a direction perpendicular to the optical axis direction, a distance between the extension part of the connecting substrate and the cover member may be longer than a distance between the first stopper part of the holder and the cover member.

Preferably, but not necessarily, the holder may include a second stopper part in contact with the base when the holder is moved downwardly.

Preferably, but not necessarily, the camera device may comprise: a bobbin disposed in the housing; an upper elastic member connecting the housing and the bobbin; a coupling member disposed in the holder; and a wire connecting the upper elastic member to the coupling member, the holder may include a coupling protrusion protruding from a bottom surface of the holder and engaging a hole in the coupling member, and the second stopper part may protrude lower than the coupling protrusion.

Preferably, but not necessarily, the holder may include two protrusions projecting downwardly from the first substrate, and the connecting part of the connecting substrate may be disposed between the two protrusions.

Preferably, but not necessarily, the protrusion of the holder may project lower than the second stopper part.

Preferably, but not necessarily, the first stopper part may be disposed on a side of the holder closer to a corner of the holder than to a center of the side of the holder.

Preferably, but not necessarily, the camera device may comprise a sensor disposed on the first substrate and sensing the magnet, the holder may include a hole, and the sensor may be disposed in the hole of the holder.

Preferably, but not necessarily, the holder, together with the image sensor, can be moved in a direction perpendicular to the optical axis or rotated about the optical axis by interaction of the magnet with the coil.

In still further general aspect of the present invention, there may be provided a camera device comprising: a housing; a holder spaced apart from the housing; a first substrate disposed on the holder; an image sensor electrically connected to the first substrate; a magnet disposed on the housing; a coil disposed on the holder; a second substrate spaced apart from the first substrate; and a connecting substrate connecting the first substrate to the second substrate, the connecting substrate may include a connecting part connecting the first substrate, a terminal part connecting the second substrate, and an extension part connecting the connecting part to the terminal part, wherein the holder may include a first stopper part projecting outwardly from the extension part of the connecting substrate.

In still further general aspect of the present invention, there may be provided a camera device comprising: a housing; a holder spaced apart from the housing; a first substrate disposed on the holder; an image sensor electrically coupled to the first substrate; a magnet disposed on the housing; a coil disposed on the holder; a second substrate spaced apart from the first substrate; and a base disposed on the second substrate, wherein the holder may include a second stopper part that contacts the base when the holder is moved downwardly.

In still further general aspect of the present invention, there may be provided an optical apparatus comprising: a body; a camera device disposed on the body; and a display disposed on the body and outputting a video or image taken by the camera device.

Advantageous Effects of the Invention

With these exemplary embodiments, an image sensor can be moved to perform an image stabilization function.

Furthermore, through these embodiments, a wing structure extending from the housing can be inserted into the gap space between the connecting substrate and the cover member to complete a sealing structure to inhibit foreign objects from entering between the connecting substrate and the cover member.

Furthermore, through these embodiments, a wing structure descending from the housing is inserted between the cover member and the connecting substrate as a side stopper to protect the product from external impact.

Furthermore, the structure with different lengths and spacing between the driving magnets enables the maximum electromagnetic force for driving the autofocus to be secured in the space within the limited size of the cover member.

Furthermore, as the sensing magnet is arranged on the outer side of the AF coil, the substrate on which the AF driver IC is mounted can be arranged on the outer side as much as possible, and the design freedom of the bobbin can be increased.

Furthermore, the design freedom of the upper elastic member can be improved by a structure in which the bisected upper elastic member is connected to one point on the inner surface and one point on the outer surface of the substrate on which the AF driver IC is mounted.

Furthermore, by protruding the stopper part of the holder outwardly from the extension part of a flexible part of the FPCB to form a stopping structure against lateral and/or rolling, the stroke section of the flexible part of the FPCB can be stably secured.

Furthermore, by using a plurality of protrusions for the coil assembly guide as an upper stopper in the z-axis direction that contacts the bottom surface of the magnet during upward movement of the holder, the phenomenon of the coil striking the magnet and breaking it can be inhibited.

Furthermore, by extending the above-mentioned stopping structure against lateral movement and rolling of the holder downwardly in the z-axis direction to comprise a lower stopper that contacts the upper surface of the base during downward movement of the holder, unintended collisions between the configurations can be avoided even when the holder is tilted by external forces.

The independent effects of each of the independent designs of the present exemplary embodiments can be achieved even if only one design is applied.

BRIEF DESCRIPTION OF DRAWINGS

Figure 13:
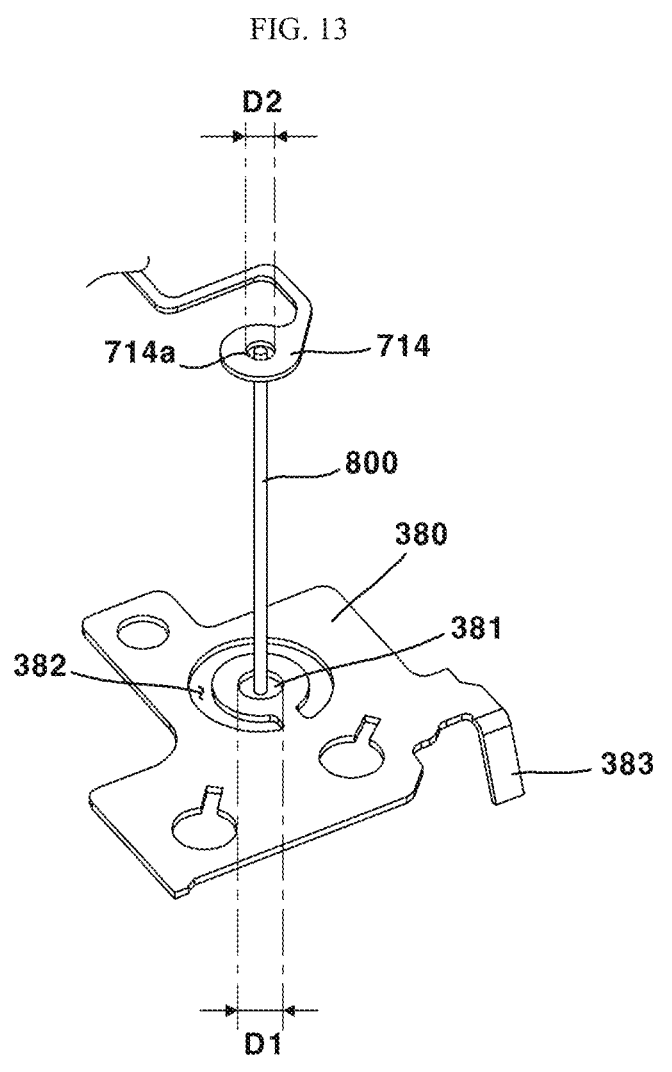

FIG. 13 is an enlarged view of a portion of FIG. 12.

Figure 30:
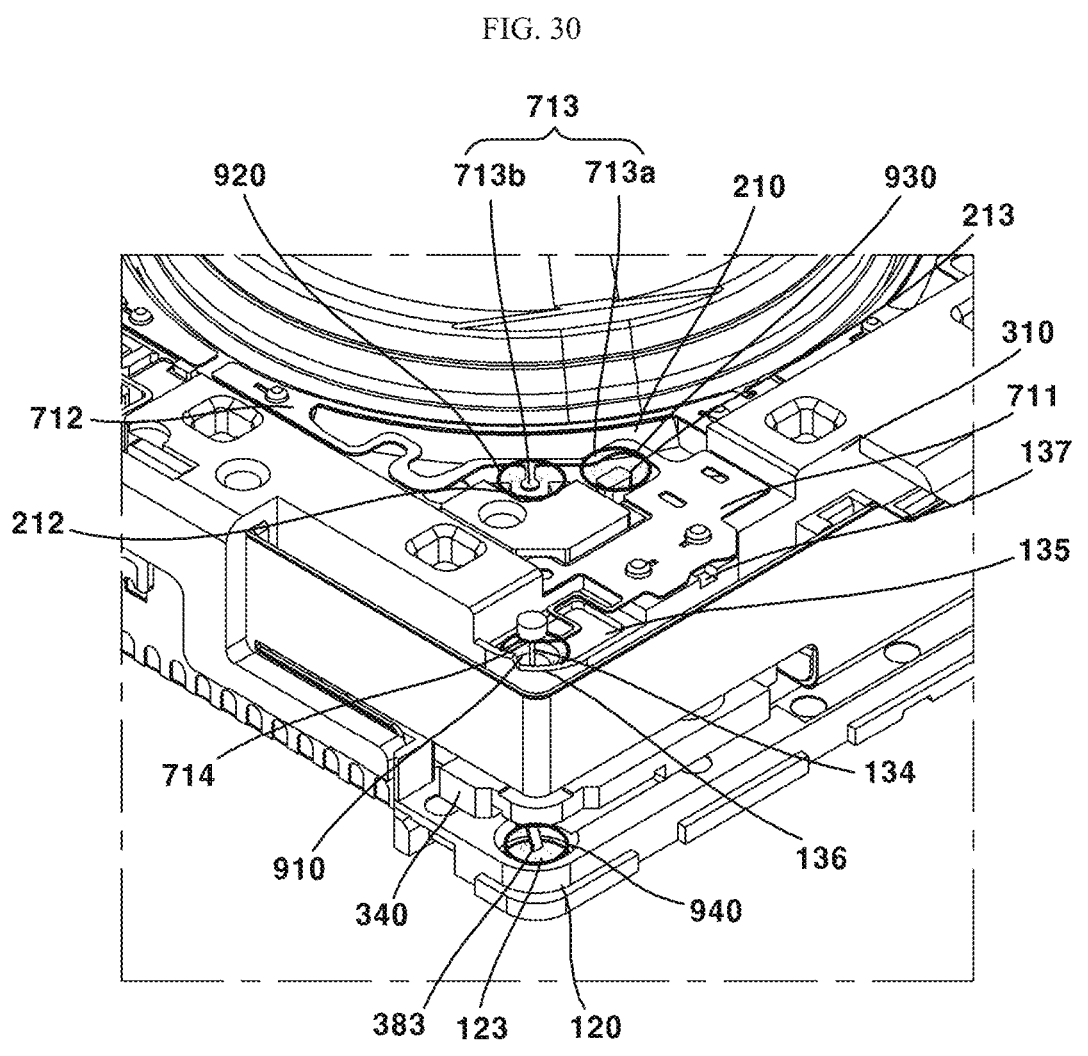

FIG. 30 is an enlarged view illustrating an application structure of the first to fourth dampers of the camera device according to an exemplary embodiment.

In FIG. 48(*a*) is a top view and FIG. 48(*b*) is a bottom view illustrating an arrangement structure of the coupling member and the base of the camera device according to an exemplary embodiment.

FIG. 49 is a perspective view illustrating the coupled state of the base and the connecting substrate according to an exemplary embodiment.

FIG. 53 is a perspective view of a camera device according to an exemplary embodiment.

In FIG. 54(*a*) is a bottom perspective view showing a ground terminal and a groove in the base of a camera device according to an embodiment, and FIG. 54(*b*) is a bottom perspective view of a modification in which the ground terminal is bent.

FIG. 56 is a drawing for illustrating the operation of an image sensor of a camera device according to an exemplary embodiment being shifted along an x-axis. FIG. 57 is a diagram for illustrating a drive (driving) in which an image sensor of a camera device according to an exemplary embodiment is shifted along a y-axis. FIG. 58 is a diagram for illustrating a drive in which an image sensor of a camera device according to an exemplary embodiment is rolled about a z-axis.

BEST MODE

Figure 1:
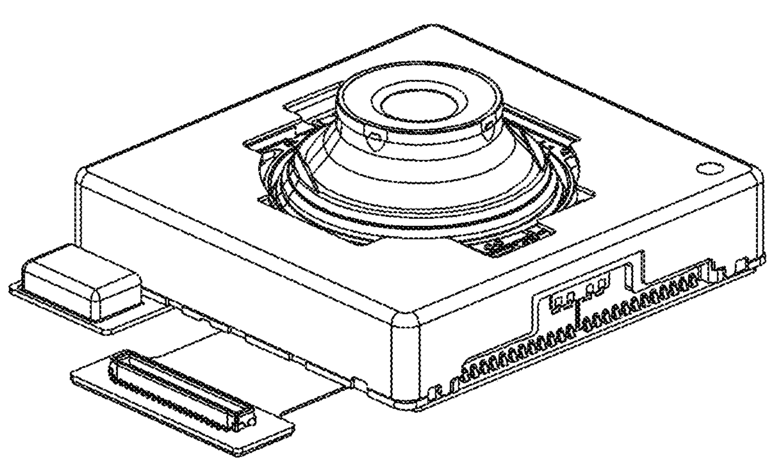
FIG. 1 is a perspective view of a camera device according to an exemplary embodiment of the present invention.

Hereinafter, exemplary embodiments of the present invention will be described in detail with reference to the accompanying drawings.

However, it should be noted that the technical ideas of the present invention should not be construed as limited to some of the explained exemplary embodiments but may be embodied in mutually different various shapes, and one or more elements may be selectively coupled or substituted among exemplary embodiments as long as within the scope of technical concept of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

Hereinafter, one of the "AF drive (driving) part" and the "OIS drive (driving) part" may be referred to as the "first drive part" and the other as the "second drive part". Hereinafter, one of the "AF coil (430)" and the "OIS coil (440)" may be referred to as the "first coil" and the other as the "second coil". Hereinafter, any one of the "AF magnet (410)", "OIS magnet (420)", "sensing magnet (450)", and "calibration magnet (460)" may be referred to as the "first magnet", any one of the "second magnet", any one of the "third magnet", and any one of the "fourth magnet". Hereinafter, any one of the "first substrate (110)," "second substrate (310)," "sensor substrate (320)," "third substrate (470)," and "connecting substrate (600)" may be referred to as a "first substrate," any one of the "second substrate," any one of the "third substrate," any one of the "fourth substrate," and any one of the "fifth substrate.

Hereinafter, a camera device according to an exemplary embodiment of the present invention will be described with reference to the accompanying drawings.

Figure 2:
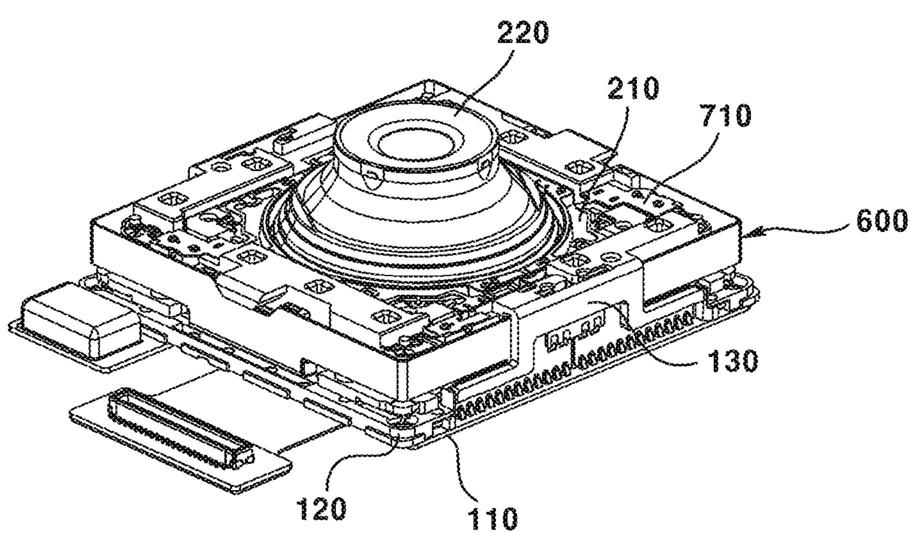
FIG. 2 is a perspective view of a camera device according to an exemplary embodiment of the present invention, with the cover member omitted.
Figure 3:
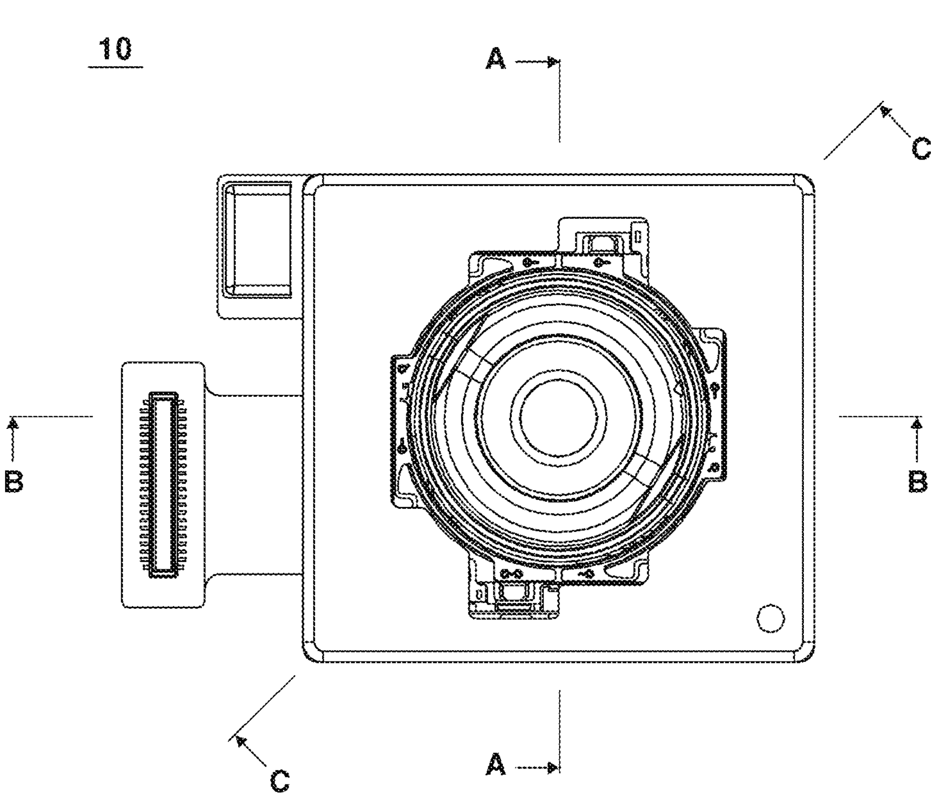
FIG. 3 is a top view of a camera device according to an exemplary embodiment of the present invention.
Figure 4:
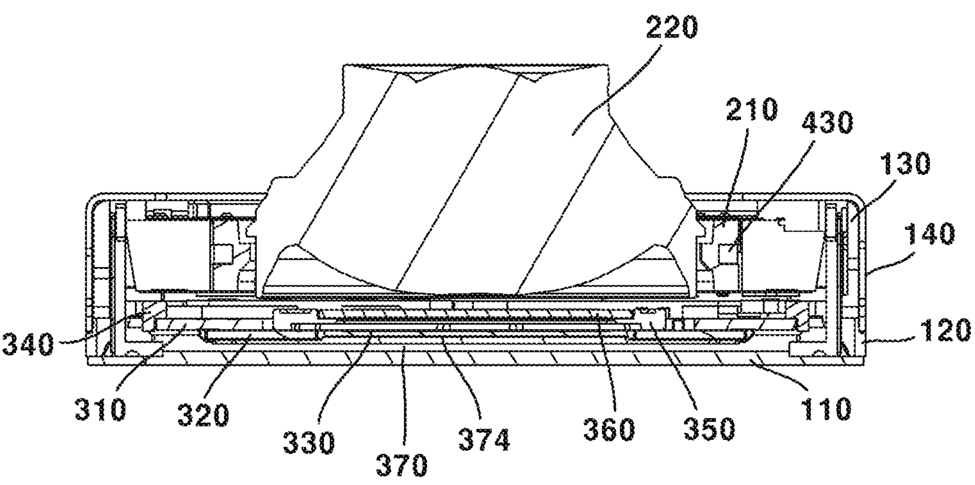
FIG. 4 is a cross-sectional view from A-A of FIG. 3.
Figure 5:
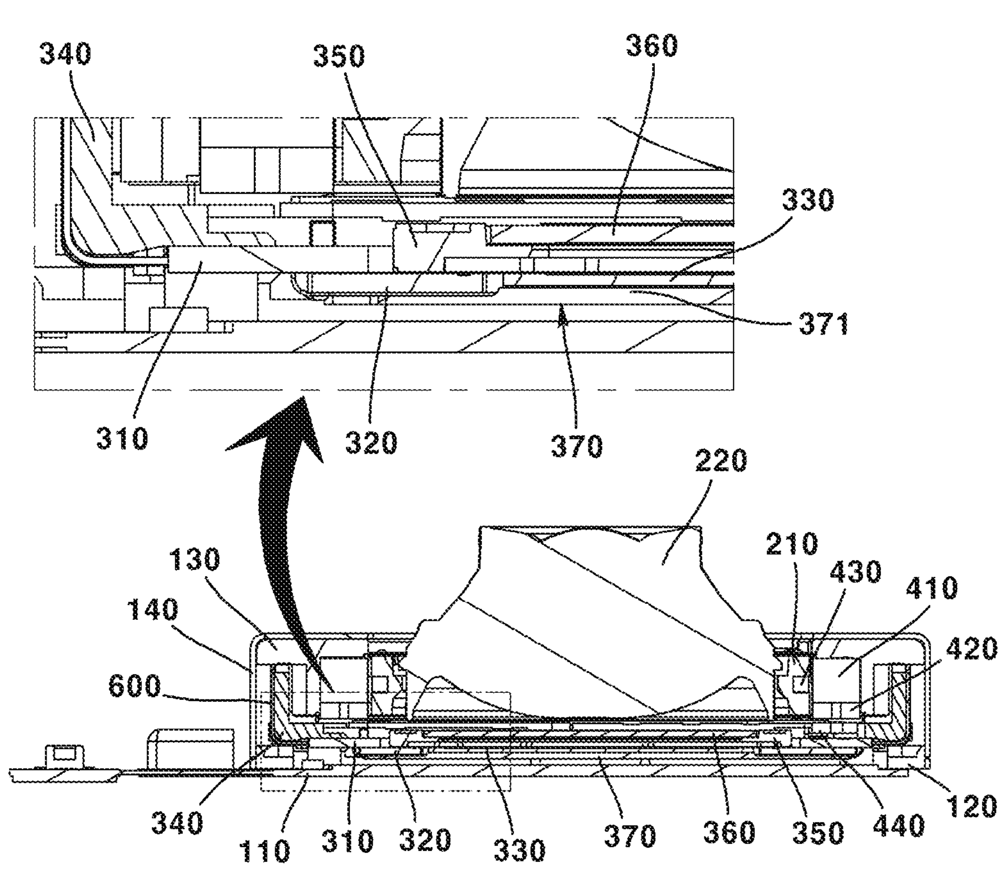
FIG. 5 is a cross-sectional view from B-B of FIG. 3.
Figure 6:
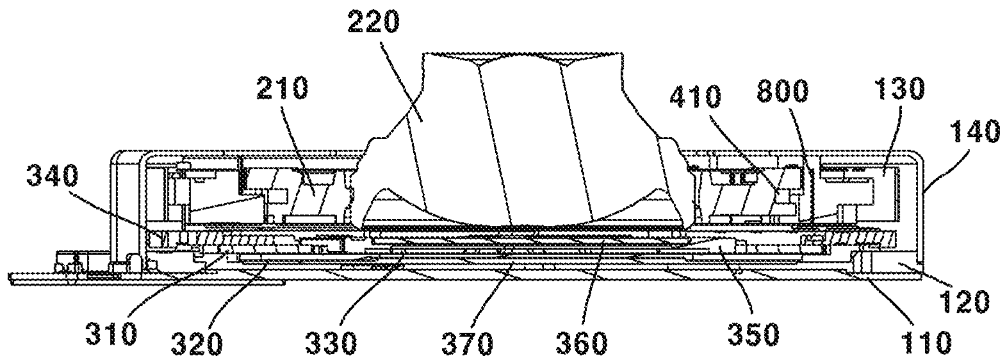
FIG. 6 is a cross-sectional view from C-C of FIG. 3.
Figure 7:
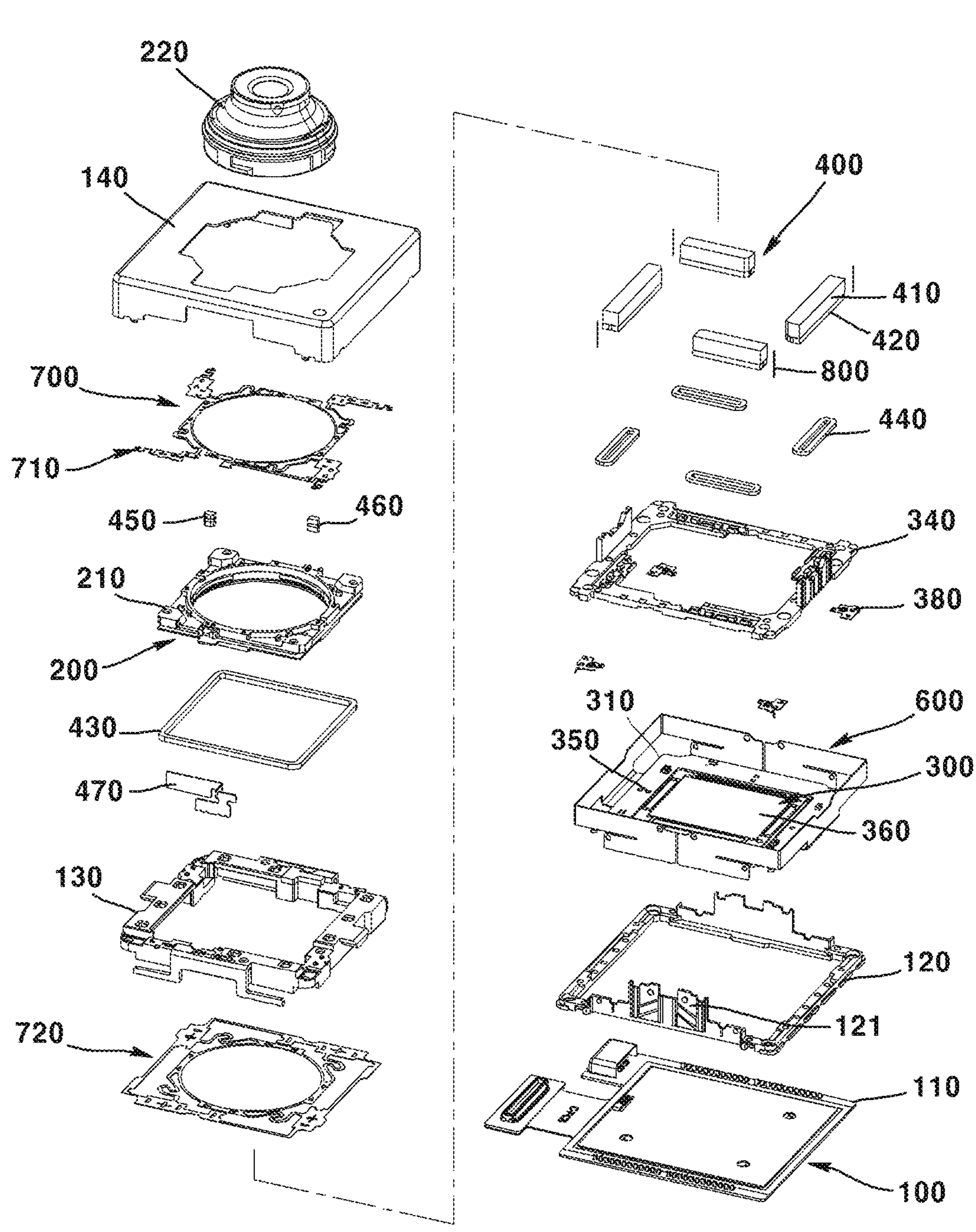
FIG. 7 is an exploded perspective view of a camera device according to an exemplary embodiment of the present invention.
Figure 8:
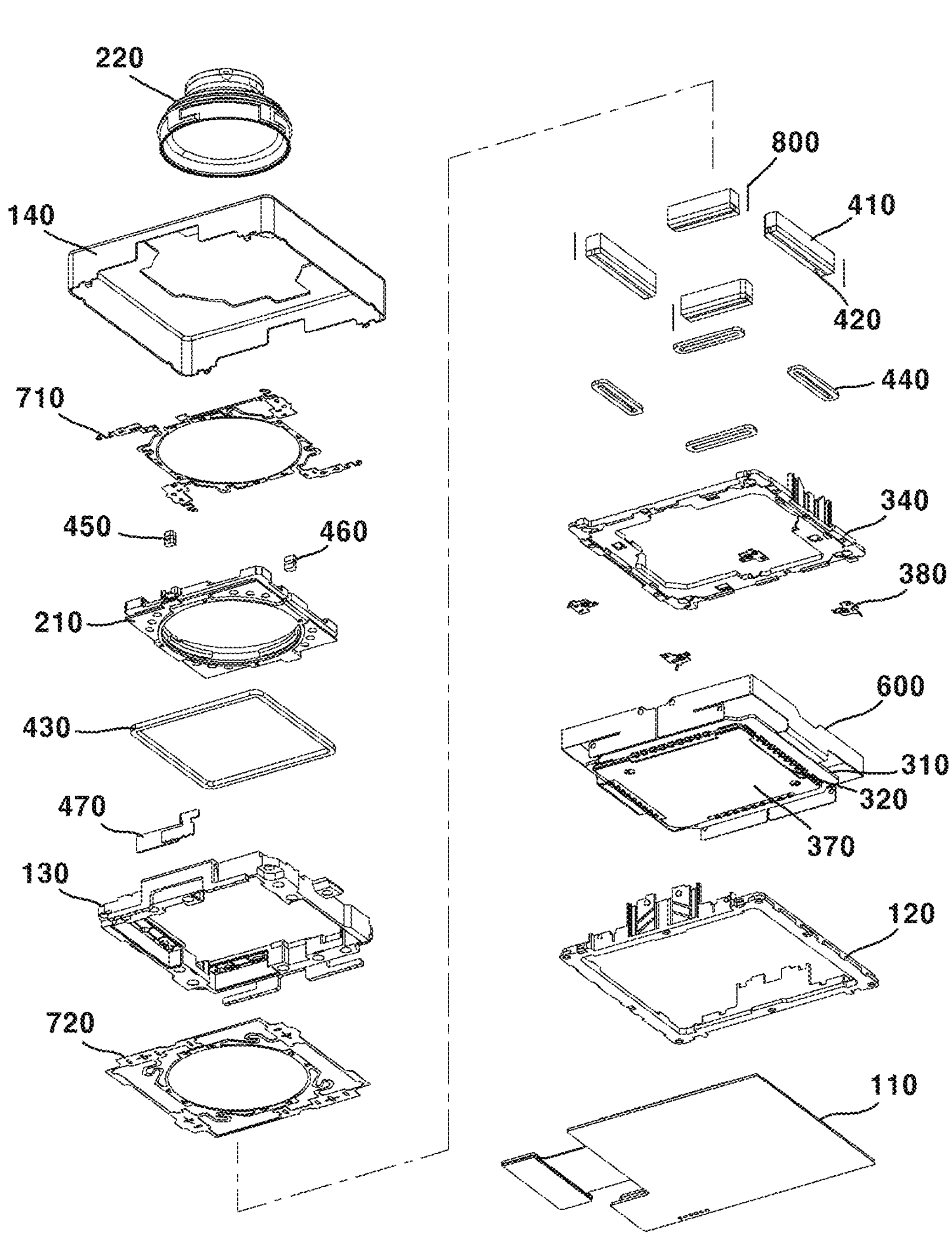
FIG. 8 is an exploded view of a camera device according to an exemplary embodiment, viewed from a different orientation than FIG. 7.
Figure 9:
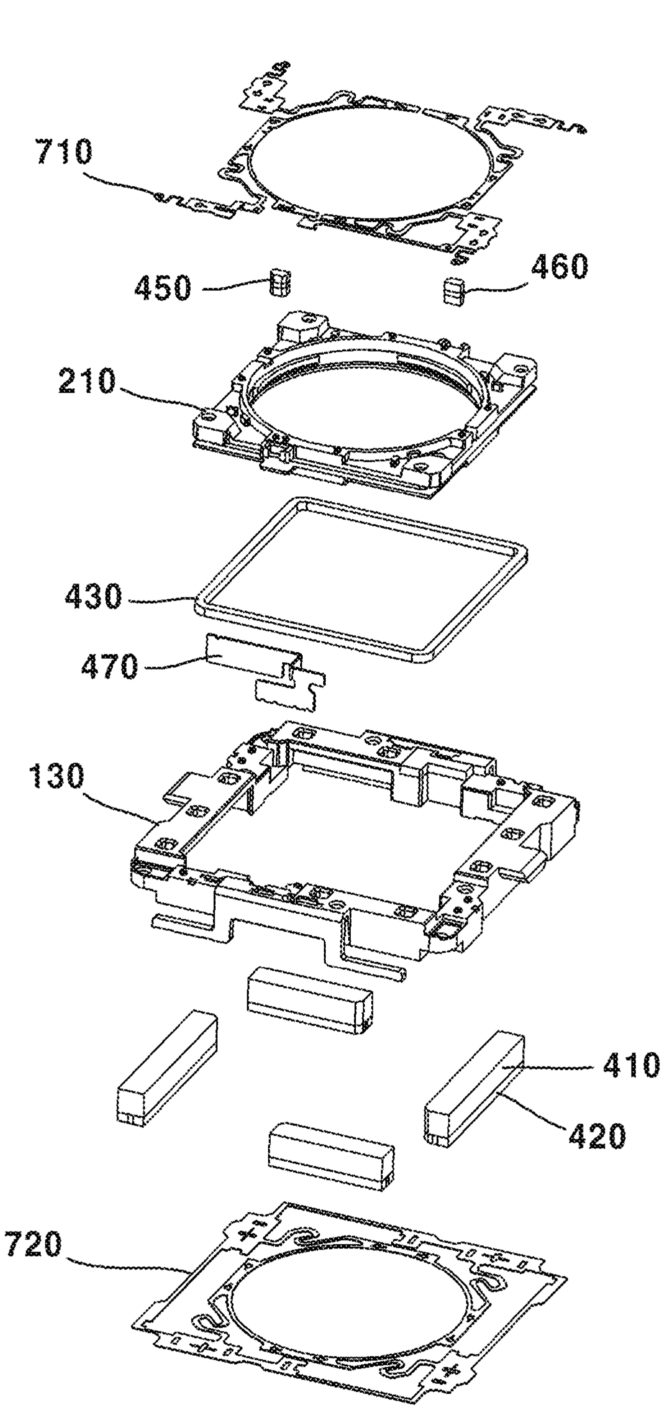
FIG. 9 is an exploded view of a first movement part of a camera device according to an exemplary embodiment and associated configuration.
Figure 10:
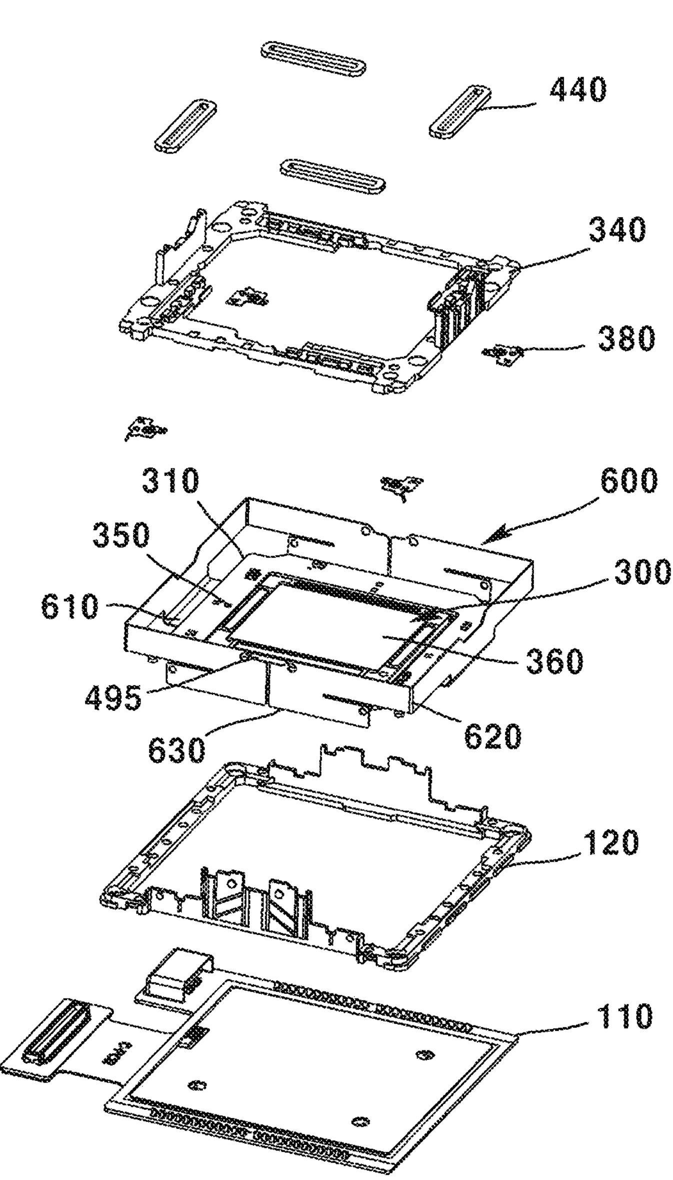
FIG. 10 is an exploded view of a second movement part and associated configuration of a camera device according to an exemplary embodiment.
Figure 11:
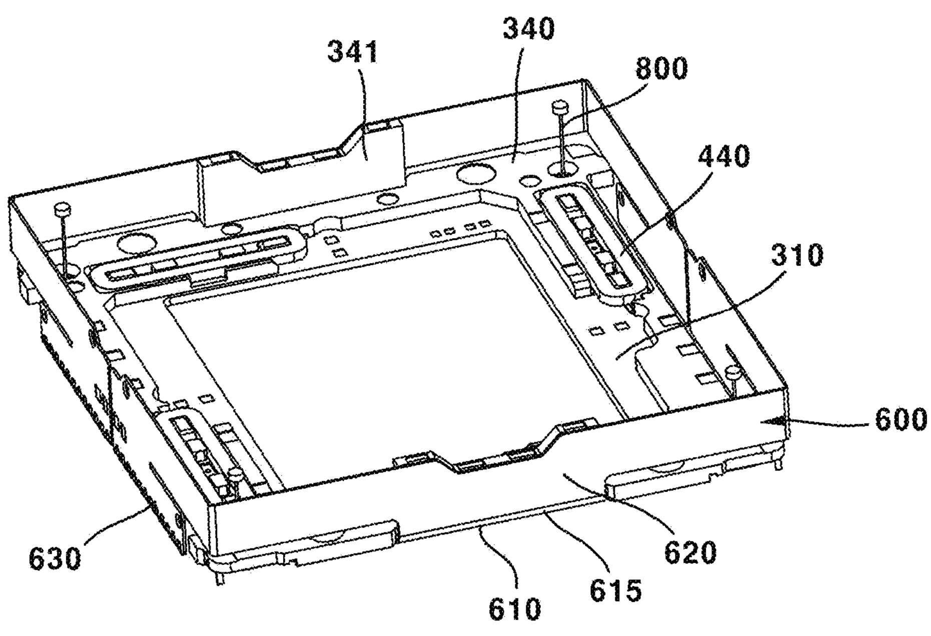
FIG. 11 is a perspective view of a partial configuration of a connecting substrate, wires, and second movement part of a camera device according to an exemplary embodiment.
Figure 12:
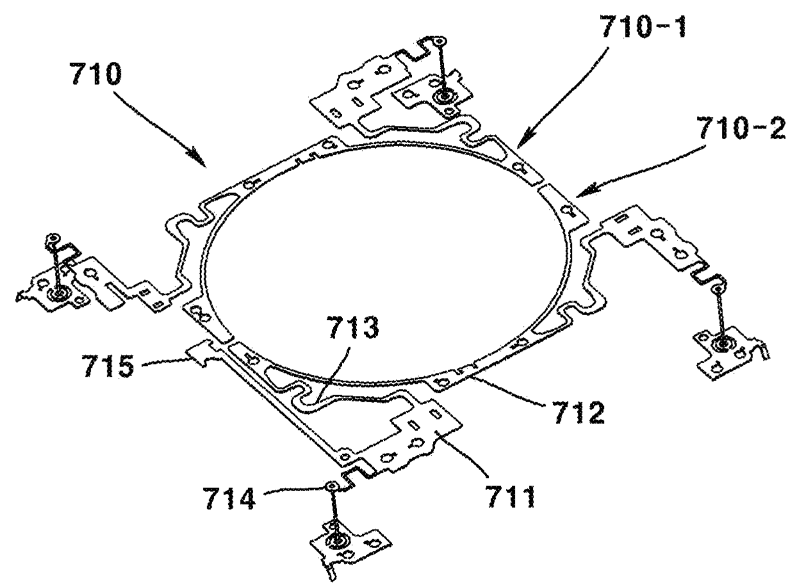
FIG. 12 is a perspective view illustrating a coupling structure of a wire of a camera device according to an exemplary embodiment.
Figure 14:
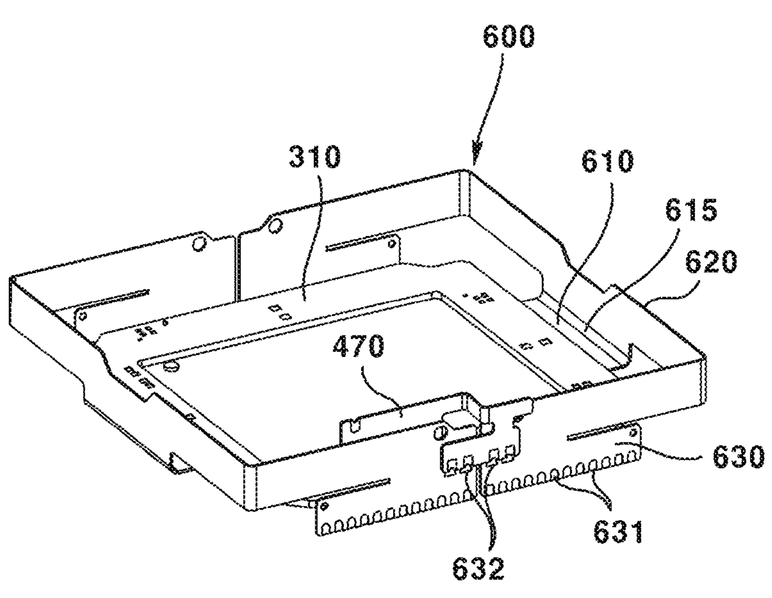
FIG. 14 is a perspective view illustrating a coupling structure of a connecting substrate and a third substrate of a camera device according to an exemplary embodiment of the present invention.
Figure 15:
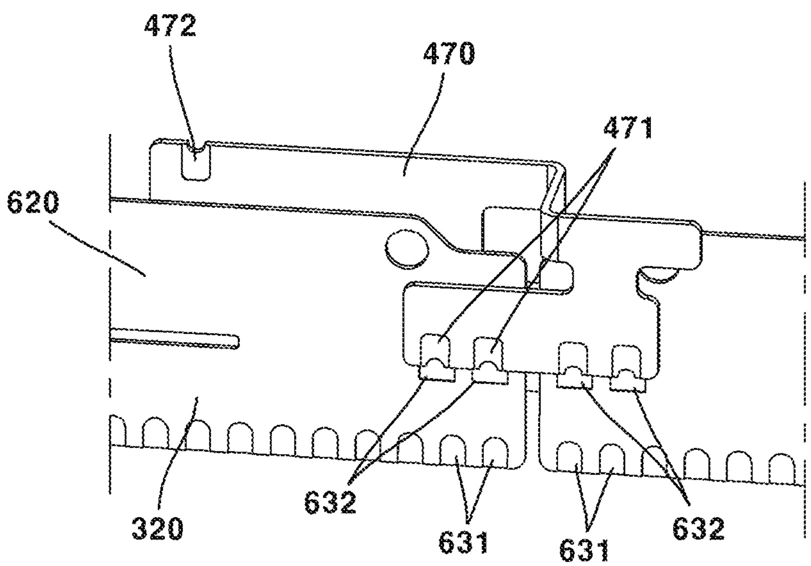
FIG. 15 is an enlarged view of a portion of FIG. 14.
Figures 16, 17:
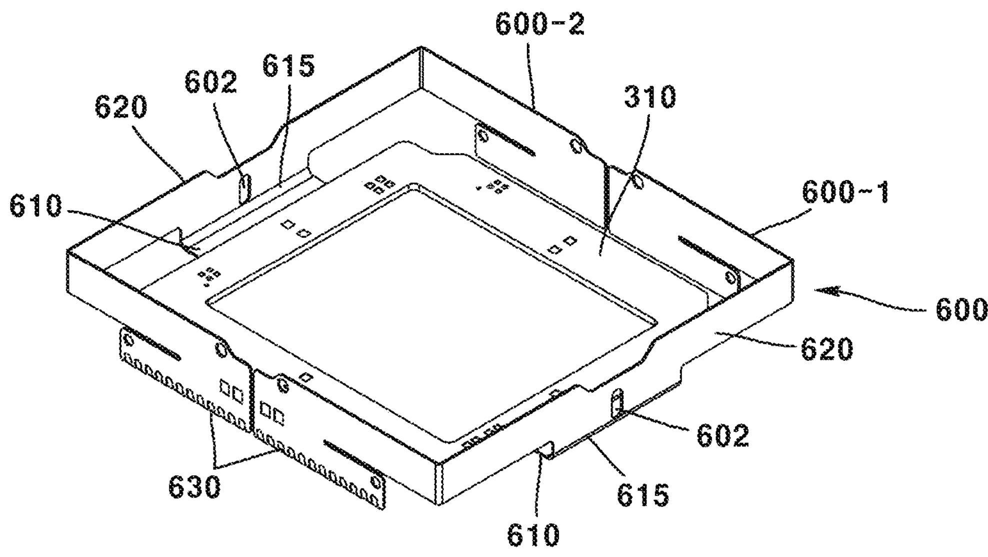
FIG. 16 is a perspective view of a second substrate and a connecting substrate of a camera device according to an exemplary embodiment.
FIG. 17 is a perspective view of a second substrate and a connecting substrate of a camera device, according to another modification.
Figure 18:
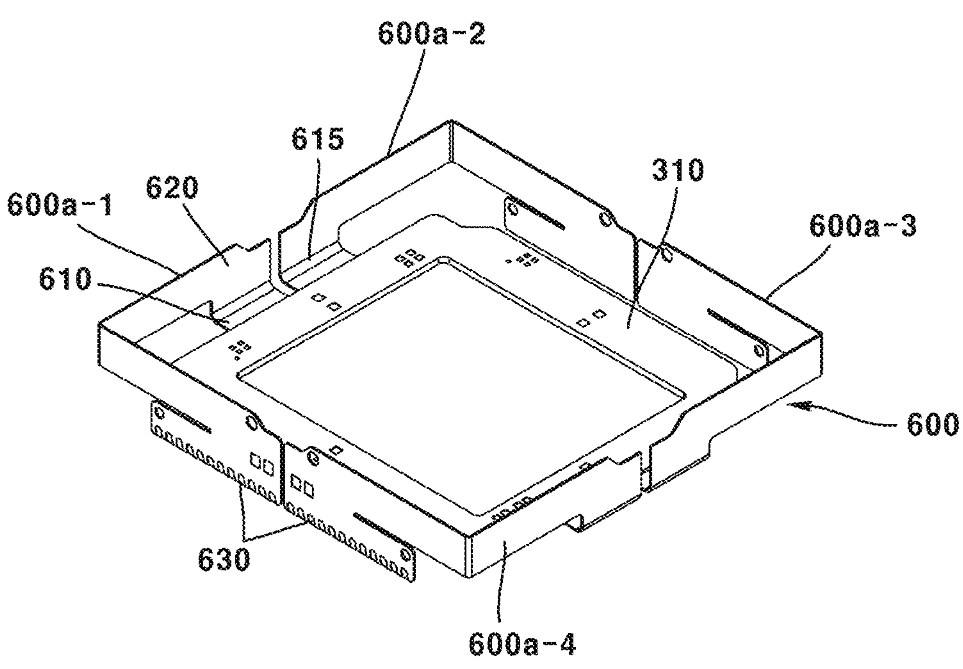
FIG. 18 is a perspective view of a second substrate and a connecting substrate of a camera device, according to another exemplary embodiment of the present invention.
Figure 19:
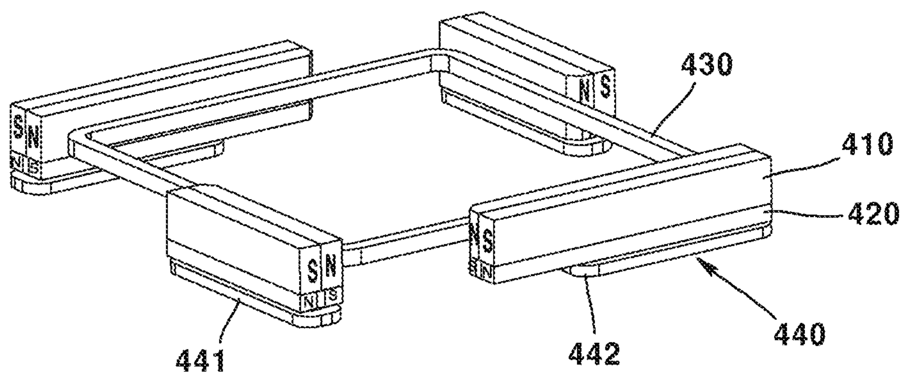
FIG. 19 is a perspective view illustrating a magnet and coil of a camera device according to an exemplary embodiment.
Figure 20:
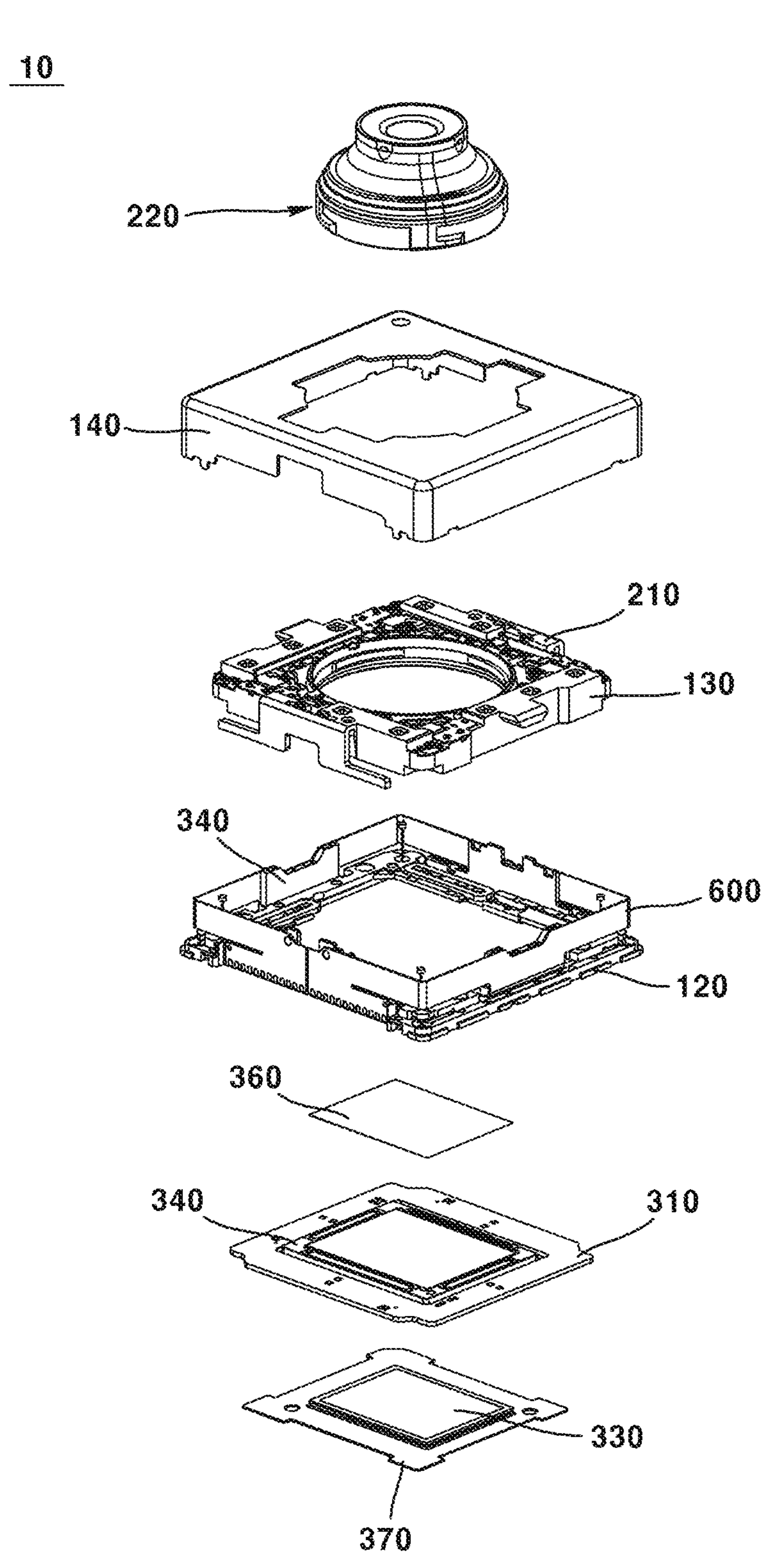
FIG. 20 is an exploded view of a camera device according to an exemplary embodiment.
Figure 21:
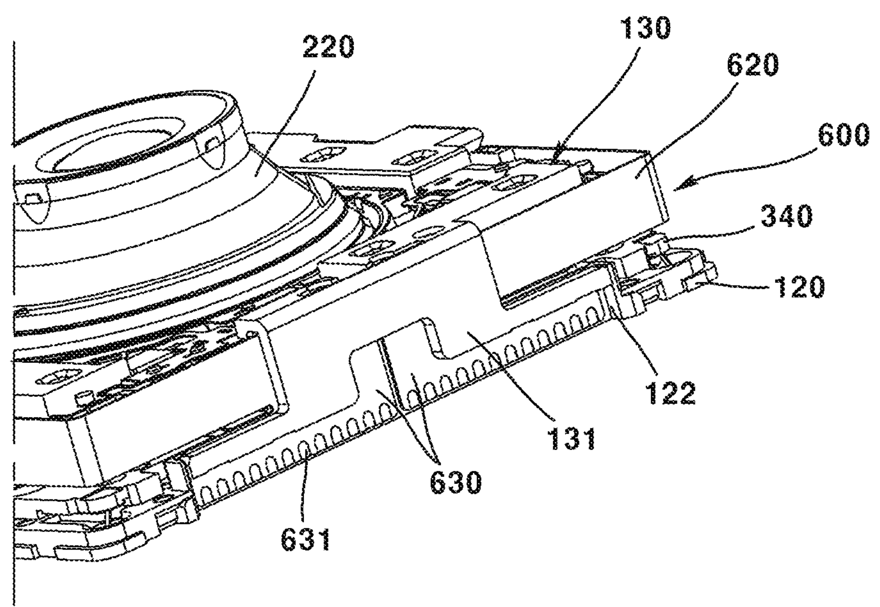
FIG. 21 is a perspective view illustrating a wing part and associated configuration of a housing according to an exemplary embodiment.
Figure 22:
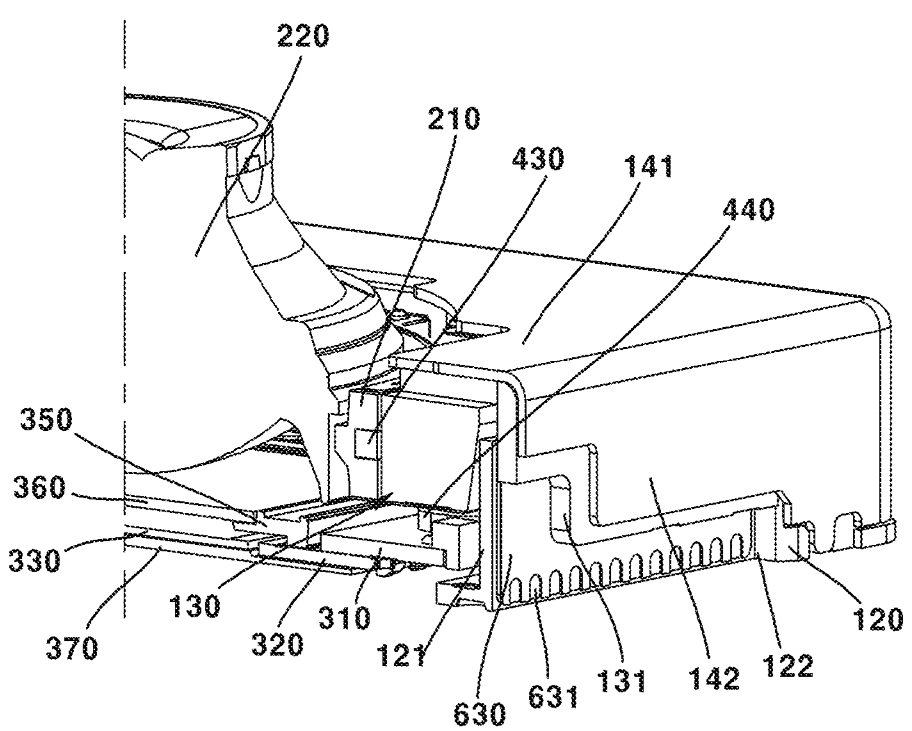
FIG. 22 is a cross-sectional perspective view illustrating a wing part and associated configuration of a housing according to an exemplary embodiment.
Figure 23:
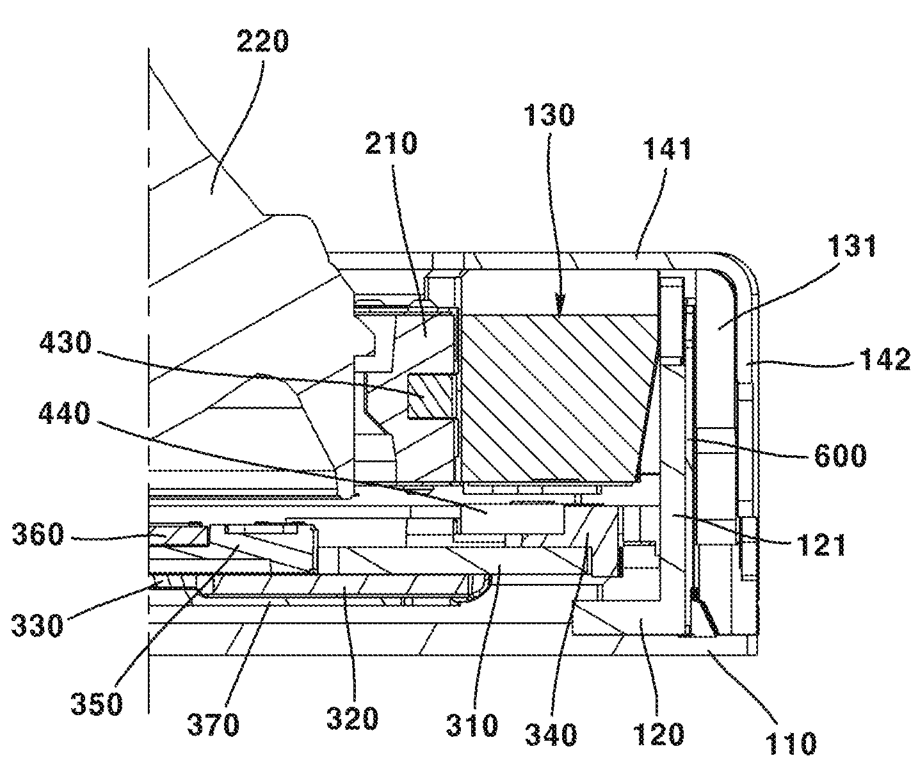
FIG. 23 is a cross-sectional view illustrating a portion of a camera device according to an exemplary embodiment.
Figure 24:
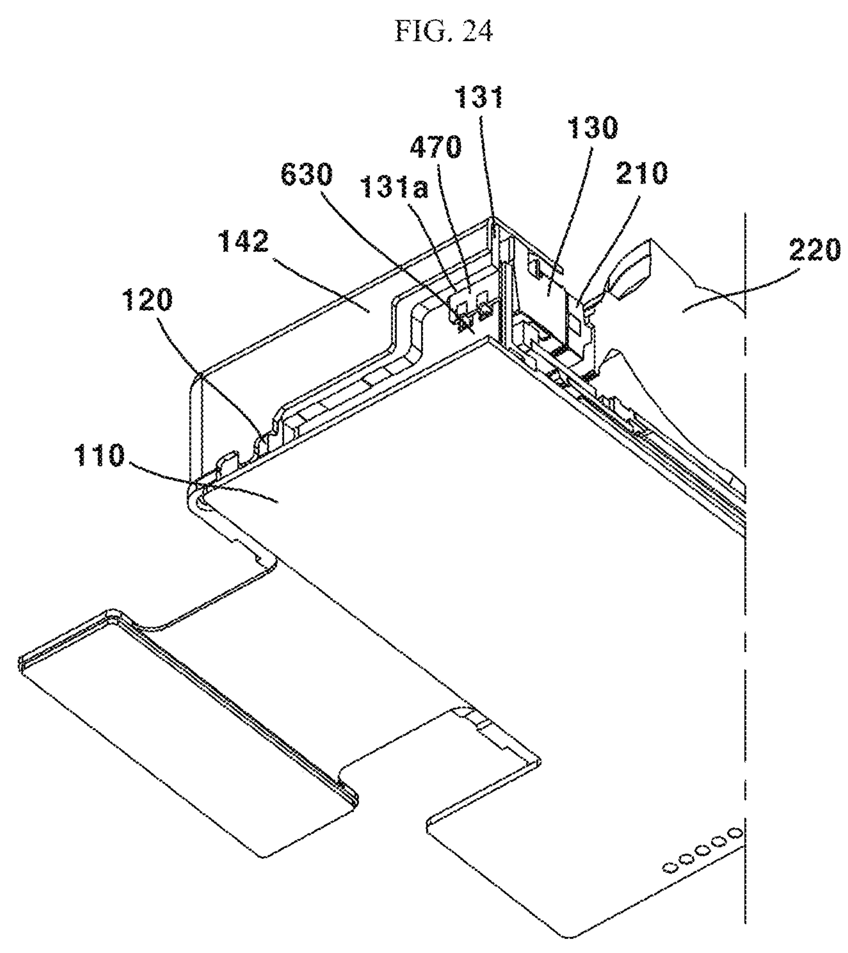
FIG. 24 is a cross-sectional perspective view illustrating a wing part of a housing and associated configuration opposite FIG. 22.
Figure 25:
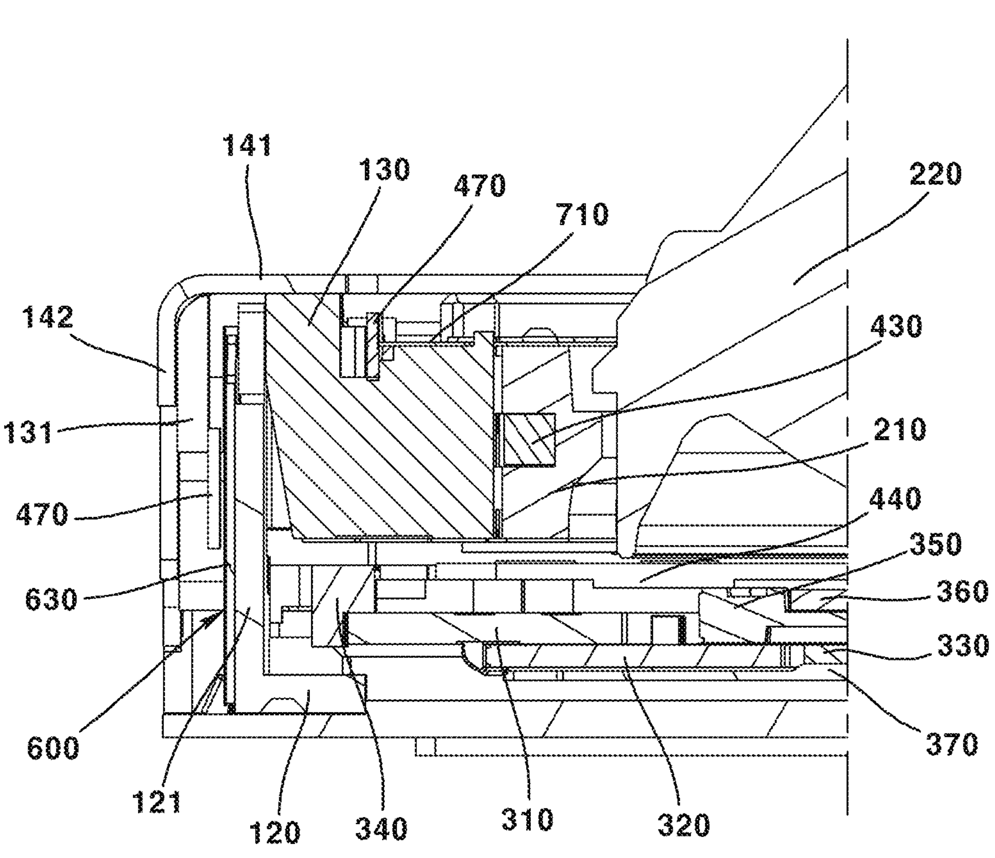
FIG. 25 is a cross-sectional view illustrating a portion of the camera device opposite FIG. 23.
Figure 26:
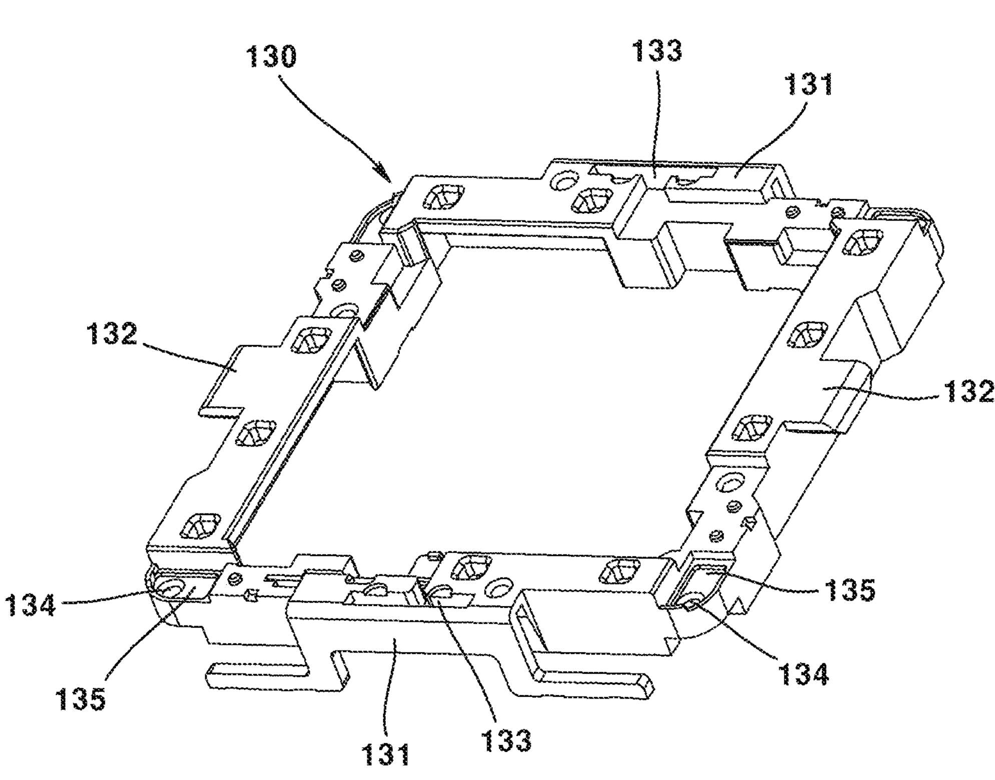
FIG. 26 is a perspective view of a housing of a camera device according to an exemplary embodiment.
Figure 27:
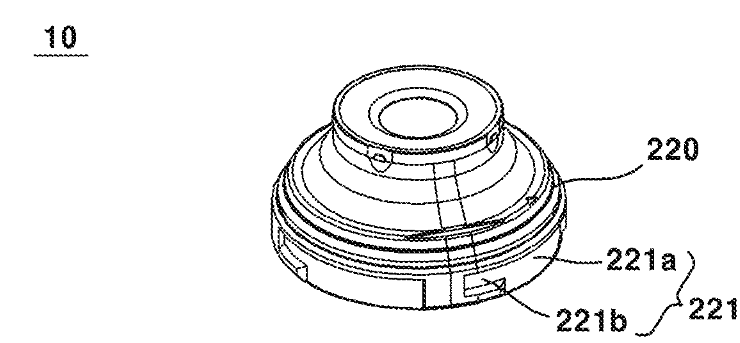
FIG. 27 is an exploded perspective view to illustrate the coupling structure of a lens of a camera device according to an exemplary embodiment.
Figure 27:
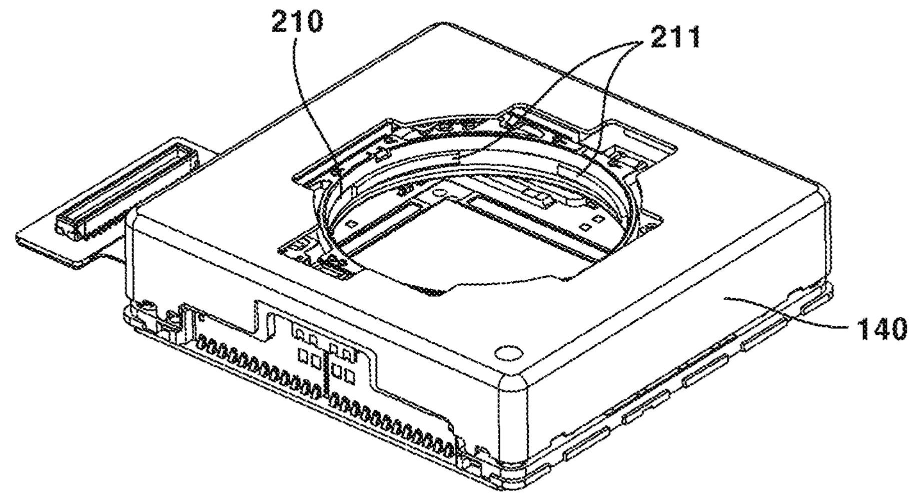
Figure 28:
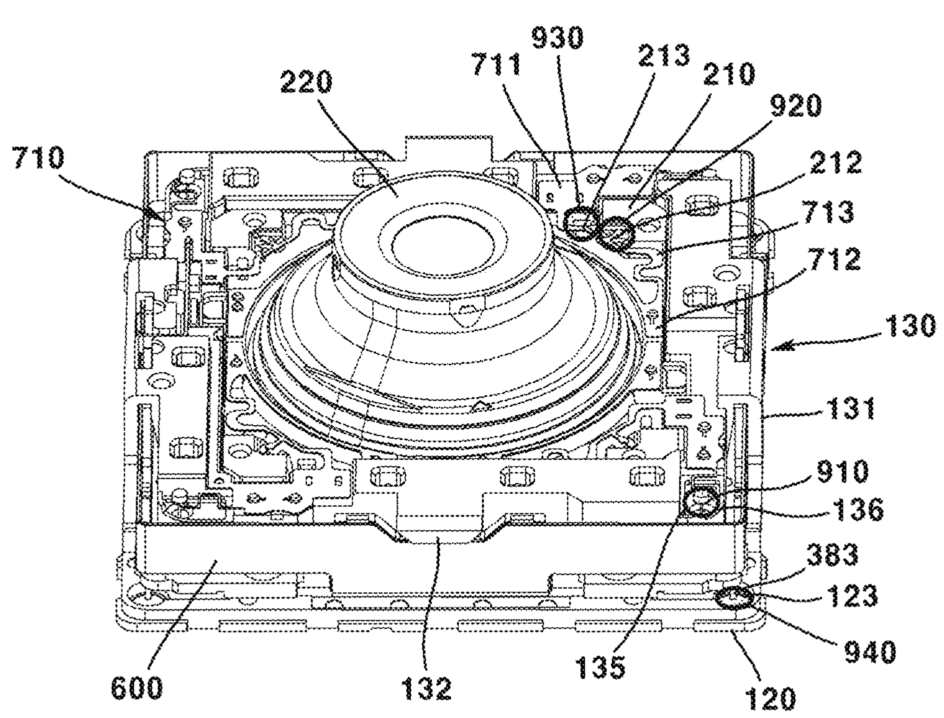
FIG. 28 is a perspective view with the cover member and the first substrate of the camera device according to an exemplary embodiment removed.
Figure 29:
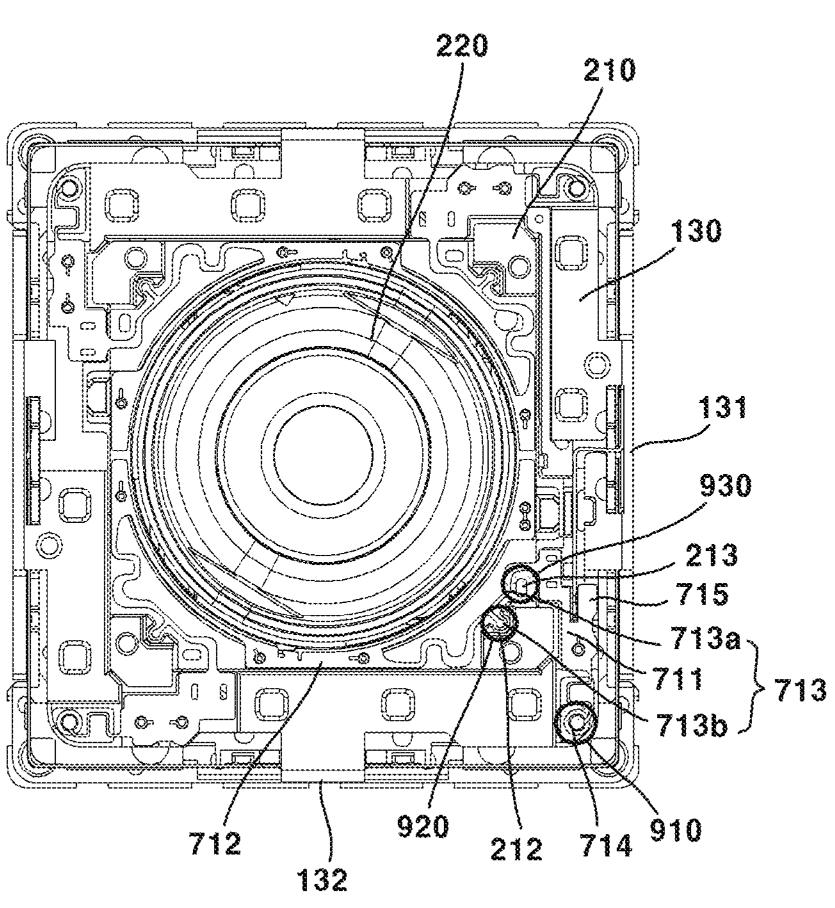
FIG. 29 is a plan view with the cover member and the first substrate of the camera device according to an exemplary embodiment removed.
Figure 31:
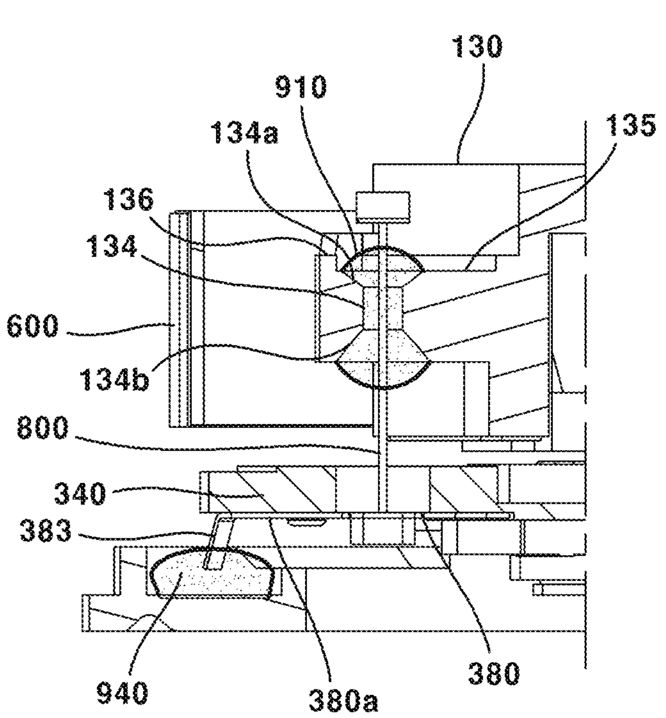
FIG. 31 is a cross-sectional view illustrating a structure for applying the first damper and the fourth damper of the camera device according to an exemplary embodiment.
Figures 32A, 32B, 32C:
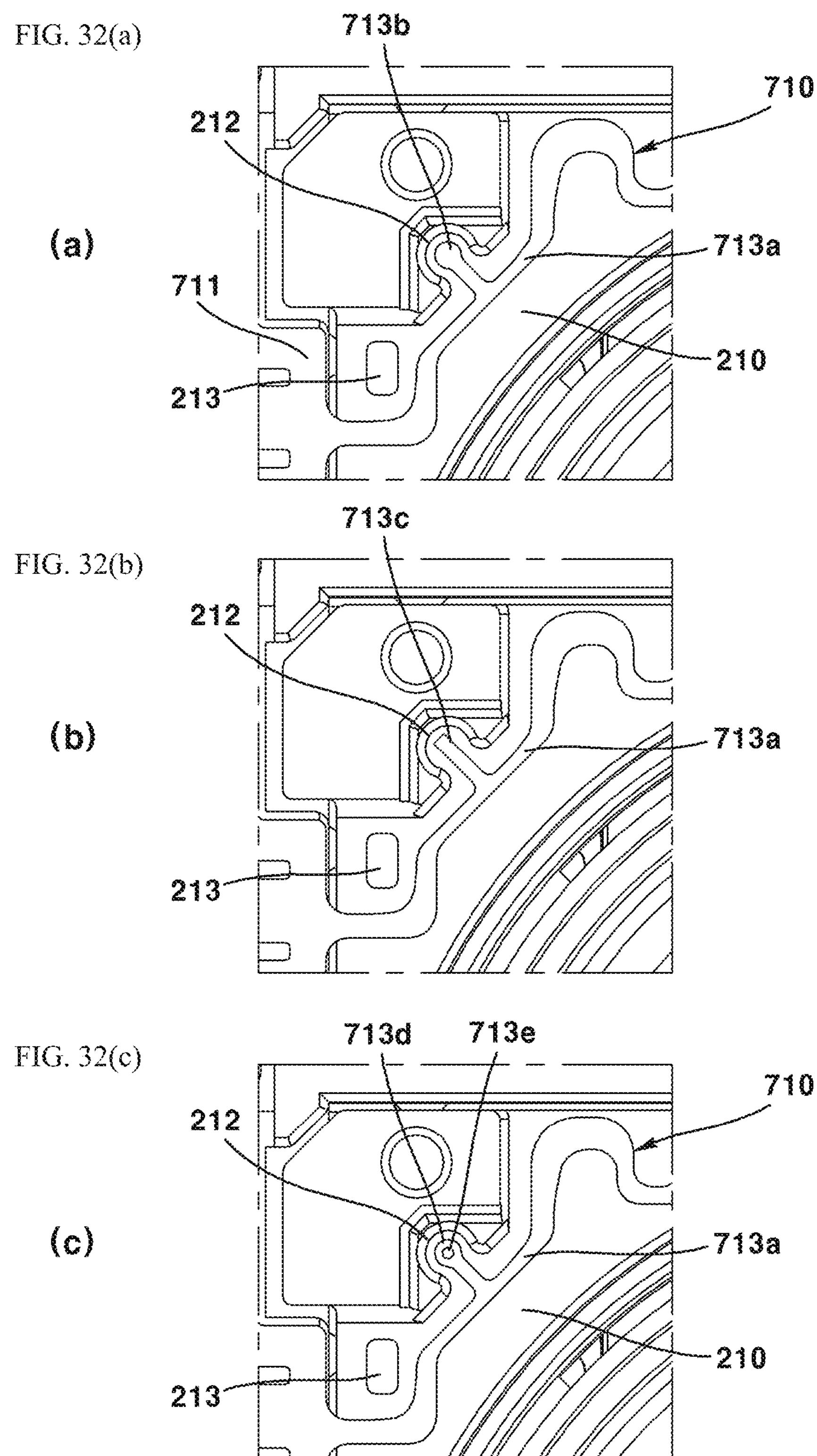
In FIG. 32(*a*) is a plan view illustrating a structure for applying a damper of a bobbin and an upper elastic member according to an exemplary embodiment, FIG. 32(*b*) is a plan view illustrating a structure for applying a damper of a bobbin and an upper elastic member according to a modification, and FIG. 32(*c*) is a plan view illustrating a structure for applying a damper of a bobbin and an upper elastic member according to another modification.
Figure 33:
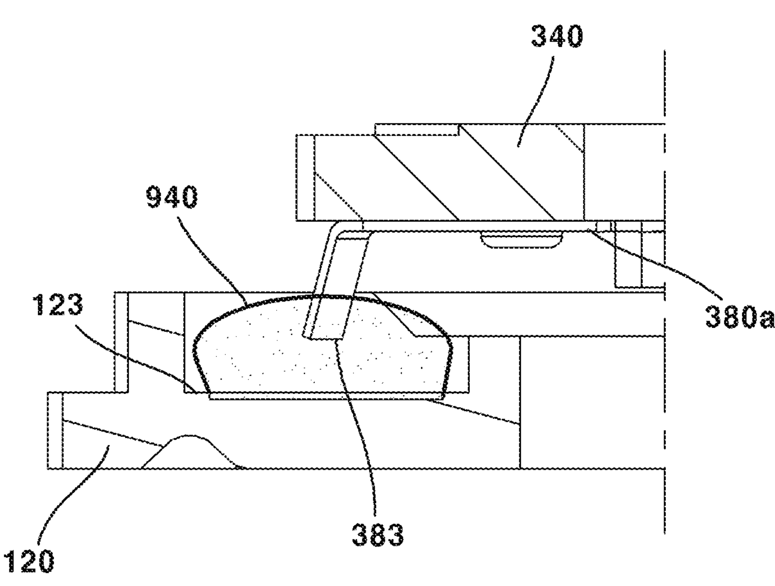
FIG. 33 is a cross-sectional view illustrating a structure for applying a fourth damper of a camera device according to an embodiment.
Figure 34:
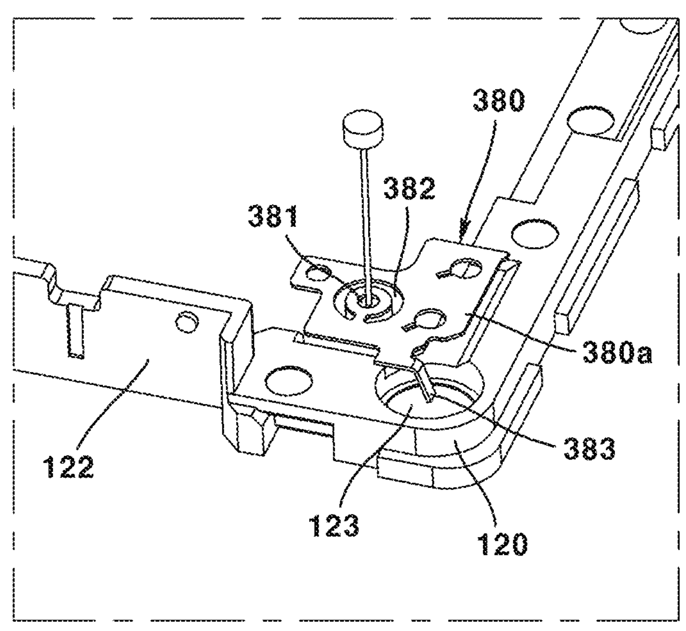
FIG. 34 is a perspective view illustrating a structure for applying a fourth damper of a coupling member and a base of a camera device according to an exemplary embodiment.
Figure 35:
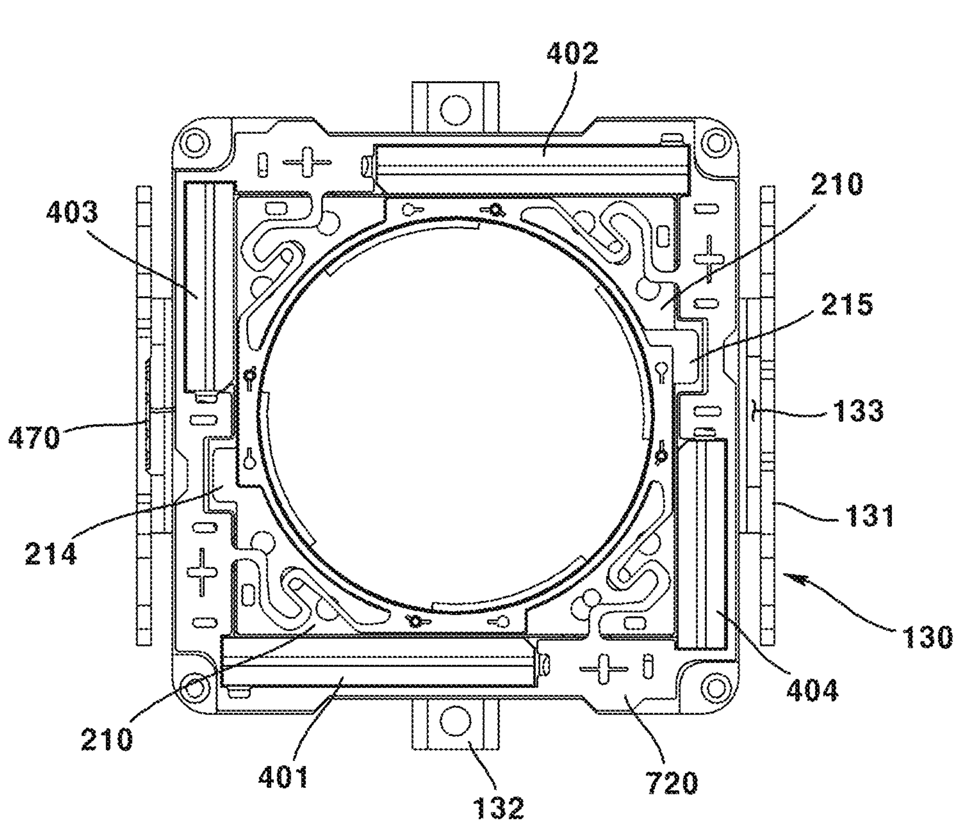
FIG. 35 is a bottom perspective view of a partial configuration of a camera device according to an exemplary embodiment.
Figure 36:
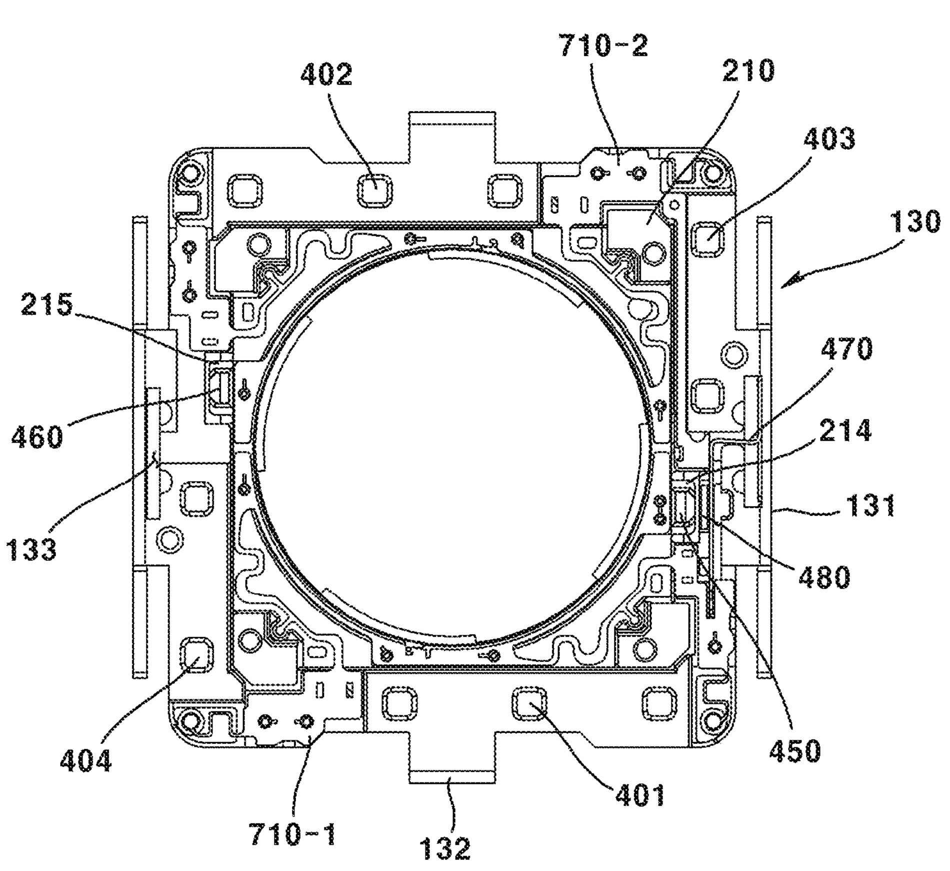
FIG. 36 is a top view of a partial configuration of a camera device in the state of FIG. 35.
Figure 37:
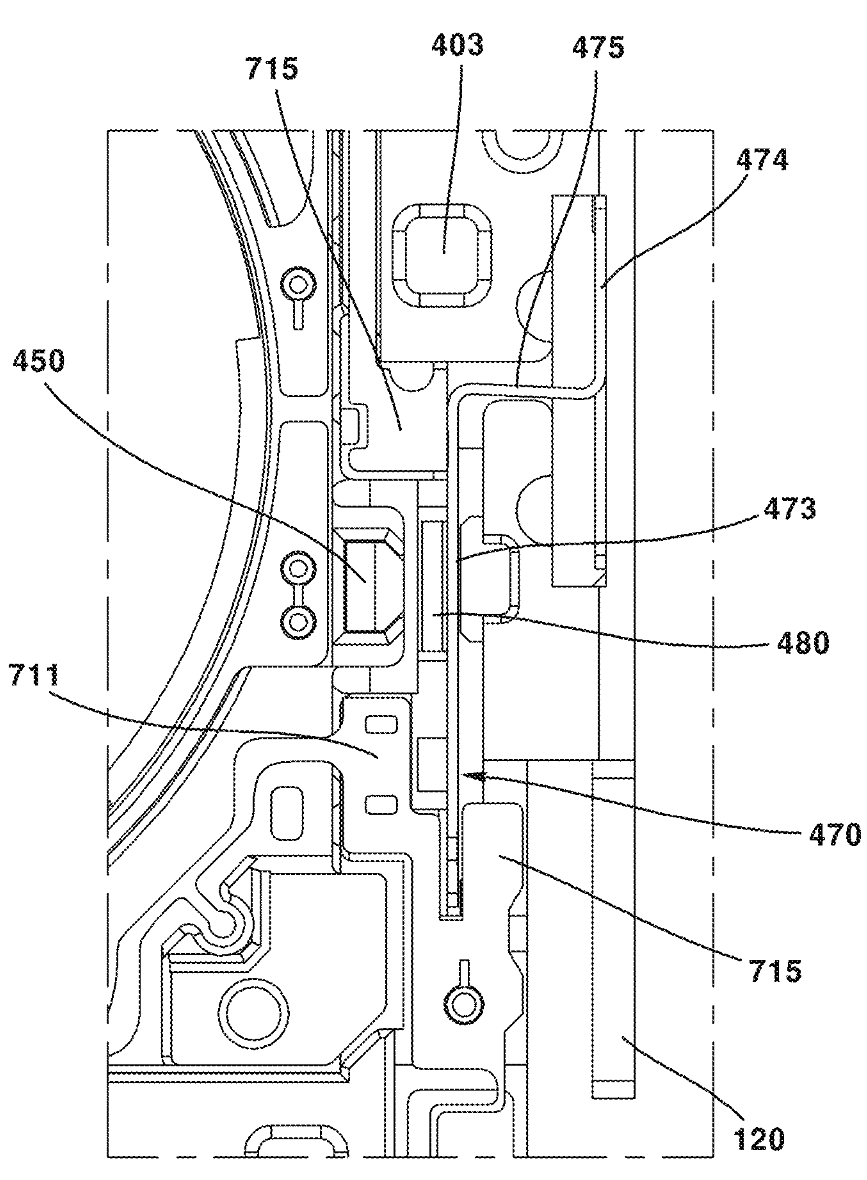
FIG. 37 is an enlarged view of a portion of FIG. 36.
Figure 38:
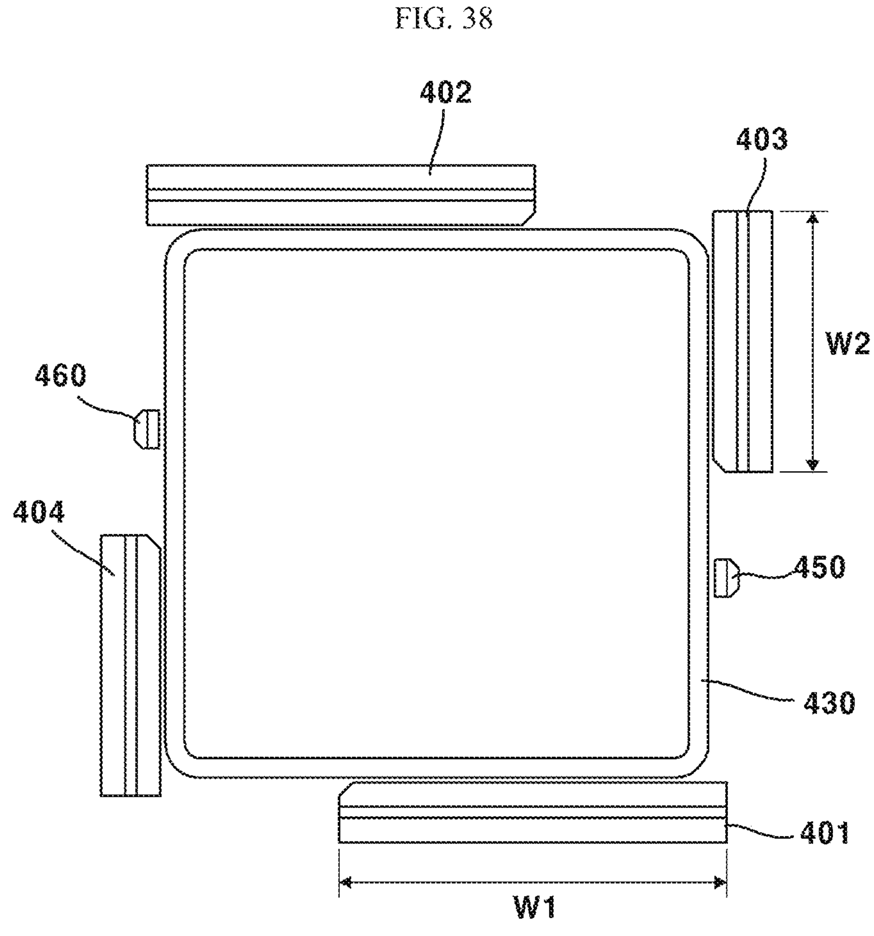
FIG. 38 is a top view illustrating a coil and magnet of a camera device according to an exemplary embodiment.
Figure 39:
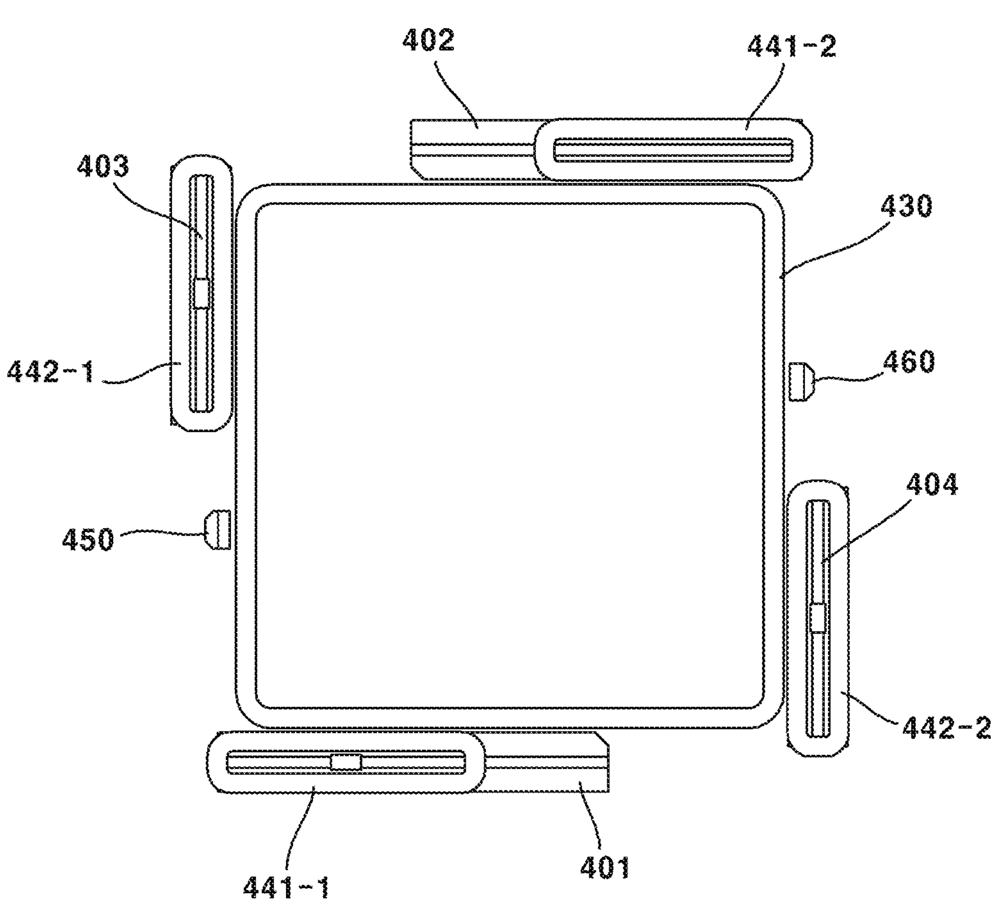
FIG. 39 is a bottom view illustrating a coil and magnet of a camera device according to an exemplary embodiment.
Figure 40:
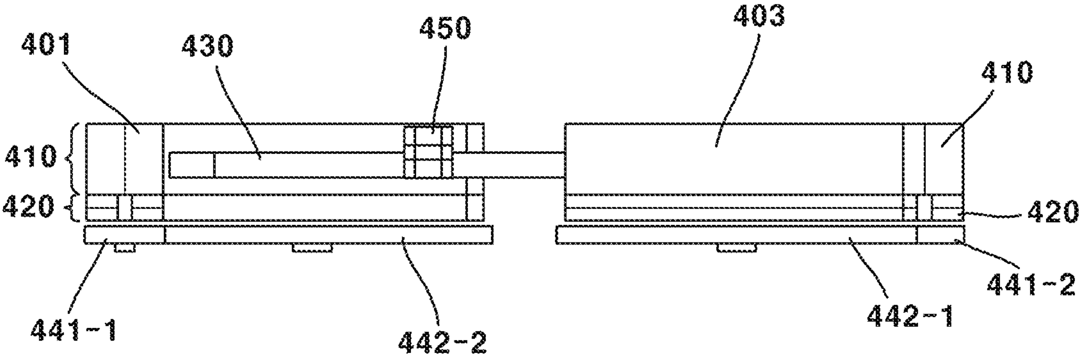
FIG. 40 is a side view illustrating a coil and magnet of a camera device according to an exemplary embodiment.
Figure 41:
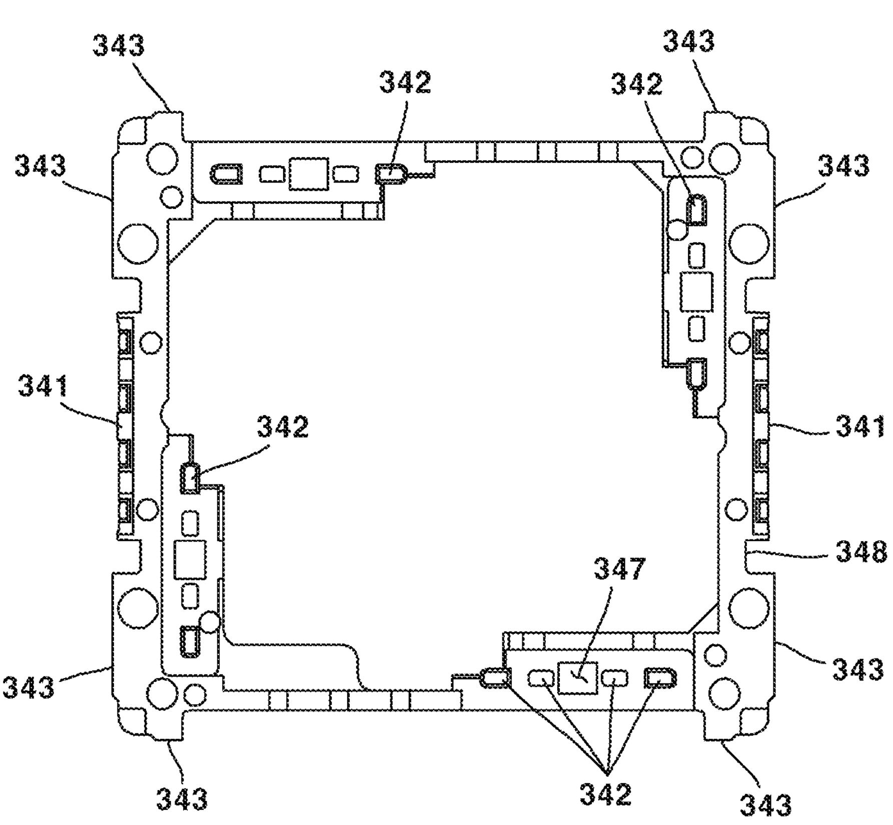
FIG. 41 is a top view of a holder of a camera device according to an exemplary embodiment.
Figure 42:
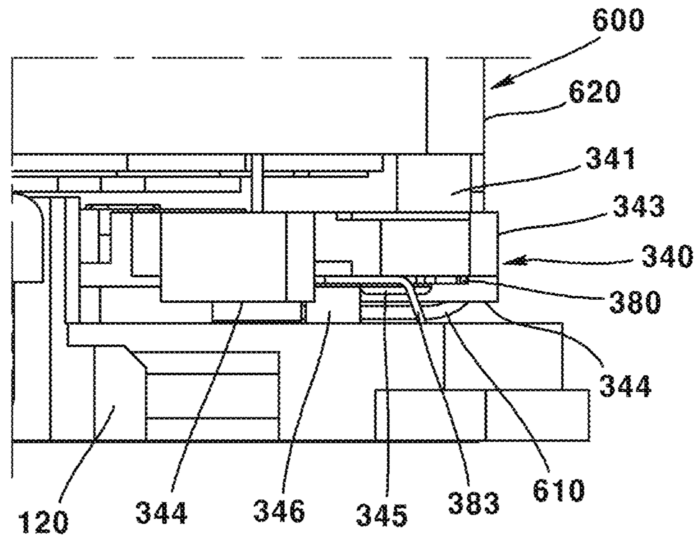
FIG. 42 is a side view illustrating an enlarged view of a holder and associated configuration of a camera device according to an exemplary embodiment.
Figure 43:
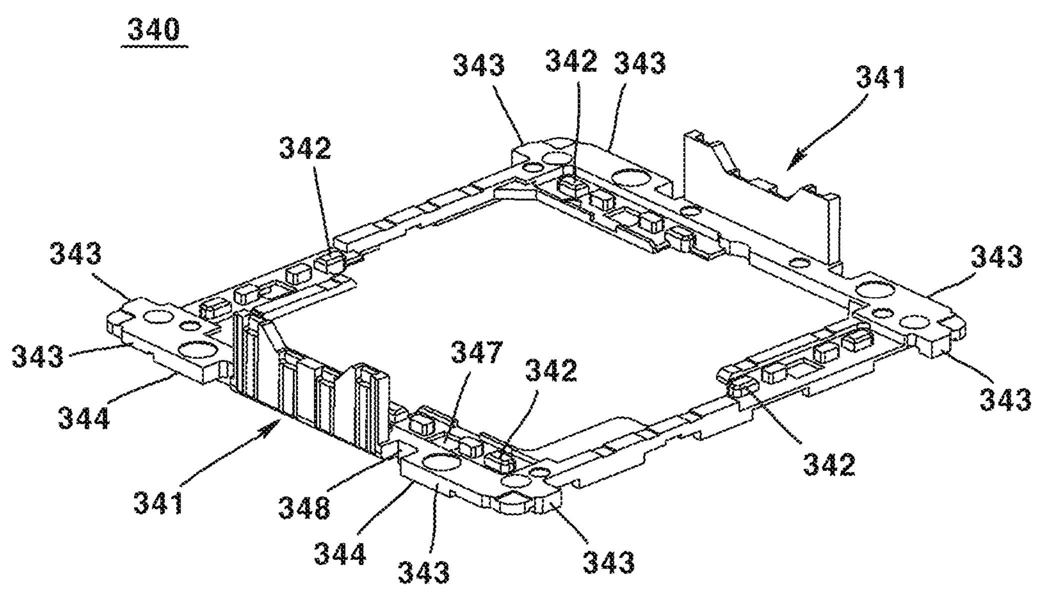
FIG. 43 is a perspective view of a camera device holder according to an exemplary embodiment.
Figure 44:
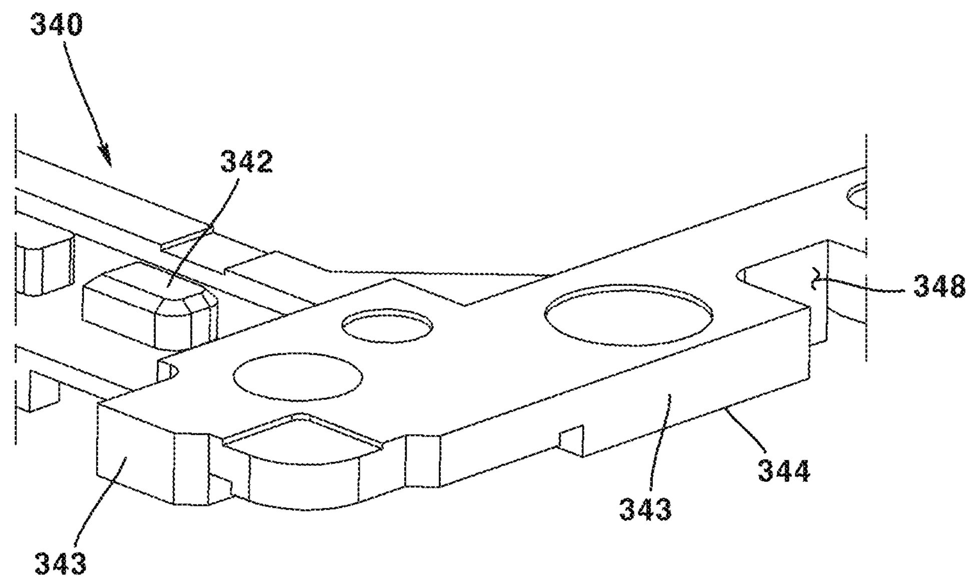
FIGS. 44 and 45 are perspective views of an enlarged view of a portion of a holder of a camera device according to an exemplary embodiment.
Figures 45, 46:
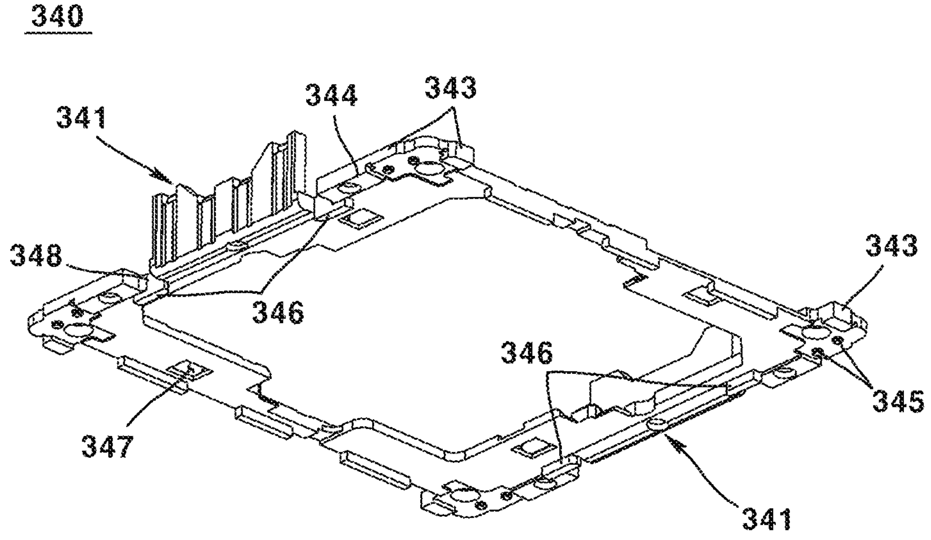
FIG. 46 is a bottom perspective view of a holder of a camera device according to an exemplary embodiment.
Figure 47:
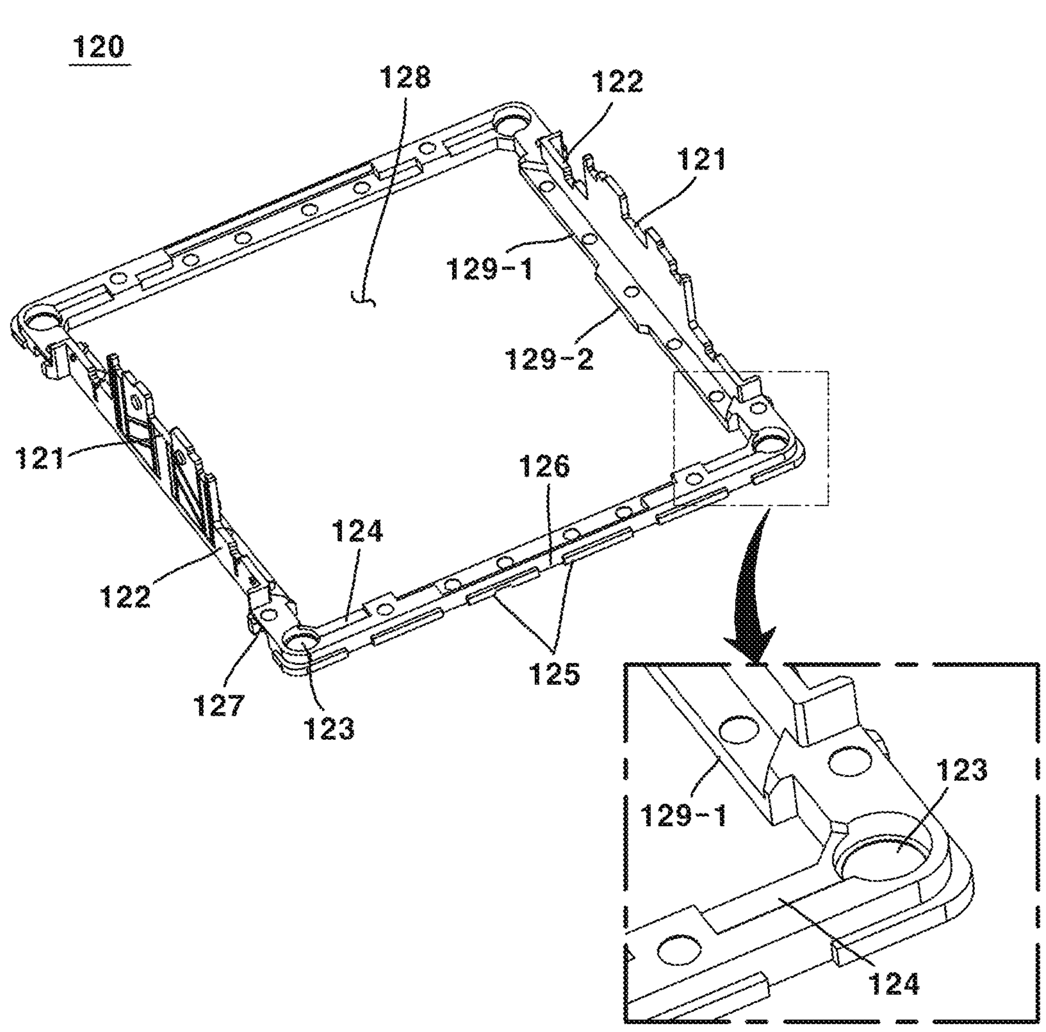
FIG. 47 is a perspective view of a base of a camera device according to an exemplary embodiment.
Figure 50:
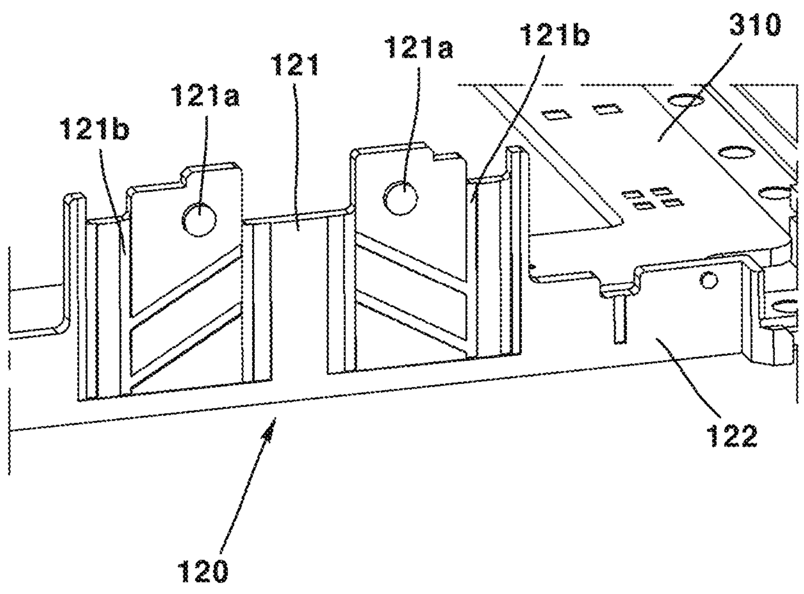
FIG. 50 is a perspective view illustrating a connecting substrate removed from the base, according to an exemplary embodiment.
Figure 51:
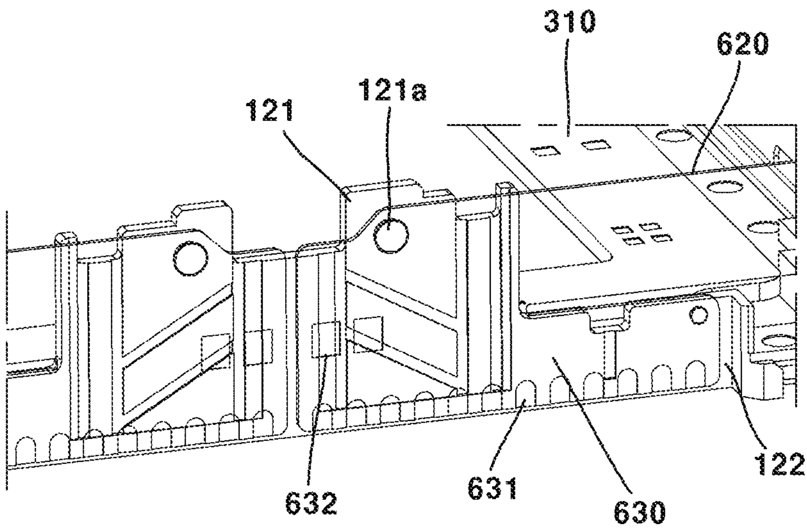
FIG. 51 is a perspective view showing a connecting substrate coupled to a base, according to an exemplary embodiment.
Figure 52:
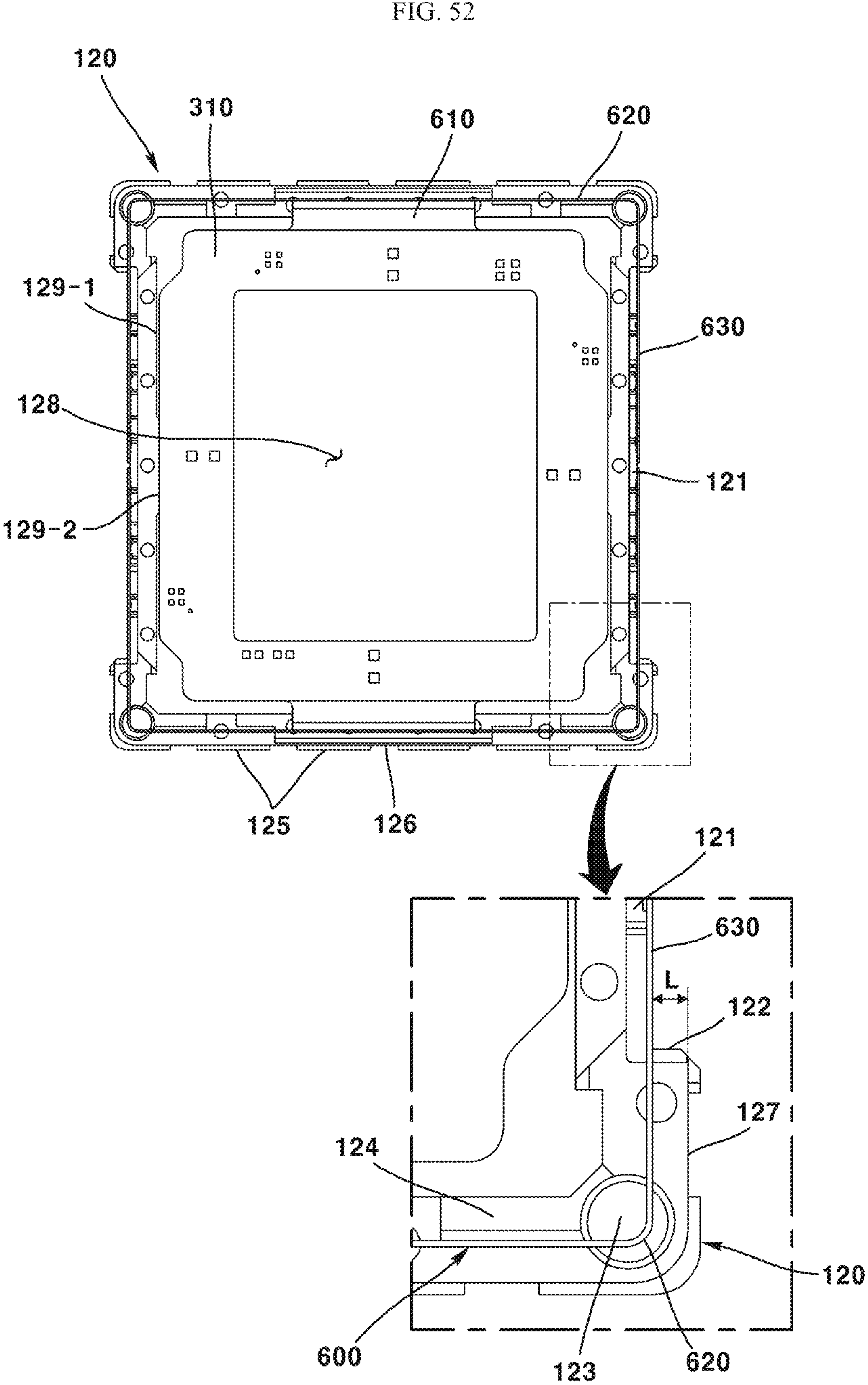
FIG. 52 is a top view and partial enlarged view illustrating a partial configuration of the camera device in FIG. 49 as seen from above.

FIG. 1 is a perspective view of a camera device according to an exemplary embodiment of the present invention, FIG. 2 is a perspective view of a camera device according to an exemplary embodiment of the present invention, with the cover member omitted, FIG. 3 is a top view of a camera device according to an exemplary embodiment of the present invention, FIG. 4 is a cross-sectional view from A-A of FIG. 3, FIG. 5 is a cross-sectional view from B-B of FIG. 3, FIG. 6 is a cross-sectional view from C-C of FIG. 3, FIG. 7 is an exploded perspective view of a camera device according to an exemplary embodiment of the present invention, FIG. 8 is an exploded view of a camera device according to an exemplary embodiment, viewed from a different orientation than FIG. 7, FIG. 9 is an exploded view of a first movable part of a camera device according to an exemplary embodiment and associated configuration, FIG. 10 is an exploded view of a second movable part and associated configuration of a camera device according to an exemplary embodiment, FIG. 11 is a perspective view of a partial configuration of a connecting substrate, wires, and second movable part of a camera device according to an exemplary embodiment, FIG. 12 is a perspective view illustrating a coupling structure of a wire of a camera device according to an exemplary embodiment, FIG. 13 is an enlarged view of a portion of FIG. 12, FIG. 14 is a perspective view illustrating a coupling structure of a connecting substrate and a third substrate of a camera device according to an exemplary embodiment of the present embodiment, FIG. 15 is an enlarged view of a portion of FIG. 14, FIG. 16 is a perspective view of a second substrate and a connecting substrate of a camera device according to an exemplary embodiment, FIG. 17 is a perspective view of a second substrate and a connecting substrate of a camera device, according to another modification, FIG. 18 is a perspective view of a second substrate and a connecting substrate of a camera device, according to another exemplary embodiment of the present invention, FIG. 19 is a perspective view illustrating a magnet and coil of a camera device according to an exemplary embodiment, FIG. 20 is an exploded view of a camera device according to an exemplary embodiment, FIG. 21 is a perspective view illustrating a wing part and associated configuration of a housing according to an exemplary embodiment, FIG. 22 is a cross-sectional perspective view illustrating a wing part and associated configuration of a housing according to an exemplary embodiment, FIG. 23 is a cross-sectional view illustrating a portion of a camera device according to an exemplary embodiment, FIG. 24 is a cross-sectional perspective view illustrating a wing part of a housing and associated configuration opposite FIG. 22, FIG. 25 is a cross-sectional view illustrating a portion of the camera device opposite FIG. 23, FIG. 26 is a perspective view of a housing of a camera device according to an exemplary embodiment, FIG. 27 is an exploded perspective view to illustrate the coupling structure of a lens of a camera device according to an exemplary embodiment, FIG. 28 is a perspective view with the cover member and the first substrate of the camera device according to an exemplary embodiment removed, FIG. 29 is a plan view with the cover member and the first substrate of the camera device according to an exemplary embodiment removed, FIG. 30 is an enlarged view illustrating an application structure of the first to fourth dampers of the camera device according to an exemplary embodiment, FIG. 31 is a cross-sectional view illustrating a structure for applying the first damper and the fourth damper of the camera device according to an exemplary embodiment, In FIG. 32(*a*) is a plan view illustrating a structure for applying a damper of a bobbin and an upper elastic member according to an exemplary embodiment, FIG. 32(*b*) is a plan view illustrating a structure for applying a damper of a bobbin and an upper elastic member according to a modification, and FIG. 32(*c*) is a plan view illustrating a structure for applying a damper of a bobbin and an upper elastic member according to another modification, FIG. 33 is a cross-sectional view illustrating a structure for applying a fourth damper of a camera device according to an embodiment, FIG. 34 is a perspective view illustrating a structure for applying a fourth damper of a coupling member and a base of a camera device according to an exemplary embodiment, FIG. 35 is a bottom perspective view of a partial configuration of a camera device according to an exemplary embodiment, FIG. 36 is a top view of a partial configuration of a camera device in the state of FIG. 35, FIG. 37 is an enlarged view of a portion of FIG. 36, FIG. 38 is a top view illustrating a coil and magnet of a camera device according to an exemplary embodiment, FIG. 39 is a bottom view illustrating a coil and magnet of a camera device according to an exemplary embodiment, FIG. 40 is a side view illustrating a coil and magnet of a camera device according to an exemplary embodiment, FIG. 41 is a top view of a holder of a camera device according to an exemplary embodiment, FIG. 42 is a side view illustrating an enlarged view of a holder and associated configuration of a camera device according to an exemplary embodiment, FIG. 43 is a perspective view of a camera device holder according to an exemplary embodiment, FIGS. 44 and 45 are perspective views of an enlarged view of a portion of a holder of a camera device according to an exemplary embodiment, FIG. 46 is a bottom perspective view of a holder of a camera device according to an exemplary embodiment, FIG. 47 is a perspective view of a base of a camera device according to an exemplary embodiment, in FIG. 48(*a*) is a top view and FIG. 48(*b*) is a bottom view illustrating an arrangement structure of the coupling member and the base of the camera device according to an exemplary embodiment, FIG. 49 is a perspective view illustrating the coupled state of the base and the connecting substrate according to an exemplary embodiment, FIG. 50 is a perspective view illustrating a connecting substrate removed from the base, according to an exemplary embodiment, FIG. 51 is a perspective view showing a connecting substrate coupled to a base, according to an exemplary embodiment, FIG. 52 is a top view and partial enlarged view illustrating a partial configuration of the camera device in FIG. 49 as seen from above, FIG. 53 is a perspective view of a camera device according to an exemplary embodiment, and in FIG. 54(*a*) is a bottom perspective view showing a ground terminal and a groove in the base of a camera device according to an embodiment, and FIG. 54(*b*) is a bottom perspective view of a modification in which the ground terminal is bent.

The camera device (10) may take at least one of an image and a video. The camera device (10) may be a camera. The camera device (10) may be a camera module. The camera device (10) may be a camera assembly. The camera device (10) may be a camera unit. The camera device (10) may include a lens driving device. The camera device (10) may include a sensor driving device. The camera unit (10) may include a voice coil motor (VCM). The camera device (10) may include an autofocus assembly. The camera device (10) may include an image stabilization assembly. The camera device (10) may include an autofocus device. The camera device (10) may include an image stabilization device. The camera device (10) may include an actuator. The camera device (10) may include a lens-driven actuator. The camera device (10) may include a sensor-driven actuator. The camera device (10) may include an autofocus actuator. The camera device (10) may include an image stabilization actuator.

The camera device (10) may include a fixed part (100). The fixed part (100) may be a relatively fixed portion of the movable parts (200, 300) as they move. The fixed part (100) may be a relatively fixed portion when at least one of the first movable part (200) and the second movable part (300) is moved. The fixed part (100) may accommodate the first movable part (200) and the second movable part (300). The fixed part (100) may be disposed on an outer side of the first movable part (200) and the second movable part (300).

Throughout the description, the first substrate (110) has been described as part of the fixed part (100), but the first substrate (110) may also be understood as a separate configuration from the fixed part (100). The fixed part (100) may be disposed on the first substrate (110). The fixed part (100) may be disposed on the first substrate (110). The fixed part (100) may be disposed on top of the first substrate (110).

The camera device (10) may include a first substrate (110). The fixed part (100) may include a first substrate (110). The first substrate (110) may be a main substrate. The first substrate (110) may be a substrate. The first substrate (110) may be a printed circuit board (PCB). The first substrate (110) may be connected to a power source of the optical apparatus (1). The first substrate (110) may include a connector in connection with a power source of the optical apparatus (1). The first substrate (110) may be spaced apart from a second substrate (310).

The camera device (10) may include a base (120). The fixed part (100) may include a base (120). The base (120) may be disposed on the first substrate (110). The base (120) may be disposed on the first substrate (110). The base (120)

may be disposed on top of the first substrate (110). The base (120) may be secured to the first substrate (110). The base (120) may be coupled to the first substrate (110). The base (120) may be adhesively bonded to the first substrate (110). The base (120) may be disposed between the first substrate (110) and a housing (130). The base (120) may be disposed in contact with a top surface of the first substrate (110). The base (120) may be spaced apart on top of the first substrate (110).

The connecting substrate (600) may be disposed on a base (120). The connecting substrate (600) may be connected to the base (120). The connecting substrate (600) may be secured to the base (120). The connecting substrate (600) may be coupled to the base (120). The connecting substrate (600) may be bonded to the base (120). The connecting substrate (600) may be secured to the base (120) by an adhesive. The connecting substrate (600) may be in contact with the base (120).

The base (120) may include a protrusion (121). The base (120) may include a protrusion (121) that projects upwardly. The protrusion (121) may protrude from a top surface of the base (120). The protrusion (121) may project upwardly from an outer surface of the base (120). The connecting substrate (600) may be disposed on the protrusion (121) of the base (120). The connecting substrate (600) may be connected to the protrusion (121) of the base (120). The connecting substrate (600) may be secured to the protrusion (121) of the base (120). The connecting substrate (600) may be coupled to the protrusion (121) of the base (120). The connecting substrate (600) may be bonded to the protrusion (121) of the base (120). The connecting substrate (600) may be secured to the protrusion (121) of the base (120) by an adhesive. The connecting substrate (600) may contact the protrusion (121) of the base (120). The base (120) may have a protruding structure of the base (120) for assembly of the connecting substrate (600).

The terminal part (630) of the connecting substrate (600) may be disposed on the protrusion (121) of the base (120). The terminal part (630) of the connecting substrate (600) may be connected to the protrusion (121) of the base (120). The terminal part (630) of the connecting substrate (600) may be secured to the protrusion (121) of the base (120). The terminal part (630) of the connecting substrate (600) may be coupled to the protrusion (121) of the base (120). The terminal part (630) of the connecting substrate (600) may be bonded to the protrusion (121) of the base (120). The terminal part (630) of the connecting substrate (600) may be secured to the protrusion (121) of the base (120) by an adhesive. The terminal part (630) of the connecting substrate (600) may contact the protrusion (121) of the base (120).

The base (120) may include a coupling protrusion (121*a*). The coupling protrusion (121*a*) may be a boss. The coupling protrusion (121*a*) may be coupled with the terminal part (630) of the connecting substrate (600). The coupling protrusion (121*a*) may be coupled with a hole in the terminal part (630) of the connecting substrate (600). The coupling protrusion (121*a*) may be inserted into the hole of the terminal part (630) of the connecting substrate (600). The coupling protrusion (121*a*) may be formed on the protrusion (121) of the base (120). The coupling protrusion (121*a*) may be formed on an upper region of the outer surface of the protrusion (121) of the base (120). An assembly guide boss may be formed on the base (120) to increase the assembly positioning accuracy of the connecting substrate (600).

A hole may be formed in the connecting substrate (600) that is coupled with the boss. The base (120) may include a groove (121*b*). The groove (121*b*) may be an adhesive receiving groove. The groove (121*b*) may be a bond application groove. An adhesive may be disposed in the groove (121*b*). The adhesive disposed in the groove (121*b*) may secure the terminal part (630) of the connecting substrate (600) to the base (120). The groove (121*b*) may be formed in the protrusion (121) of the base (120). The groove (121*b*) may be formed on an outer surface of the protrusion (121) of the base (120). The groove (121*b*) may include a plurality of grooves. A bond application groove may be formed on the base (120) to increase adhesion of the connecting substrate (600).

The groove (121*b*) may be disposed with at least a portion of the adhesive that bonds the connecting substrate (600) to the base (120). The groove (121*b*) may be formed on an outer surface of the base (120). The groove (121*b*) may be formed on an outer surface of the protrusion (121). The groove (121*b*) may be formed in a recess in the outer surface of the protrusion (121). The groove (121*b*) may be open upwardly. With such a structure, the adhesive may be injected into the groove (121*b*) from the top side. The groove (121*b*) may include a first portion extending in the optical axis direction and a second portion inclinedly connected to the first portion. The plurality of grooves (122, 123, 124, 126, 127) of the base (120) may be referred to as "grooves 1 to 7" to distinguish them from each other. The base (120) may include a groove (122). The groove (122) may be a terminal receiving groove. The groove (122) may be formed on the side of the base (120). In the groove (122), a terminal part (630) of the connecting substrate (600) may be disposed. The depth of the groove (122) may determine the stroke space of the extension part (620) of the connecting substrate (600). The groove (122) may be formed on an outer surface of the base (120) facing a side plate (142) of the cover member (140). The groove (122) may be formed by the protrusion (121). In other words, the groove (122) may be formed by a staircase between the recessed outer surface of the protrusion (121) and the outer surface of the base (120). In this embodiment, an assembly surface of the terminal part (630) of the connecting substrate (600) may be formed in the recessed groove (122) away from the outer edge of the base (120) to provide a stroke space for the connecting substrate (600).

The base (120) may include a groove (123). The groove (123) may be a damper receiving groove. The groove (123) may be formed on an upper surface of the base (120). The groove (123) may receive at least a portion of a fourth damper (940). The fourth damper (940) may be disposed in the groove (123). The groove (123) forms a dam structure in the base (120), and the fourth damper (940) may be disposed inside the dam. In this way, the fourth damper (940) may be inhibited from being washed out. A damper may be disposed in the groove (123) to connect with the extension part (383) of the coupling member (380). The base (120) may be provided with a groove structure to accommodate an OIS damper.

The base (120) may include a groove (124). The groove (124) may be a coupling member interference inhibiting groove. The groove (124) may be formed on an upper surface of the base (120). The groove (124) may extend from the groove (123). The groove (124) may extend from the groove (123) in a direction perpendicular to the optical axis direction. The groove (124) may inhibit the solder part joining the coupling member (380) and a wire (800) from interfering with the base (120) during movement of the second movable part (300). The groove (124) may inhibit the extension part (383) of the coupling member (380) and the wire (800) from interfering with the base (120) during movement of the second movable part (300). The groove (123) may be formed deeper from the upper surface of the base (120) than the groove (124), i.e., the damper receiving groove (123) may be recessed deeper than the coupling member interference inhibiting groove (124). The base (120) may include a solder part of the coupling member (380) having a damper spring and an avoidance structure for inhibiting interference when the OIS is actuated.

The base (120) may include a staircase part (125). The staircase part (125) may protrude from an outer surface of the base (120). A cover member (140) may be disposed on the staircase part (125). A side plate (142) of the cover member (140) may be disposed on the staircase part (125). The staircase part (125) may overlap the side plate (142) of the cover member (140) in the optical axis direction. The camera device (10) may include a sealing member. The sealing member may inhibit foreign objects from entering the interior of the camera device (10). The sealing member may be disposed between the cover member (140) and the base (120). The sealing member may seal a gap between the cover member (140) and the base (120). The sealing member may be disposed between the staircase part (125) of the base (120) and the side plate (142) of the cover member (140). At least a portion of the sealing member may be disposed in the plurality of fourth grooves (126) of the base (120) and the groove (143) of the cover member (140).

The base (120) may include a groove (126). The groove (126) may be a sealing groove. The groove (126) may be formed on a side of the staircase part (125). The groove (126) may be formed on an upper surface of the staircase part (125). The groove (126) may include a plurality of grooves. The grooves (126) may be formed as five grooves on one side of the base (120). The base (120) may have a sealing groove structure to inhibit actuator foreign objects from entering the base (120). A bottom portion of the base (120) may have five grooves formed on one side of the base (120). The plurality of grooves (126) of the base (120) may include a plurality of grooves disposed on any one of the four sides of the base (120). The plurality of grooves (126) of the base (120) may include a plurality of grooves disposed on a first side of the base (120). In a direction perpendicular to the optical axis direction, the sum of the widths of the plurality of grooves (126) may be 17% to 37% of the width of the first side of the base (120). In a direction perpendicular to the optical axis direction, the sum of the widths of the plurality of grooves (126) may be 22% to 32% of the width of the first side of the base (120). In a direction perpendicular to the optical axis direction, the sum of the widths of the plurality of grooves (126) may be 25% to 29% of the width of the first side of the base (120).

The base (120) may include a groove (127). The groove (127) may be a ground terminal interference inhibiting groove. The groove (127) may be recessed in the side of the staircase part (125) deeper than the thickness of the side plate (142) of the cover member (140). The groove (127) may be formed at a location corresponding to a ground terminal (144) of the cover member (140). In a modification, the groove (127) may accommodate at least a portion of the ground terminal (144*a*) of the cover member (140). The groove (127) may receive at least a portion of the ground terminal (144*a*) that is bent inwardly from the side plate (142) of the cover member (140). The cover member (140) may be adopted with ground terminal (144) to be grounded to the first substrate (110). In a modification, a receiving groove may be formed in the base (120) to avoid bending of the ground terminal (144).

The base (120) may include a hole (128). The hole (128) may be formed at a location corresponding to the image sensor (330). The hole (128) may be formed larger than the image sensor (330). The image sensor (330) may be assembled through the hole (128) in the base (120). An image sensor assembly including the image sensor (330), sensor substrate (320), sensor base (350), filter (360), and plate member (370) may be inserted through the hole (128) in the base (120) and coupled to the second substrate (310). The base (120) may include a first protrusion (129-1). The first protrusion (129-1) may be formed on an opposite side of the first groove (122) of the base (120). The first protrusion (129-1) may protrude from an inner surface of the base (120). The second substrate (310) may not overlap the first protrusion (129-1) in the optical axis direction.

In the exemplary embodiment, a hole for insertion of the image sensor assembly may be formed in the center of the base (120) and a groove (122) for placement of the terminal part (630) of the connecting substrate (600) may be applied to the outer portion of the base (120). The groove (122) of the base (120) may be recessed inwardly to provide a stroke space for the extension part (620), but a problem arises in that the hole (128) in the base (120) causes the thickness of the base (120) in a direction perpendicular to the optical axis direction to be thinned in a portion of the groove (122) of the base (120). In the exemplary embodiment, the thickness of the base (120) can be secured through the first protrusion (129-1) to maintain the strength of the base (120). The second protrusion (129-2) may further protrude inwardly from a portion of the first protrusion (129-1).

The base (120) may include a second protrusion (129-2). The second protrusion (129-2) may protrude from the first protrusion (129-1). The second protrusion (129-2) may further protrude from the first protrusion (129-1). The second protrusion (129-2) may protrude inwardly from the first protrusion (129-1). The second substrate (310) may overlap the second protrusion (129-2) in the optical axis direction.

The camera device (10) may include a housing (130). The fixed part (100) may include a housing (130). The housing (130) may be disposed on the base (120). The housing (130) may be disposed on the base (120). The housing (130) may be disposed on top of the base (120). The housing (130) may be secured to the base (120). The housing (130) may be secured to the cover member (140). The housing (130) may be coupled to the base (120). The housing (130) may be adhesively bonded to the base (120). The housing (130) may be disposed on the first substrate (110). The housing (130) may be disposed on top of the first substrate (110). The housing (130) may be formed as a separate member from the base (120). The housing (130) may be disposed on the holder (340). The housing (130) may be disposed between the base (120) and the cover member (140). The housing (130) may remain stationary and not move during AF operation. The housing (130) may remain stationary during OIS operation.

The housing (130) may include a first and second side disposed opposite each other, and a third and fourth side disposed opposite each other. Each of the first and second sides of the housing (130) may have wing part (131) formed thereon. A protrusion (132) may be formed on each of the third and fourth sides of the housing (130).

The housing (130) may include a wing part (131). The wing part (131) may be disposed between the connecting substrate (600) and the side plate (142) of the cover member (140). At least a portion of the terminal part (630) of the connecting substrate (600) may be disposed between the protrusion (121) of the base (120) and the wing part (131) of the housing (130). The wing part (131) may be a wing structure. The wing part (131) may inhibit foreign objects from entering between the connecting substrate (600) and the side plate (142) of the cover member (140). The wing part (131) may cushion external impact on the side plate (142) of the cover member (140). The housing (130) may be formed from an insulating member. The wing part (131) may be a spacer part. The wing part (131) may be a sealing portion. The wing part (131) may be a compensating part. The wing part (131) may be an extension part. The wing part (131) may include a horizontal extension part and a vertical extension part extending downward from the horizontal extension part.

The wing part (131) may include a first portion extending in a first direction and a second portion extending from the first portion in a second direction different from the first direction. The wing part (131) may be spaced apart from the protrusion (121) of the base (120). The wing part (131) may be spaced apart from the protrusion (121) of the base (120) within a tolerance range. Alternatively, the wing part (131) may be in contact with the protrusion (121) of the base (120). The wing part (131) may be coupled with the protrusion (121) of the base (120). The horizontal width of the upper portion of the wing part (131) may correspond to the width of the shortest horizontal portion of the terminal part (630) of the connecting substrate (600). Alternatively, the horizontal width of the upper portion of the wing part (131) may be longer than the horizontal width of the terminal part (630) of the connecting substrate (600). The horizontally oriented width of the upper portion of the wing part (131) may be shorter than the width of the shortest portion of the horizontally oriented width of the terminal part (630) of the connecting substrate (600). The wing part (131) may be disposed for sealing only on the side where the terminal part (630) is exposed.

In a sensor shift OIS actuator using the FPCB of the connecting substrate (600), a required clearance distance may be required for the FPCB to be able to drive. In this case, the required clearance distance may be the clearance distance between the FPCB and the stop part, which may result in a clearance distance that is vulnerable to foreign objects. However, the difficulty of applying a sealing structure to the clearance distance may cause vulnerability to foreign objects.

In the exemplary embodiment, a wing part (131), a wing structure extending down from the housing (130), may be inserted between the cover member (140) and the connecting substrate (600), acting as a lateral stopper. In a modification, a separate spacing member may be disposed in place of the wing part (131) descending from the housing (130).

The sealing structure can be completed by inserting a wing structure extending from the housing (130), which is an essentially necessary fixing structure, into the gap space between the connecting substrate (600) and the side plate (142) of the cover member (140). This protects the product from external impact and foreign object intrusion.

In a direction perpendicular to the optical axis, the base (120), the connecting substrate (600), the wing part (131) of the housing (130), and the side plate (142) of the cover member (140) may be arranged sequentially. In a direction perpendicular to the optical axis direction, the distance between the connecting substrate (600) and the side plate (142) of the cover member (140) may be equal to the thickness of the wing part (131) of the housing (130). In a direction perpendicular to the optical axis direction, the distance between the connecting substrate (600) and the side plate (142) of the cover member (140) may correspond to the thickness of the wing part (131) of the housing (130). However, considering manufacturing errors, assembly tolerances, and the like, it may be equally possible that the thickness of the wing part (131) of the housing (130) is 90% or more of the distance between the connecting substrate (600) and the side plate (142) of the cover member (140). Alternatively, it may be considered that the thickness of the wing part (131) of the housing (130) is equal to the distance between the connecting substrate (600) and the side plate (142) of the cover member (140), provided that foreign objects can be inhibited from entering The wing part (131) of the housing (130) may include a groove (131*a*). A third substrate (470) may be disposed in the groove (131*a*). The groove (131*a*) may be formed in a shape to which the third substrate (470) corresponds.

In a modification, the wing part (131) of the housing (130) may be omitted. In this case, the housing (130) may be provided with a spacing member that takes over the role of the wing part (131) of the housing (130). The spacing member may be a space. The spacing member may be a space member. The spacing member may be a sealing member. The spacing member may be a compensating member. The spacing member may be disposed between the connecting substrate (600) and the side plate (142) of the cover member (140). A seal may be provided between the base (120) and the cover member (140) via the wing part (131) or the spacing member.

The housing (130) may include a protrusion (132). The protrusion (132) may project outwardly from the housing (130). The protrusion (132) may project outwardly from each of the third and fourth sides of the housing (130). The protrusion (132) may be in contact with the cover member (140). The protrusion (132) may be secured to the cover member (140). The protrusion (132) may provide an assembly guide to the cover member (140). The protrusion (132) may provide a stroke space for movement of the extension part (620) of the connecting substrate (600).

The housing (130) may include a hole (133). In the hole (133), the protrusion (121) of the base (120) may be inserted. The hole (133) may be formed adjacent to the wing part (131). The hole (133) may be formed to extend through the housing (130) in an optical axis direction.

The housing (130) may include a hole (134). The hole (134) may be a wire pass-through hole. A wire (800) may be disposed in the hole (134). The wire (800) may pass through the hole (134). The wire (800) may pass through the hole (134). The hole (134) may be formed with a diameter larger than the wire (800) to avoid interference with the wire (800).

The housing (130) may include a groove (135). The grooves (135) may be formed on an upper surface of the housing (130). The groove (135) may be formed in a corner region of the upper surface of the housing (130). The groove (135) may be formed spaced apart from the outer surface of the housing (130). The groove (135) may be disposed adjacent to the hole (134). A damper may be disposed in the groove (135). The housing (130) may include a dam (136). The groove (135) of the housing (130) may form a dam (136) between an outer surface of the housing (130) and the groove (135) of the housing (130). The dam (136) may inhibit a first damper (910) disposed within the dam (136) from leaking outwardly. The hole (134) of the housing (130) may include a chamfer. The hole (134) may route the wire (800) through the chamfer. The hole (134) of the housing (130) may include a first chamfer (134*a*) that increases in width in a direction perpendicular to the optical axis direction toward the top. The hole (134) of the housing (130) may include a second chamfer (134*b*) disposed below the first chamber (134*a*) and increasing in width in a direction perpendicular to the optical axis towards the bottom. The length in the optical axis direction of the second chamfer (134*b*) may be longer than the length in the optical axis direction of the first chamfer (134*a*). The length in the optical axis direction of the second chamfer (134*b*) may be different from the length in the optical axis direction of the first chamfer (134*a*). The first damper (910) may be disposed from the first chamfer (134*a*) to the second chamfer (134*b*). The chamfered shape of the hole (134) may be formed in a stepped (staircase) shape. The hole (134) may include a stepped shape.

The camera device (10) may include a cover member (140). The fixed part (100) may include the cover member (140). The cover member (140) may be disposed on the base (140). The cover member (140) may be disposed on the base (140). The cover member (140) may be secured to the base (120). The cover member (140) may be coupled to the base (120). The cover member (140) may be coupled to the housing (130). The cover member (140) may be coupled to the first substrate (110). The cover member (140) may be secured to the base (120). The cover member (140) may be secured to the housing (130). The cover member (140) may be secured to the first substrate (110). The cover member (140) may cover at least a portion of the base (120). The cover member (140) may cover at least a portion of the housing (130). The cover member (140) may receive the housing (130) internally.

The cover member (140) may be a "cover can" or "shield can". The cover member (140) may be formed of a metal material. The cover member (140) may be capable of shielding electromagnetic interference (EMI). The cover member (140) may be electrically connected to the first substrate (110). The cover member (140) may be grounded to the first substrate (110).

The cover member (140) may include an upper plate (141). The cover member (140) may include a hole formed in the upper plate (141). The hole may be formed at a location corresponding to that of the lens (220). The cover member (140) may include a side plate (142). The side plate (142) may include a plurality of side plates. The side plate (142) may include four side plates. The side plate (142) may include a first to fourth side plate. The side plate (142) may include a first and second side plate disposed opposite each other, and a third and fourth side plate disposed opposite each other. The cover member (140) may include a plurality of corners between the plurality of side plates.

The cover member (140) may include a groove (143). The groove (143) may be a sealing member placement groove. A sealing member may be disposed in the groove (143). The groove (143) may be formed in the side plate (142) of the cover member (140). The groove (143) may be connected to the groove (126) of the base (120). The groove (143) may be associated with one or more of the plurality of grooves (126) of the base (120). The groove (143) may be disposed in a position corresponding to that of the groove (126) of the base (120). The groove (143) may be formed in the lower end of the side plate (142) of the cover member (140). The groove (143) may include a plurality of grooves. The groove (143) may be formed in fewer numbers than the groove (126) of the base (120). In a modification, the groove (143) may be formed in the same number as the groove (126) of the base (120).

The cover member (140) may include a ground terminal (144). The ground terminal (144) may extend downwardly from the side plate (142). The ground terminal (144) may be coupled to the first substrate (110). The ground terminal (144) may be connected to the first substrate (110). The ground terminal (144) may be electrically connected to the first substrate (110). The ground terminal (144) may be coupled to the first substrate (110) via a conductive member. The ground terminal (144) may be soldered to a terminal of the first substrate (110). The cover member (140) may be electrically connected to the first substrate (110). The cover member (140) may be grounded to the first substrate (110). The ground terminal (144) of the cover member (140) may be disposed in a position corresponding to that of the groove (127) of the base (120). Alternatively, in a modification, the ground terminal (144*a*) may be bent. The ground terminal (144*a*) may be bent inwardly. The ground terminal (144*a*) may be disposed within the groove (127) of the base (120) with at least a portion of the ground terminal (144*a*) bent inwardly.

Throughout the description, the cover member (140) has been described as a component of the fixed part (100), but the cover member (140) may be understood as a separate configuration from the fixed part (100). The cover member (140) may be coupled to the fixed part (100). The cover member (140) may cover a first movable part (200).

The camera device (10) may include a controller. The controller may be disposed on the first substrate (110). The controller may be disposed next to the cover member (140). The controller may include a discrete shield can that is smaller than the cover member (140). The controller may include a driver IC. The controller may control the operation of the camera device (10).

The camera device (10) may include a first movable part (200). The first movable part (200) may be movable about the fixed part (100). The first movable part (200) may move in an optical axis direction relative to the fixed part (100). The first movable part (200) may be disposed within the fixed part (100). The first movable part (200) may be movably disposed within the fixed part (100). The first movable part (200) may be movably disposed within the fixed part (100) in an optical axis direction. By moving the first movable part (200) in the optical axial direction relative to the fixed part (100), an autofocus (AF) function may be performed. The first movable part (200) may be disposed on a second movable part (300).

The camera device (10) may include a bobbin (210). The first movable part (200) may include a bobbin (210). The bobbin (210) may be disposed on the first substrate (110). The bobbin (210) may be disposed on top of the first substrate (110). The bobbin (210) may be spaced apart on the first substrate (110). The bobbin (210) may be disposed within the housing (130). The bobbin (210) may be disposed on an inner side of the housing (130). At least a portion of the bobbin (210) may be disposed in the housing (130). The bobbin (210) may be movably disposed in the housing (130). The bobbin (210) may be movably disposed in the housing (130) in the optical axis direction. The bobbin (210) may be coupled to the lens (220). The bobbin (210) may include a hollow or hole. The lens (220) may be disposed in the hollow or hole of the bobbin (210). An inner circumferential surface of the bobbin (210) may be coupled to an outer circumferential surface of the lens (220).

The camera device (10) may include a lens (220). The first movable part (200) may include a lens (220). The lens (220) may be coupled to the bobbin (210). The lens (2200 may be fixed to the bobbin (210). The lens (220) may be integrally movable with the bobbin (210). The lens (220) may be threadedly coupled to the bobbin (210). The lens (220) may be adhesively bonded to the bobbin (210). The lens (220) may be disposed in a position corresponding to that of the image sensor (330). An optical axis of the lens (220) may be aligned with the optical axis of the image sensor (330). The optical axis may be the z-axis. The lens (220) may include a plurality of lenses. The lens (220) may include a five-element (sheet) or six-element lens. The camera device (10) may include a lens module. The lens module may be coupled to the bobbin (210). The lens module may include a barrel and one or more lenses (220) disposed within the barrel. The bobbin (210) may include a protrusion (211) projecting from an inner circumferential surface of the bobbin (210). The lens (220) may include a groove (221) formed on an outer circumferential surface of the lens (220). The groove (221) of the lens (220) may include a first groove (221*a*) extending optically axially from a face of the lens (220). The groove (221) of the lens (220) may include a second groove (221*b*) extending from the first groove (221*a*) in a direction perpendicular to the optical axis direction and spaced apart from the bottom of the first groove (221*a*). At least a portion of the protrusions (211) of the bobbin (210) may be disposed in the second groove (221*b*) of the lens (220).

The bobbin (210) may include a groove (212). The groove (212) may be formed on an upper surface of the bobbin (210). The groove (212) may be a damper tank. The groove (212) may be described as being formed by a depression in a portion of the upper surface of the bobbin (210). Alternatively, the groove (212) may be described as a protruding remainder of a portion of the upper surface of the bobbin (210). A damper may be disposed in the groove (212). The groove (212) may include a side that is a curved surface that surrounds the damper.

The bobbin (210) may include a protrusion (213). The protrusion (213) may be formed on an upper surface of the bobbin (210). The protrusion (213) may protrude from the upper surface of the bobbin (210). The protrusion (213) may protrude from one surface of the bobbin (210). The protrusion (213) may project upwardly from the bobbin (210). A third damper (930) may be applied to the protrusion (213). The bobbin (210) may include a sensing magnet mount (214). The sensing magnet mount (214) may protrude from an outer circumferential surface of the bobbin (210). The sensing magnet mount (214) may protrude from an outer surface of the bobbin (210). The sensing magnet mount (214) may protrude from the outer peripheral surface of the bobbin (210) further than an AF coil (430). The sensing magnet mount (214) may include a sensing magnet (450) disposed on the sensing magnet mount (214). The sensing magnet mount (214) may include a groove. At least a portion of the sensing magnet (450) may be disposed in the groove of the sensing magnet mount (214). The sensing magnet (450) may be adhesively secured to the sensing magnet mount (214) using an adhesive.

The bobbin (210) may include a calibration magnet mount (215). The calibration magnet mount (215) may protrude from an outer circumferential surface of the bobbin (210). The calibration magnet mount (215) may protrude from an outer surface of the bobbin (210). The calibration magnet mount (215) may protrude from the outer circumferential surface of the bobbin (210) further than the AF coil (430). The calibration magnet mount (215) may include a calibration magnet (460) disposed on the calibration magnet mount (215). The calibration magnet mount (215) may include a groove. At least a portion of the calibration magnet (460) may be disposed in the groove of the calibration magnet mount (215). The calibration magnet (460) may be adhesively secured to the calibration magnet mount (215).

The lens (220) may be inserted from the upper side of the bobbin (210). In this case, the protrusion (211) of the bobbin (210) may pass through the first groove (221*a*) of the lens (220). When the protrusion (211) of the bobbin (210) is caught at the upper end of the first groove (221*a*) of the lens (220), the lens (220) can be rotated with respect to the bobbin (210). At this time, the protrusion (211) of the bobbin (210) may be inserted into the second groove (221*b*) of the lens (220). When the protrusion (211) of the bobbin (210) is inserted into the second groove (221*b*) of the lens (220), the optical axial movement of the lens (220) relative to the bobbin (210) may be restricted. The lens (220) may be secured to the bobbin (210) by an adhesive.

In the exemplary embodiment, a protrusion (211) is formed on the bobbin (210) and a groove (221) is formed on the lens (220), but in modifications, the bobbin (210) may include a groove and the lens (220) may include a protrusion that is coupled with the groove in the bobbin (210).

The camera device (10) may include a second movable part (300). The second movable part (300) may be movable about the fixed part (100). The second movable part (300) may move in a direction perpendicular to the optical axis direction relative to the fixed part (100). The second movable part (300) may be disposed within the fixed part (100). The second movable part (300) may be movably disposed within the fixed part (100). The second movable part (300) may be movably disposed within the fixed part (100) in a direction perpendicular to the optical axis direction. By moving the second movable part (300) in a direction perpendicular to the optical axis direction relative to the fixed part (100), the image stabilization (OIS) function may be performed. The second movable part (300) may be disposed between the first movable part (200) and the first substrate (110).

The camera device (10) may include a second substrate (310). The second movable part (300) may include the second substrate (310). The second substrate (310) may be a substrate. The second substrate (310) may be a printed circuit board (PCB). The second substrate (310) may be spaced apart from the first substrate (110). The second substrate (310) may be disposed between the first movable part (200) and the first substrate (110). The second substrate (310) may be disposed between the bobbin (210) and the first substrate (110). The second substrate (310) may be disposed between the lens (220) and the first substrate (110). The second substrate (310) may be spaced apart from the fixed part (100). The second substrate (310) may be spaced apart from the fixed part (100) in an optical axis direction and a direction perpendicular to the optical axis direction. The second substrate (310) may move in a direction perpendicular to the optical axis direction. The second substrate (310) may be electrically connected to the image sensor (330). The second substrate (310) may be co-movable with the image sensor (330). The second substrate (310) may include a hole. The image sensor (330) may be disposed in the hole in the second substrate (310). The second substrate (310) may be coupled to an upper surface of a sensor substrate (320). The second substrate (310) may be disposed on the upper surface of the sensor board (320). The second substrate (310) may be secured to the upper surface of the sensor board (320). The second substrate (310) may be spaced apart from the housing (130). The second substrate (310) may be disposed in a holder (340).

The second substrate (310) may include a terminal (311). The terminal (311) may be disposed on a lower surface of the second substrate (310). The terminal (311) may be coupled to the terminal (321) of the sensor board (320). The second substrate (310) may be formed separately from the sensor board (320). The second substrate (310) may be formed separately from and coupled to the sensor substrate (320). The terminal (311) of the second substrate (310) may be soldered to the terminal (321) of the sensor substrate (320).

The camera device (10) may include a sensor substrate (320). The second movable part (300) may include a sensor substrate (320). The sensor substrate (320) may be a substrate. The sensor substrate (320) may be a printed circuit board (PCB). The sensor substrate (320) may be coupled to an image sensor (330). The sensor substrate (320) may be coupled to the second substrate (310).

The sensor substrate (320) may include a hole. The hole may be hollow. An image sensor (330) may be disposed in the hole of the sensor substrate (320). A portion of the plate member (370) may be disposed in the hole of the sensor substrate (320). A protrusion (374) of the plate member (370) may be disposed in the hole of the sensor substrate (320). The hole of the sensor substrate (320) may be formed in a size and shape corresponding to the protrusion (374) of the plate member (370).

The sensor substrate (320) may include a terminal (321). The terminal (321) of the sensor substrate (320) may be coupled to the terminal (311) of the second substrate (310). The sensor substrate (320) may be coupled to the lower surface of the second substrate (310). The sensor substrate (320) may be disposed underneath the second substrate (310). The sensor substrate (320) may be coupled to the underside of the second substrate (310) with the image sensor (330) coupled thereto.

The camera device (10) may include an image sensor (330). The second movable part (300) may include an image sensor (330). The image sensor (330) may be disposed on the sensor substrate (320). The image sensor (330) may be disposed between the sensor substrate (320) and the sensor base (350). The image sensor (330) may be disposed within the base (120). The image sensor (330) may be electrically coupled to the second substrate (310). The image sensor (330) may be integrally movable with the second substrate (310). The image sensor (330) may be disposed below the lens (220). The image sensor (330) may be disposed on the plate member (370) and electrically connected to the sensor substrate (320) via wire bonding. The image sensor (330) may be movably disposed. The image sensor (330) may move in a direction perpendicular to the optical axis direction. The image sensor (330) may rotate about the optical axis. The image sensor (330) may be incident with a light that has passed through the lens (220) and the filter (360) to form an image. The image sensor (330) may be electrically connected to the sensor substrate (320), the second substrate (310), and the first substrate (110). The image sensor (330) may include an active image area. The image sensor (330) may convert a light illuminating the active image area into an electrical signal. The image sensor (330) may include one or more of a charge coupled device (CCD), a metal oxide semi-conductor (MOS), a CPD, and a CID.

The camera device (10) may include a holder (340). The second movable part (300) may include a holder (340). The holder (340) may be formed of an insulating material. The holder (340) may be disposed on the second substrate (310). The holder (340) may be disposed on the second substrate (310). The holder (340) may be disposed on top of the second substrate (310). The holder (340) may be secured to the second substrate (310). The holder (340) may be coupled to the second substrate (310). The holder (340) may include a hollow or a hole in which the image sensor (330) is disposed. An OIS coil (440) may be disposed in the holder (340). The holder (340) may include a protrusion around which the OIS coil (440) is wound. The holder (340) may include a hole in which the sensor (445) is disposed. The holder (340) may be spaced apart from the housing (130). The holder (340) may be moved in a direction perpendicular to the optical axis or rotated about the optical axis by the interaction of the driving magnet and the OIS coil (440) with the image sensor (330). The holder (340) may be a member on which the OIS coil (440) is disposed and may be a coil holder. The connecting substrate (600) may be disposed on the holder (340). The connecting substrate (600) may be connected to the holder (340). The connecting substrate (600) may be secured to the holder (340). The connecting substrate (600) may be coupled to the holder (340). The connecting substrate (600) may be bonded to the holder (340). The connecting substrate (600) may be secured to the holder (340) by an adhesive. The connecting substrate (600) may be in contact with the holder (340).

The holder (340) may include a protrusion (341). The protrusion (341) may protrude from an upper surface of the holder (340). The protrusion (341) may project upwardly from an outer surface of the holder (340). The connecting substrate (600) may be disposed on the protrusion (341) of the holder (340). The connecting substrate (600) may be connected to the protrusion (341) of the holder (340). The connecting substrate (600) may be secured to the protrusion (341) of the holder (340). The connecting substrate (600) may be coupled to the protrusion (341) of the holder (340). The connecting substrate (600) may be bonded to the protrusion (341) of the holder (340). The connecting substrate (600) may be secured to the protrusion (341) of the holder (340) by an adhesive. The connecting substrate (600) may contact the protrusion (341) of the holder (340). The holder (340) may include a protrusion (342). The protrusion (342) may protrude from an upper surface of the holder (340). The protrusion (342) may be disposed within the OIS coil (440). The protrusion (342) may protrude above the OIS coil (440). The OIS coil (440) may be disposed wound around the protrusion (342) of the holder (340). The protrusion (342) of the holder (340) may overlap the driving (drive) magnet in the optical axis direction. The OIS coil (440) may overlap the drive magnet in the optical axis direction. The distance in the optical axis direction between the OIS coil (440) and the drive magnet may be longer than the distance in the optical axis direction between the protrusion (342) of the holder (340) and the drive magnet. When the holder (340) is moved upward, the protrusion (342) of the holder (340) may contact the drive magnet. At this time, the OIS coil (440) may be spaced apart from the drive magnet, such that the holder (340) and the protrusion (342) may contact the drive magnet before the OIS coil (440), thereby inhibiting the OIS coil (440) from contacting the drive magnet.

The protrusions (342) may include a plurality of protrusions. The protrusion (342) may be formed in a number corresponding to the number of OIS coil (440). The protrusion (342) may include a first to fourth protrusion corresponding to the first-1 coil (441-1), the first-2 coil (441-2), the second-1 coil (442-1), and the second-2 coil (442-2). In this case, each of the first to fourth protrusion of the holder (340) may include four protrusions spaced apart from each other, such that there may be four projections disposed within each of the first-1 coil (441-1), first-2 coil (441-2), second-1 coil (442-1), and second-2 coil (442-2). The four protrusions may be disposed in a row. The holder (340) may include a first stopper part (343). The first stopper part (343) may be a lateral stopper. The first stopper part (343) may protrude outwardly from the extension part (620) of the connecting substrate (600). In a direction perpendicular to the optical axis direction, the distance between the extension part (620) of the connecting substrate (600) and the cover member (140) may be longer than the distance between the first stopper part (343) of the holder (340) and the cover member (140). The first stopper part (343) may be disposed on a side of the holder (340) closer to a corner of the holder (340) than to a center of the side of the holder (340). The holder (340) may include a second stopper part (344). The second stopper part (344) may be a bottom stopper. The second stopper part (344) may contact the base (120) when the holder (340) is moved downward. The second stopper part (344) may protrude downwardly from the coupling protrusion (345). The holder (340) may include the coupling protrusion (345). The coupling protrusion (345) may protrude from a bottom surface of the holder (340). The coupling protrusion (345) may be coupled with the coupling member (380). The coupling protrusion (345) may be coupled with a hole in the coupling member (380). The coupling protrusion (345) may be inserted into the hole in the coupling member (380). In a modification, the coupling protrusion (345) may be replaced by a groove, i.e., groove may be formed in a corresponding position in place of the coupling protrusion (345). In this case, an adhesive may be disposed in the groove of the holder (340) to secure the coupling protrusion (345).

The holder (340) may include protrusions (346). The protrusion (346) may include two protrusions (346) that project downwardly from the second substrate (310). The connecting part (610) of the connecting substrate (600) may be disposed between the two protrusions (346). The protrusions (346) of the holder (340) may protrude lower than the second stopper part (344). The holder (340) may include a hole (347). The hole (347) may be a sensor avoidance hole. A sensor (445) may be disposed in the hole (347). At least a portion of the sensor (445) may be disposed in the hole (347) of the holder (340). The holder (340) may include a groove (348). The groove (348) may be formed on an outer circumferential surface of the holder (340). The groove (348) may be formed by recessing from an outer surface of the holder (340). The groove (348) may be formed between a protrusion (341) and the first stopper part (343). The groove (348) may be formed between the connecting substrate (600) and the first stopper part (343). The groove (348) may inhibit a bent portion of the connecting substrate (600) from interfering with the holder (340).

At least some of the connecting part (610) and extension part (620) of the connecting substrate (600) may be disposed on the protrusion (341) of the holder (340). At least some of the connecting part (610) and extension part (620) of the connecting substrate (600) may be connected to the protrusion (341) of the holder (340). At least some of the connecting part (610) and extension part (620) of the connecting substrate (600) may be secured to the protrusion (341) of the holder (340). At least some of the connecting part (610) and extension part (620) of the connecting substrate (600) may be coupled to the protrusion (341) of the holder (340). At least some of the connecting part (610) and extension part (620) of the connecting substrate (600) may be bonded to the protrusion (341) of the holder (340). At least some of the connecting part (610) and extension part (620) of the connecting substrate (600) may be secured to the protrusion (341) of the holder (340) by adhesive. At least some of the connecting part (610) and extension part (620) of the connecting substrate (600) may contact the protrusion (341) of the holder (340). The holder (340) may include a hole. The wire (800) may pass through the hole in the holder (340). The hole in the holder (340) may be formed with a diameter larger than that of the wire (800) to inhibit the wire (800) from interfering with the holder (340) when the holder (340) is moved. A damper may be disposed in the hole of the holder (340).

The holder (340) may include a groove. The groove may be an adhesive receiving groove. The groove may dispose at least a portion of the adhesive that bonds the connecting substrate (600) to the holder (340). The groove may be formed on an outer surface of the holder (340). The groove may be formed on an outer surface of the protrusion (341). The groove may be formed in a depression in the outer surface of the protrusion 341. The groove may be open upwardly. With such a structure, the adhesive may be injected into the groove from the top side. The groove may comprise a plurality of grooves. The groove may include a staircase (**342*a*). A portion from the connecting substrate (600) to a portion secured to the holder (340) may be referred to as the connecting part (610). The holder (340) may include a groove. The groove may be formed on a bottom surface of the holder (340). The groove may be recessed from a bottom surface of the holder (340). The groove may be disposed at a location corresponding to a bent portion of the connecting part (610) of the connecting substrate (600). The groove may be disposed adjacent to the bent portion of the connecting part (610) of the connecting substrate (600). An adhesive may be disposed in the groove. The holder (340) may include a groove. The groove may be recessed from an outer circumferential surface of the holder (340). The groove may be disposed next to the protrusion (341). The groove may be formed to inhibit interference with the connecting substrate (600**).

The camera device (10) may include a sensor base (350). The second movable part (300) may include a sensor base (350). The sensor base (350) may be disposed on the sensor substrate (320). The sensor base (350) may include a hole formed at a location corresponding to that of the image sensor (330). The sensor base (350) may include a groove in which a filter (360) is disposed.

The camera device (10) may include a filter (360). The second movable part (300) may include a filter (360). The filter (360) may be disposed between the lens (220) and the image sensor (330). The filter (360) may be disposed on the sensor base (350). The filter (360) may block certain frequency bands of light from entering the image sensor (330) from a light passing through the lens (220). The filter (360) may include an infrared cut filter. The filter (360) may block an infrared light from entering the image sensor (330).

The camera device (10) may include a plate member (370). The second movable part (300) may include a plate member (370). The plate member (370) may be SUS. The plate member (370) may be formed from SUS. The plate member (370) may be formed of a copper alloy. The plate member (370) may include a copper. The plate member (370) may be a reinforcing plate. The plate member (370) may be a stiffener. The plate member (370) may be coupled to a lower surface of the sensor substrate (320). The plate member (370) may be disposed on a lower surface of the sensor substrate (320). The plate member (370) may contact the lower surface of the sensor substrate (320). The plate member (370) may be secured to the lower surface of the sensor substrate (320). The plate member (370) may be bonded to the lower surface of the sensor substrate (320) by an adhesive.

In the exemplary embodiment, the image sensor (330) may be directly disposed on the plate member (370). On the other hand, the plate member (370) may be easier in managing flatness than the sensor substrate (320). This may facilitate the easier flatness management of the image sensor (330) mounting surface. The image sensor (330) may be electrically connected to the sensor substrate (320) via wire bonding. The image sensor (330) may be electrically connected to the sensor substrate (320).

The plate member (370) may include a protrusion (374). The protrusion (374) may protrude from an upper surface of the plate member (370). At least a portion of the protrusion (374) may be disposed in a hole in the sensor substrate (320). The protrusion (374) of the plate member (370) may overlap the sensor substrate (320) in a direction perpendicular to the optical axis direction. The image sensor (330) may be disposed on the protrusion (374) of the plate member (370). The image sensor (330) may be disposed on the protrusion (374) of the plate member (370). The image sensor (330) may be in contact with the protrusion (374) of the plate member (370). The image sensor (330) may be fixed to the protrusion (374) of the plate member (370). The image sensor (330) may be bonded to the protrusion (374) of the plate member (370) by an adhesive. The plate member (370) may include a support region. The support region may be coupled to the sensor substrate (320). The support region may be a support portion. The support region may be disposed on an outer side of the protrusion (374). The support region may form an edge. The protrusion (374) may protrude from the support region. The thickness of the protrusion (374) may be less than the thickness of the sensor substrate (320). In this case, the thickness of the protrusion (374) may be a thickness from an upper surface of the support region to an upper surface of the protrusion (374). In other words, the thickness from an upper surface of the support region to an upper surface of the protrusion (374) may be less than the thickness of the sensor substrate (320).

The upper surface of the image sensor (330) disposed on the plate member (370) may be disposed with the upper surface of the sensor substrate (320). The thickness of the image sensor (330) may be thinner than the thickness of the sensor substrate (320). The height of the accommodation surface of the image sensor (330) of the plate member (370) may be lower than the height of the upper surface of the sensor substrate (320).

The camera device (10) may include a coupling member (380). The second movable part (300) may include a coupling member (380). The coupling member (380) may be disposed in the holder (340). The coupling member (380) may be coupled to the wire (800). The coupling member (380) may be connected to the wire (800) via solder. The coupling member (380) may be formed of metal. The coupling member (380) may include a hole through which the wire (800) passes. The coupling member (380) may include a cushioning part for shock mitigation. The coupling member (380) may include a multi-bend shape. The coupling member (380) may include a plurality of terminals. The coupling member (380) may include four terminals disposed at four corner regions of the holder (340). The coupling member (380) may be a plate of metal. The coupling member (380) may be formed of metal. The coupling member (380) may be a plate. The coupling member (380) may be a terminal member. The coupling member (380) may be a terminal.

The coupling member (380) may include a hole (381). The coupling member (380) may include a hole (381) through which the wire (800) is disposed. The coupling member (380) may include a hole (381) through which the wire (800) passes. The diameter of the hole (381) of the coupling member (380) may be different from the diameter of the hole (714*a*) of an upper elastic member (710). The diameter of the hole (381) of the coupling member (380) (see D1 in FIG. 13) may be larger than the diameter of the hole (714*a*) of the upper elastic member (710) (see D2 in FIG. 13). This may improve the assembly concentricity of the wire (800). Furthermore, workability in the process of joining the wire (800) to the upper elastic member (710) and the coupling member (380) may be improved. In a modification, the diameter of the hole (381) of the coupling member (380) may be smaller than the diameter of the hole (714*a*) of the upper elastic member (710). The coupling member (380) may include a hole (382). The hole (382) may be formed in a portion of the perimeter of the portion that engages the wire (800). The hole (382) may be configured to inhibit the wire (800) from breaking. The coupling member (380) may include a coupling part (380*a*). The coupling part (380*a*) may be coupled with the wire (800). The coupling part (380*a*) may be coupled to the holder (340). The coupling member (380) may include an extension part (383). The extension part (383) may extend from the coupling part (380*a*) towards the groove (123) of the base (120). The extension part (383) may form an obtuse angle with the coupling part (380*a*). Alternatively, the extension part (383) may form a right angle with the coupling part (380*a*). Alternatively, the extension part (383) may form an acute angle with the coupling part (380*a*). The extension part (383) may extend from the coupling part (380*a*). The extension part (383) may extend in a direction different from the direction of disposition of the coupling part (380*a*). The extension part (383) may be bent to extend. The extension part (383) may be connected to a fourth damper (940) disposed on the base (120).

In a modification, the coupling member (380) may be omitted. For example, the lower end of the wire (800) may be coupled to the base (120). The base (120) may include a surface electrode for coupling with the wire (800). The lower end of the wire (800) may be soldered to the surface electrode of the base (120).

The camera device (10) may include a drive (driving) part. The drive part may move the movable parts (200, 300) relative to the fixed part (100). The drive part may perform an autofocus (AF) function. The drive part may perform the image stabilization (OIS) function. The drive part may move the lens (220). The drive part may move the image sensor (330). The drive part may include magnets and coils. The drive part may include a shape memory alloy (SMA). The drive part may include a driving magnet. The driving magnet may be disposed in the housing. The driving magnet may include a plurality of magnets. The driving magnet may include first to fourth magnets (401, 402, 403, 404). The driving magnet may include first and second magnets (401, 402) disposed opposite each other. The driving magnet may include third and fourth magnets (403, 404) disposed opposite each other.

The distance between the first magnet (401) and the third magnet (403) may be different from the distance between the first magnet (401) and the fourth magnet (404). The distance between the first magnet (401) and the third magnet (403) may be greater than the distance between the first magnet (401) and the fourth magnet (404). The distance between the second magnet (402) and the fourth magnet (404) may be different from the distance between the second magnet (402) and the third magnet (403). The distance between the second magnet (402) and the fourth magnet (404) may be greater than the distance between the second magnet (402) and the third magnet (403). In a modification, the distance between the first magnet (401) and the third magnet (403) may be less than the distance between the first magnet (401) and the fourth magnet (404). The distance between the second magnet (402) and the fourth magnet (404) may be shorter than the distance between the second magnet (402) and the third magnet (403). A sensing magnet (450) may be disposed between the first magnet (401) and the third magnet (403). The sensing magnet (450) may overlap the first magnet (401) and the third magnet (403) in a direction perpendicular to the optical axis direction. The sensing magnet (450) may overlap the first magnet (401) in a direction perpendicular to the optical axis direction. The sensing magnet (450) may overlap the third magnet (403) in a direction perpendicular to the optical axis direction. The sensing magnet (450) may overlap the first magnet (401) and the third magnet (403) in a first direction perpendicular to the optical axis direction. The sensing magnet (450) may be disposed on an imaginary straight line connecting the first magnet (401) and the third magnet (403).

The sensing magnet (450) may overlap the third magnet (403) in a direction perpendicular to the inner surface of the first magnet (401). The sensing magnet (450) may overlap the first magnet (401) in a direction perpendicular to the inner surface of the first magnet (401). A calibration magnet (460) may be disposed between the second magnet (402) and the fourth magnet (404). The calibration magnet (460) may overlap the second magnet (402) and the fourth magnet (404) in a direction perpendicular to the optical axis direction. The calibration magnet (460) may overlap the second magnet (402) in a direction perpendicular to the optical axis direction. The calibration magnet (460) may overlap the fourth magnet (404) in a direction perpendicular to the optical axis direction. The calibration magnet (460) may overlap the second magnet (402) and the fourth magnet (404) in a first direction perpendicular to the optical axis direction. The calibration magnet (460) may be disposed on an imaginary straight line connecting the second magnet (402) and the fourth magnet (404). The calibration magnet (460) may overlap the fourth magnet (404) in a direction perpendicular to the inner surface of the second magnet (402). The calibration magnet (460) may overlap the second magnet (402) in a direction perpendicular to the inner surface of the second magnet (402).

Each of the first to fourth magnets (401, 402, 403, 404) may include an AF magnet (410) disposed in a position corresponding to the AF coil (430). Each of the first to fourth magnets (401, 402, 403, 404) may include an OIS magnet (420) disposed in a position corresponding to the OIS coil (440). Each of the first to fourth magnets (401, 402, 403, 404) may include a first width, which is a length between inner and outer surfaces, and a second width, which is a length between the two side surfaces. The first width of the first magnet (401) and the first width of the third magnet (403) may be the same. The first width of the second magnet (402) and the first width of the fourth magnet (404) may be the same. The first width of the first magnet (401) and the first width of the second magnet (403) may be the same. All of the first to fourth magnets (401, 402, 403, 404) may have the same first width, which is the length between the inner and outer surfaces. The second width of the first magnet (401) may be different from the second width of the third magnet (403). The second width of the first magnet (401) (see W1 in FIG. 38) may be longer than the second width of the third magnet (403) (see W2 in FIG. 38). The second width of the second magnet (402) may be longer than the second width of the fourth magnet (404). In a modification, the second width of the first magnet (401) may be shorter than the second width of the third magnet (403). The second width of the second magnet (402) may be shorter than the second width of the fourth magnet (404).

The second width of the first magnet (401) may be greater than the width in the corresponding direction of the first-1 coil (441-1). The second width of the third magnet (403) may be equal to or less than the width in the corresponding direction of the second-1 coil (442-1). As another example, the first length may be greater than the second length when the second width of the first magnet (401) is greater than the first length by a corresponding amount than the width in the corresponding direction of the first coil (441) and the second width of the third magnet (403) is greater than the second length by a corresponding amount than the width in the corresponding direction of the second-1 coil (442-1). In other words, the first magnet (401) may be larger than the third magnet (403) by a greater difference when compared to the corresponding coils.

The housing (130) may include first and second corners disposed opposite each other, and third and fourth corners disposed opposite each other. The first magnet (401) may be disposed between the first and fourth corners of the housing (130). The first magnet (401) may be disposed closer to the first corner than the fourth corner of the housing (130). The second magnet (402) may be disposed between the second and third corners of the housing (130). The second magnet (402) may be disposed closer to the second corner than the third corner of the housing (130). The third magnet (403) may be disposed between the third corner and the first corner of the housing (130). The third magnet (403) may be disposed closer to the third corner than the first corner of the housing (130). The fourth magnet (404) may be disposed between the second and fourth corners of the housing (130). The fourth magnet (404) may be disposed closer to the fourth corner than the second corner of the housing (130).

The distance between the first magnet (401) and the fourth corner may be different from the distance between the third magnet (403) and the first corner. The distance between the first magnet (401) and the fourth corner may be shorter than the distance between the third magnet (403) and the first corner. The distance between the first magnet (401) and the first corner may be the same as the distance between the third magnet (403) and the third corner. In a modification, the distance between the first magnet (401) and the fourth corner may be greater than the distance between the third magnet (403) and the first corner. The distance between the second magnet (402) and the third corner may be different from the distance between the fourth magnet (404) and the second corner. The distance between the second magnet (402) and the third corner may be shorter than the distance between the fourth magnet (404) and the second corner. The distance between the second magnet (402) and the second corner may be the same as the distance between the fourth magnet (404) and the third corner. In a modification, the distance between the first magnet (401) and the fourth corner may be longer than the distance between the third magnet (403) and the first corner. The OIS coil (440) may include a first-1 coil (441-1) corresponding to the first magnet (401), a first-2 coil (441-2) corresponding to the second magnet (402), a second-1 coil (442-1) corresponding to the third magnet (403), and a second-2 coil (442-2) corresponding to the fourth magnet (404). The first-1 coil (441-1), the first-2 coil (441-2), the second-1 coil (442-1), and the second-2 coil (442-2) may all be formed of the same size. The first-1 coil (441-1), the first-2 coil (441-2), the second-1 coil (442-1), and the second-2 coil (442-2) may all be wound with the same number of turns.

The camera device (10) may include an AF drive (driving) part. The AF drive part may be an autofocus drive part. The AF drive part may be a drive part for driving the autofocus. The AF drive part may move the first movable part (200) in the optical axis direction. The AF drive part may move the bobbin (210) in the optical axis direction. The lens (220) may be moved in the optical axis direction. The lens (220) may be moved in the optical axis direction relative to the image sensor (330). The AF drive part may perform an autofocus (AF) function. The AF drive part may move the first movable part (200) in an upward direction of the optical axis direction. The AF drive part may move the first movable part (200) in the downward direction of the optical axis.

The camera device (10) may include an OIS drive part. The OIS drive part may be an optical image stabilization drive part. The OIS drive part may be an image stabilization drive part. The OIS drive part may move the second movable part (300) in a direction perpendicular to the optical axis direction. The OIS drive part may move the second substrate (310) in a direction perpendicular to the optical axis direction. The OIS drive part may move the sensor substrate (320) in a direction perpendicular to the optical axis direction. The OIS drive part may move the image sensor (330) in a direction perpendicular to the optical axis direction. The OIS drive part may move the image sensor (330) in a direction perpendicular to the optical axis direction with respect to the first substrate (110). The OIS drive part may move the holder (340) in a direction perpendicular to the optical axis direction. The OIS drive part may move the sensor base (350) in a direction perpendicular to the optical axis direction. The OIS drive part may move the filter (360) in a direction perpendicular to the optical axis. The OIS drive part may perform the image stabilization (OIS) function.

The OIS drive part may move the second movable part (300) in a first direction perpendicular to the optical axis direction. The OIS drive part may move the second movable part (300) in a second direction perpendicular to the optical axis and the first direction. The OIS drive part may rotate the second movable part (300) about the optical axis. In the exemplary embodiment, the AF drive part may include an AF coil (430). The OIS drive part may include an OIS coil (440). The AF drive part may include an AF magnet (410). The OIS drive part may include an OIS magnet (420). In a modification, the AF drive part and the OIS drive part may include drive magnets that are used in common to interact with the AF coil (430) and the OIS coil (440), i.e., the AF drive part and the OIS drive part may include individually controlled coils and magnets in common.

The camera device (10) may include an AF magnet (410). The drive part may include an AF magnet (410). The AF magnet (410) may be a magnet. The AF magnet (410) may be a permanent magnet. The AF magnet (410) may be a common magnet. The AF magnet (410) may be used for autofocus (AF).

The AF magnet (410) may be disposed on the fixed part (100). The AF magnet (410) may be secured to the fixed part (100). The AF magnet (410) may be coupled to the fixed part (100). The AF magnet (410) may be bonded to the fixed part (100) by an adhesive. The AF magnet (410) may be disposed in the housing (130). The AF magnet (410) may be secured to the housing (130). The AF magnet (410) may be coupled to the housing (130). The AF magnet (410) may be bonded to the housing (130) by an adhesive. The AF magnet (410) may be disposed at a corner of the housing (130). The AF magnets (410) may be disposed biased towards the corners of the housing (130). The AF magnet (410) may be a two-pole magnetized magnet comprising one N-pole region and one S-pole region. In a modification, the AF magnet (410) may be a four-pole magnetized magnet comprising two N-pole regions and two S-pole regions. The AF magnet (410) may include a plurality of magnets. The AF magnet (410) may include four magnets. The AF magnet (410) may include a first to fourth magnet. The first to fourth magnets may be disposed symmetrically about the optical axis. The first to fourth magnets may be formed of the same size and shape as each other.

The camera device (10) may include an OIS magnet (420). The drive part may include an OIS magnet (420). The OIS magnet (420) may be a magnet. The OIS magnet (420) may be a permanent magnet. The OIS magnet (420) may be a common magnet. The OIS magnet (420) may be used for image stabilization (OIS). The OIS magnet (420) may be disposed on the fixed part (100). The OIS magnet (420) may be secured to the fixed part (100). The OIS magnet (420) may be coupled to the fixed part (100). The OIS magnet (420) may be bonded to the fixed part (100) by an adhesive. The OIS magnet (420) may be disposed in the housing (130). The OIS magnet (420) may be secured to the housing (130). The OIS magnet (420) may be coupled to the housing (130). The OIS magnet (420) may be adhesively bonded to the housing (130). The OIS magnet (420) may be disposed at a corner of the housing (130). The OIS magnet (420) may be disposed at a corner of the housing (130) biased towards the corner of the housing (130). The OIS magnet (420) may be a two-pole magnetized magnet comprising one N-pole region and one S-pole region. In a modification, the OIS magnet (420) may be a four-pole magnetized magnet comprising two N-pole regions and two S-pole regions.

The OIS magnet (420) may include a plurality of magnets. The OIS magnet (420) may include four magnets. The OIS magnet (420) may include a first to fourth magnet. The first to fourth magnet may be disposed symmetrically about the optical axis. The first to fourth magnet may be formed of the same size and shape as each other. The OIS magnet (420) may be disposed below the AF magnet (410). The OIS magnet (420) may be disposed on a lower surface of the AF magnet (410). The OIS magnet (420) may be in contact with a lower surface of the AF magnet (410). The OIS magnet (420) may be fixed to the lower surface of the AF magnet (410). The OIS magnet (420) may be bonded to the lower surface of the AF magnet (410) by an adhesive. In the optical axis direction, the length of the OIS magnet (420) may be shorter than the length of the AF magnet (410). The size of the OIS magnet (420) may be smaller than the length of the AF magnet (410).

The camera device (10) may include an AF coil (430). The drive part may include the AF coil (430). The AF coil (430) may be disposed in the first movable part (200). The AF coil (430) may be fixed to the first movable part (200). The AF coil (430) may be coupled to the first movable part (200). The AF coil (430) may be adhesively bonded to the first movable part (200). The AF coil (430) may be disposed on the bobbin (210). The AF coil (430) may be secured to the bobbin (210). The AF coil (430) may be coupled to the bobbin (210). The AF coil (430) may be bonded to the bobbin (210) by an adhesive. The AF coil (430) may be electrically connected to a driver IC (480). The AF coil (430) may be electrically connected to a lower elastic member (720), a third substrate (470), and a driver IC (480). The AF coil (430) may receive a current supply from the driver IC (480).

The AF coil (430) may be disposed in a position corresponding to the AF magnet (410). The AF coil (430) may be disposed on the bobbin (210) in a position corresponding to the AF magnet (410). The AF coil (430) may face the AF magnet (410). The AF coil 430 may include a surface facing the AF magnet (410). The AF coil (430) may be disposed adjacent to the AF magnet (410). The AF coil (430) may interact with the AF magnet (410). The AF coil (430) may interact electromagnetically with the AF magnet (410). The AF coil (430) may move the first movable part (200) in the optical axis direction. The AF coil (430) may move the bobbin (210) in the optical axis direction. The AF coil (430) may move the lens (220) in the optical axis direction. The AF coil (430) may move the first movable part (200) upward in the optical axis direction. The AF coil (430) may move the bobbin (210) in an upward direction of the optical axis. The AF coil (430) may move the lens (220) in an upward direction of the optical axis. The AF coil (430) may move the first movable part (200) in the downward direction of the optical axis. The AF coil (430) may move the bobbin (210) in the downward direction of the optical axis. The AF coil (430) may move the lens (220) in a downward direction of the optical axis. The AF magnet (410) and AF coil (430) can move the lens (220) in the optical axis direction.

The camera device (10) may include an OIS coil (440). The drive part may include an OIS coil (440). The OIS coil (440) may be disposed in the second movable part (300). The OIS coil (440) may be fixed to the second movable part (300). The OIS coil (440) may be coupled to the second movable part (300). The OIS coil (440) may be adhesively bonded to the second movable part (300). The OIS coil (440) may be disposed in the holder (340). The OIS coil (440) may be secured to the holder (340). The OIS coil (440) may be coupled to the holder (340). The OIS coil (440) may be bonded to the holder (340) by an adhesive. The OIS coil (440) may be positioned by being wound around a projection of the holder (340). The OIS coil (440) may be disposed on the holder (340). The OIS coil (440) may be disposed on an upper surface of the holder (340). The OIS coil (440) may be disposed on the second substrate (310). The OIS coil (440) may be electrically connected to the second substrate (310). Both ends of the OIS coil (440) may be soldered to the second substrate (310). The OIS coil (440) may be electrically connected to the driver IC (495). The OIS coil (440) may be electrically connected to the second substrate (310) and the driver IC (495). The OIS coil (440) may receive a current supply from the driver IC (495).

The OIS coil (440) may be disposed in a position corresponding to the OIS magnet (420). The OIS coil (440) may be disposed in a position corresponding to the driving magnet. The OIS coil (440) may be disposed on the holder (340) in a position corresponding to the OIS magnet (420). The OIS coil (440) may be facing the OIS magnet (420). The OIS coil (440) may include a surface facing the OIS magnet (420). The OIS coil (440) may be disposed adjacent to the OIS magnet (420). The OIS coil (440) may interact with the OIS magnet (420). The OIS coil (440) may interact electromagnetically with the OIS magnet (420). The OIS coil (440) may move the second movable part (300) in a direction perpendicular to the optical axis direction. The OIS coil (440) may move the second substrate (310) in a direction perpendicular to the optical axis direction. The OIS coil (440) may move the sensor substrate (320) in a direction perpendicular to the optical axis direction. The OIS coil (440) may move the image sensor (330) in a direction perpendicular to the optical axis direction. The OIS coil (440) may move the holder (340) in a direction perpendicular to the optical axis direction. The OIS coil (440) may rotate the second movable part (300) about the optical axis. The OIS coil (440) may rotate the second substrate (310) about the optical axis. The OIS coil (440) may rotate the sensor substrate (320) about the optical axis. The OIS coil (440) may rotate the image sensor (330) about the optical axis. The OIS coil (440) may rotate the holder (340) about the optical axis. The OIS magnet (420 and OIS coil (440) may move the image sensor (330) in a direction perpendicular to the optical axis direction relative to the base (120). The OIS coil (440) may include a plurality of coils. The OIS coil (440) may include four coils. The OIS coil (440) may include a coil for x-axis shift. The OIS coil (440) may include a coil for y-axis shift.

The OIS coil (440) may include a first coil (441). The first coil (441) may be a first sub-coil. The first coil (441) may be a coil for the x-axis shift. The first coil (441) may shift the second movable part (300) in the x-axis direction. The first coil (441) may be elongated in the y-axis. The first coil (441) may include a plurality of coils. The first coil (441) may include two coils. The two coils of the first coil (441) may be electrically connected to each other. The first coil (441) may include a connecting coil connecting the two coils. In this case, the two coils of the first coil (441) may be applied current together. Alternatively, the two coils of the first coil (441) may be electrically isolated from each other and may be separately energized.

The OIS coil (440) may include a second coil (442). The second coil (442) may be a second sub-coil. The second coil (442) may be a coil for y-axis shift. The second coil (442) may shift the second movable part (300) in the y-axis direction. The second coil (442) may be elongated in the x-axis. The first coil (441) may include a plurality of coils. The second coil (442) may include two coils. The two coils of the second coil (442) may be electrically connected to each other. The second coil (442) may include a connecting coil connecting the two coils. In this case, the two coils of the second coil (442) may be current applied together. Alternatively, the two coils of the second coil (442) may be electrically isolated from each other and may be applied current individually.

The camera device (10) may include a sensor (445). The sensor (445) may be disposed on the second substrate (310). The sensor (445) may be disposed in a hole in the holder (340). The sensor (445) may include a Hall sensor. The sensor (445) may include a Hall IC. The sensor (445) may detect the OIS magnet (420). The sensor (445) may detect a magnetic force of the OIS magnet (420). The sensor (445) may face the OIS magnet (420). The sensor (445) may be disposed in a position corresponding to the OIS magnet (420). The sensor (445) may be disposed adjacent to the OIS magnet (420). The sensor (445) may detect a position of the second movable part (300). The sensor (445) may detect movement of the second movable part (300). The sensor (445) may be disposed in the hollow of the OIS coil (440). The sensed value detected by the sensor (445) may be used to feedback the image stabilization drive. The sensor (445) may be electrically coupled to the driver IC (495). The sensors (445) may include a plurality of sensors. The sensor (445) may include three sensors. The sensor (445) may include a first sensor and a third sensor. The first sensor may detect a displacement of the second movable part (300) in the x-axis direction. The second sensor may detect a displacement of the second movable part (300) in the y-axis direction. The third sensor may detect a rotation of the second movable part (300) about the z-axis, either alone or in combination with at least one of the first and second Hall sensor. Each of the first to third sensors may comprise a Hall sensor.

The camera device (10) may include a sensing magnet (450). The sensing magnet (450) may be disposed in the first movable part (200). The sensing magnet (450) may be fixed to the first movable part (200). The sensing magnet (450) may be coupled to the first movable part (200). The sensing magnet (450) may be adhesively bonded to the first movable part (200). The sensing magnet (450) may be disposed on the bobbin (210). The sensing magnet (450) may be fixed to the bobbin (210). The sensing magnet (450) may be coupled to the bobbin (210). The sensing magnet (450) may be bonded to the bobbin (210) by an adhesive. The sensing magnet (450) may be formed in a smaller size than the AF magnet (410). The sensing magnet (450) may be formed in a smaller size than the OIS magnet (420). This may minimize the impact of the sensing magnet (450) on the drive (driving).

The sensing magnet (450) may be disposed opposite the calibration magnet (460). The sensing magnet (450) and the calibration magnet (460) may be disposed opposite each other on the first movable part (200). The sensing magnet (450) and the calibration magnet (460) may be disposed opposite each other on the bobbin (210).

The camera device (10) may include the calibration magnet (460). The calibration magnet (460) may be compensation magnet. The calibration magnet (460) may be disposed in the first movable part (200). The compensation magnet (460) may be fixed to the first movable part (200). The calibration magnet (460) may be coupled to the first movable part (200). The calibration magnet (460) may be bonded to the first movable part (200) with an adhesive. The calibration magnet (460) may be disposed on the bobbin (210). The calibration magnet (460) may be secured to the bobbin (210). The calibration magnet (460) may be coupled to the bobbin (210). The calibration magnet (460) may be bonded to the bobbin (210) by an adhesive. The calibration magnet (460) may be formed in a smaller size than the AF magnet (410). The calibration magnet (460) may be formed at a smaller size than the OIS magnet (420). In this way, the impact of the calibration magnet (460) on the drive may be minimized. Furthermore, the compensation magnet (460) may be disposed opposite the sensing magnet (450) to form the magnetic force equilibrium with the sensing magnet (450). This may inhibit any tilt that may be caused by the sensing magnet (450).

The camera device (10) may include a third substrate (470). The third substrate (470) may be a substrate. The third substrate (470) may be a printed circuit board (PCB). The third substrate (470) may be a flexible substrate. The third substrate (470) may be an FPCB. The third substrate (470) may be coupled to the first substrate (110). The third substrate (470) may be connected to the first substrate (110). The third substrate (470) may be electrically connected to the first substrate (110). The third substrate (470) may be soldered to the first substrate (110). The third substrate (470) may be disposed in the housing (130). The third substrate (470) may be secured to the housing (130). The third substrate (470) may be coupled to the housing (130). The housing (130) may include a groove or hole shaped to correspond with the third substrate (470). The third substrate (470) may be disposed in the groove or hole in the housing (130). The third substrate (470) may be connected to terminal of the connecting substrate (600) after bending. In a direction perpendicular to the optical axis direction, a portion of the third substrate (470) may be disposed between the connecting substrate (600) and the wing part (131) of the housing (130). The third substrate (470) may be disposed in a groove (**131*a*) of the wing part (131) of the housing (130). The third substrate (470) may include a first terminal (471) in connection with the connecting substrate (600). The first terminal (471) may be solderably coupled to the connecting substrate (600). The third substrate (470) may include a second terminal (472) in connection with the upper elastic member (710). The second terminal (472) may be solderably coupled to the upper elastic member (710**).

The third substrate (370) may include a first portion (473) on which the driver IC (480) is disposed. The third substrate (370) may include a second portion (474) that is coupled to the terminal part (630) of the connecting substrate (600). The third substrate (370) may include a third portion (475) connecting the first portion (473) and the second portion (474). The first portion (473) of the third substrate (370) may be disposed inwardly of the second portion (474).

The camera device (10) may include a driver IC (480). The driver IC (480) may be an AF driver IC. The driver IC (480) may be electrically coupled to the AF coil (430). The driver IC (480) may apply a current to the AF coil (430) to perform the AF driving. The driver IC (480) may apply a power to the AF coil (430). The driver IC (480) may apply a current to the AF coil (430). The driver IC (480) may apply a voltage to the AF coil (430). The driver IC (480) may be disposed on the third substrate (470). The driver IC (480) may be disposed in a position corresponding to the sensing magnet (450). The driver IC (480) may be disposed facing the sensing magnet (450). The driver IC (480) may be disposed adjacent to the sensing magnet (450). The driver IC (480) may include a sensor. The sensor may include a Hall IC. The sensor may be disposed at a location corresponding to the sensing magnet (450). The sensor may be disposed facing the sensing magnet (450). The sensor may be disposed adjacent to the sensing magnet (450). The sensor may detect the sensing magnet (450). The sensor may detect a magnetic force of the sensing magnet (450). The sensor may detect a position of the first movable part (200). The sensor may detect a movement of the first movable part (200). The sensed value detected by the sensor may be used for feedback to the autofocus driving. The sensor may be disposed within the driver IC (480). The sensor may be embedded in the driver IC (480). The sensor may be included in the driver IC (480). The sensor may be a component of the driver IC (480). The sensor may be disposed on the third substrate (470).

The camera device (10) may include a gyro sensor (490). The gyro sensor (490) may be disposed on the first substrate (110). The gyro sensor (490) may detect a shaking of the camera device (10). The gyro sensor (490) may sense an angular velocity or linear velocity caused by the shaking of the camera device (10). The gyro sensor (490) may be electrically coupled to the driver IC (495). The shaking of the camera device (10) detected by the gyro sensor (490) may be used to drive the image stabilization (OIS).

The camera device (10) may include a driver IC (495). The driver IC (495) may be an OIS driver IC. The driver IC (495) may be electrically coupled to the OIS coil (440). The driver IC (495) may apply a current to the OIS coil (440) to perform the OIS driving. The driver IC (495) may apply a power to the OIS coil (440). The driver IC (495) may apply a current to the OIS coil (440). The driver IC (495) may apply a voltage to the OIS coil (440). The driver IC (495) may be disposed on the second substrate (310).

The camera device (10) may include a connecting member. The connecting member may be an interposer. The connecting member may support movement of the second movable part (300).

The connecting member may moveably support the second movable part (300). The connecting member may connect the second movable part (300) and the fixed part (100). The connecting member may connect the first substrate (110) and the second substrate (310). The connecting member may electrically connect the first substrate (110) and the second substrate (310). The connecting member may connect the first substrate (110) and the second movable part (300). The connecting member may guide the movement of the second movable part (300). The connecting member may guide the second movable part (300) to move in a direction perpendicular to the optical axis direction. The connecting member may guide the second movable part (300) to rotate about the optical axis. The connecting member may limit the movement of the second movable part (300) in the direction of the optical axis.

The connecting member may include a connecting substrate (600). The connecting member may include an elastic member connecting the fixed part (100) and the second movable part (300). The connecting member may include a leaf spring. The connecting member may include a wire (800. The connecting member may include a ball disposed between the fixed part (100) and the second movable part (300). The connecting member may include an electrically conductive member. The connecting member may include an electrically conductive tape. The connecting member may include an EMI tape.

The camera device (10) may include a connecting substrate (600). The connecting substrate (600) may be a connecting part. The connecting substrate (600) may be a connecting member. The connecting substrate (600) may be a flexible substrate. The connecting substrate (600) may be a flexible substrate. The connecting substrate (600) may be a flexible printed circuit board. The connecting substrate (600) may be a flexible printed circuit board (FPCB). The connecting substrate (600) may be flexible in at least a portion. The second substrate (310) and the connecting substrate (600) may be integrally formed. The connecting substrate (600) may support the second movable part (300). The connecting substrate (600) may support the movement of the second movable part (300). The connecting substrate (600) may moveably support the second movable part (300). The connecting substrate (600) may connect the second movable part (300) and the fixed part (100). The connecting substrate (600) may connect the first substrate (110) and the second substrate (310). The connecting substrate (600) may electrically connect the first substrate (110) and the second substrate (310). The connecting substrate (600) may guide the movement of the second movable part (300). The connecting substrate (600) may guide the second movable part (300) to move in a direction perpendicular to the optical axis direction. The connecting substrate (600) may guide the second movable part (300) to rotate about the optical axis. The connecting substrate (600) may limit the movement of the second movable part (300) in the direction of the optical axis. A portion of the connecting substrate (600) may be coupled to the base (120). The connecting substrate (600) may moveably support the image sensor (330). The connecting substrate (600) may be disposed within the cover member (140).

The connecting substrate (600) may include two connecting substrates (600) spaced apart from each other and formed symmetrically. The two connecting substrates (600) may be disposed on either side of the second substrate (310). The connecting substrate (600) may be formed to connect the first substrate (110) and the second substrate (310) by bending a total of six times. The connecting substrate (600) may include a first region that is connected to the second substrate (310) and bends in the optical axis direction. The first region may be connected to the second substrate (310) and may be bent in the optical axis direction. The first region may be connected to the second substrate (310) and may extend in the optical axis direction. The first region may be connected to the second substrate (310) and may extend in a bend in the optical axis direction. The connecting substrate (600) may include a second region extending from the first region. The connecting substrate (600) may include a third region bending perpendicular to the optical axis from the second region. The third region may be bent in a direction perpendicular to the optical axis in the second region. The third region may extend in a direction perpendicular to the optical axis from the second region. The third region may extend perpendicularly to the optical axis from the second region. The connecting substrate (600) may include a connecting part (610) including the first region. The connecting substrate (600) may include an extension part (620) that includes the second region and the third region. The connecting substrate (600) may include a connecting part (610) that connects to the second substrate (310). The connecting substrate (600) may include an extension part (620) extending from the connecting part (610). The connecting substrate (600) may include a terminal part (630) that is connected to the extension part (620) and includes terminals.

The connecting substrate (600) may include a connecting part (610). The connecting part (610) may be connected to the second movable part (300). The connecting part (610) may be coupled to the second movable part (300). The connecting part (610) may be secured to the second movable part (300). The connecting part (610) may be connected to the second substrate (310). The connecting part (610) may be coupled to the second substrate (310). The connecting part (610) may be secured to the second substrate (310). The connecting part (610) may include a first bending region that is bent in the optical axis direction. The connecting part (610) may include a first region that is bent in the optical axis direction relative to the second substrate (310) and a second region that extends from the first region and is bent in a direction perpendicular to the optical axis direction. The connecting part (610) may be a first connecting substrate. The connecting part (610) may be solderably connected to the image sensor (330). The connecting part (610) of the connecting substrate (600) may be disposed on an inner side of the base (120) than an outer side of the base (120). The outer surface of the base (120) may be disposed in a position corresponding to the inner surface of the side plate (142) of the cover member (140). The connecting part (610) of the connecting substrate (600) may be disposed on an inner side of the inner surface of the side plate (142) of the cover member (140). The connecting part (610) of the connecting substrate (600) may be spaced apart from the inner surface of the side plate (142) of the cover member (140). The connecting part (610) of the connecting substrate (600) may be spaced apart from the side plate (142) of the cover member (140) by more than a stroke space in a direction perpendicular to the optical axis direction. The terminal part (630) of the connecting substrate (600) and the connecting part (610) may be spaced apart from the side plate (142) of the cover member (140) by a groove (122) of the base (120). The groove (122) of the base (120) may be recessed such that the connecting part (610) of the connecting substrate (600) is spaced apart from the side plate (142) of the cover member (140) by more than the stroke space of the connecting part (610). In the groove (122) of the base (120), a wing part (131) of the housing (130) may be disposed. Between the terminal part (630) of the connecting substrate (600) disposed in the groove (122) of the base (120) and the side plate (142) of the cover member (140), the wing part (131) of the housing (130) may be disposed.

The connecting part (610) and the extension part (620) may be connected via a bending part (615). The bending part (615) may have a bent shape. As shown in FIG. 16, in a modification, the connecting substrate (600) may include a hole (601) disposed in the bending part (615). Alternatively, the connecting substrate (600) may include a hole (601) disposed at a position that overlaps the bending part (615) in the optical axis direction. The hole (601) may be disposed alongside the bending part (615) and in a position that overlaps the bending part (615) in the optical axis direction. The hole (601) may be a circular hole. The hole (601) may be disposed in a central region of the bending part (615). The connecting part (610) may include a first portion disposed on one side relative to the hole (601) and a second portion disposed on the other side relative to the hole (601). As shown in FIG. 17, in a modification, the connecting substrate (600) may include a hole (602). The hole (602) may be disposed at a bending part (615) of the connecting substrate (600). The hole (602) may be disposed in an optical axis overlapping position with the bending part (615) of the connecting substrate (600). The hole (602) may extend from the bending part (615) to a position that overlaps the bending part (615) in the optical axis direction. The hole (602) of the connecting substrate (600) may have a width in the optical axis direction that is longer than a width in a direction perpendicular to the optical axis direction. The hole (602) may have an elliptical shape.

As shown in FIG. 18, the connecting substrate (600) may include a plurality of connecting substrates. The connecting substrate (600) may include four connecting substrates spaced apart from each other. The connecting substrate (600) may include first to fourth connecting substrates (600*a*-1, 600*a*-2, 600*a*-3, 600*a*-4). The first to fourth connecting substrate (600*a*-1, 600*a*-2, 600*a*-3, 600*a*-4) may be formed symmetrically with respect to each other about an optical axis. The first to fourth connecting substrate (600*a*-1, 600*a*-2, 600*a*-3, 600*a*-4) may be spaced apart from each other. The first to fourth connecting substrate (600*a*-1, 600*a*-2, 600*a*-3, 600*a*-4) may be electrically isolated from each other. The connecting substrate (600) may include an extension part (620). The extension part (620) may connect the connecting part (610) and the terminal part (630). The extension part (620) may extend from the connecting part (610). The extension part (620) may include a second bending region that bends in an optical axis direction and a perpendicular direction. The extension part (620) of the connecting substrate (600) may be spaced apart from the side plate (142) of the cover member (140). The extension part (620) of the connecting substrate (600) may be spaced apart from the side plate (142) of the cover member (140) in a direction perpendicular to the optical axis direction. The width of the extension part (620) may be smaller than the width of the terminal part (630). The extension part (620) may be a second connecting substrate. The second connecting substrate may connect the first connecting substrate and the third connecting substrate. The extension part (620) may be a portion that moves with movement of the second movable part (200). The extension part (620) may be a movable part. The extension part (620) may be spaced apart from the wing part (131) of the housing (130). The extension part (620) may move in a space between the inner surface of the side plate (142) of the cover member (140) in a direction perpendicular to the optical axis direction (see L in FIG. 52).

The connecting substrate (600) may include a terminal part (630). The terminal part (630) may be coupled to the fixed part (100). The terminal part (630) may be secured to the fixed part (100). The terminal part (630) may be coupled to the first substrate (110). The terminal portion 630 may be connected to the first substrate 110. The terminal part (630) may be soldered to the first substrate (110). The terminal part (630) may be fixed to the first substrate (110). The terminal part (630) may be coupled to the base (120). The terminal part (630) may be secured to the base (120). The terminal part (630) may be disposed in the optical axis direction. The terminal part (630) may include a terminal. The terminal may be coupled to the first substrate (110). A plurality of terminals may be disposed at the bottom of the terminal part (630) of the connecting substrate (600). The plurality of terminals of the connecting substrate (600) may be disposed inwardly of the wing part (131) of the housing (130). The terminal part (630) may be a third connecting substrate. The terminal part (630) may be solderably connected to the first substrate (110). The terminal part (630) of the connecting substrate (600) may be disposed in a first groove (122) of the base (120). The terminal part (630) of the connecting substrate (600) may be spaced apart from the side plate (142) of the cover member (140). This may allow for stroke space for the extension part (620) of the connecting substrate (600) within the cover member (140).

The terminal part (630) may include a first terminal (631). The first terminal (631) may be connected to the first substrate (110). The first terminal (631) may be electrically connected to the first substrate (110). The first terminal (631) may be coupled to the first substrate (110). The first terminal (631) may be coupled to the first substrate (110) by an electrically conductive member. The first terminal (631) may be solderably coupled to the first substrate (110). The terminal part (630) may include a second terminal (632). The second terminal (632) may be connected to the third substrate (470). The second terminal (632) may be electrically connected to the third substrate (470). The second terminal (632) may be coupled to the third substrate (470). The second terminal (632) may be coupled to the third substrate (470) by an electrically conductive member. The second terminal (632) may be solderably coupled to the third substrate (470). The second terminal (632) of the connecting substrate (600) may overlap the first terminal (631) of the connecting substrate (600) in an optical axial direction. The second terminal (632) may be disposed on top of the first terminal (631). The second terminal (632) may be spaced apart from the first terminal (631). The second terminal (632) may be disposed higher than the first terminal (631). The first terminal (631) of the connecting substrate (600) may include a plurality of first terminals (631). The second terminal (632) of the connecting substrate (600) may include a plurality of second terminals (632). In a direction perpendicular to the optical axis direction, the spacing between the plurality of second terminals (632) may be greater than the spacing between the plurality of first terminals (631). In a direction perpendicular to the optical axis direction, the spacing between the plurality of second terminals (632) may be different than the spacing between the plurality of first terminals (631). The second terminals (632) of the connecting substrate (600) may include four second terminals.

In the exemplary embodiment, the camera device (10) may include a flexible substrate. The flexible substrate may connect the fixed part (100) and the second movable part (300). The flexible substrate may include a connecting part (610) that connects to the second movable part (300), an extension part (620) that extends from the connecting part (610), and a terminal part (630) that is connected to the extension part (620) and includes terminals.

In the exemplary embodiment, the connecting substrate (600) may include a first portion coupled to the first substrate (110), a second portion coupled to the second substrate (310), and a third portion connecting the first and second portions. The third portion may be disposed at least partially parallel to the optical axis. The third portion may be formed with a length in the direction of the optical axis greater than its thickness. The second portion of the connecting substrate (600) may be disposed parallel to the second substrate (310) at least in part. The third portion of the connecting substrate (600) may be disposed perpendicular to the second portion in at least some portions. The third portion of the connecting substrate (600) may be bent rounded at portions corresponding to corners of the second substrate (310). The second substrate (310) may include a first and second side disposed opposite each other, and a third and fourth side disposed opposite each other. A second portion of the connecting substrate (600) may be coupled to the first and second sides of the second substrate (310). The first portion of the connecting substrate (600) may be coupled to portions of the first substrate (110) that correspond to the third and fourth sides of the second substrate (310).

The camera device (10) may include a shielding member. The shielding member may be disposed on one surface of the connecting substrate (600). The shielding member may be an electrically conductive tape. The shielding member may be an EMI tape. In a modification, the shielding member may be separate from the connecting substrate (600) and disposed separately.

The camera device (10) may include an electrically conductive tape. The connecting member may include an electrically conductive tape. The connecting substrate 600 may include an electrically conductive tape. However, the conductive tape may also be understood as a separate configuration from the connecting substrate (600). The conductive tape may include an electromagnetic interference (EMI) tape. The conductive tape may be a metal member. The conductive tape may be metallic. The conductive tape may be a metal layer. The conductive tape may be a metal film. The conductive tape may be formed of a metal. The conductive tape may be formed of an alloy. The conductive tape may be formed of a conductive material. The conductive tape may be adhesive. The electrically conductive tape may be separate from an electrically conductive layer (602) of the connecting substrate (600). The conductive tape may be formed of a different material than the conductive layer (602) of the connecting substrate (600).

The conductive tape may be disposed on the connecting substrate (600). The conductive tape may be bonded to the connecting substrate (600). The conductive tape may be secured to the connecting substrate (600). The conductive tape may be integrally formed with the connecting substrate (600). The conductive tape may be elastic. The conductive tape may be adhered to an outer surface of the connecting substrate (600). Alternatively, the conductive tape may be adhered to an inner surface of the connecting substrate (600).

In the optical axis direction, in at least some portions, the length of the conductive tape may be equal to the length of the extension part (620). The conductive tape may extend the same length in the optical axial direction as the extension part (620). The thickness of the conductive tape may be thinner than the thickness of the connecting substrate (600). The thickness of the conductive tape may be the same as the thickness of the connecting substrate (600). The conductive tape may be used in connection with ground (GND) for impedance matching and noise suppression. At least a portion of the conductive tape may be disposed on an extension part (620) of the connecting substrate (600). The extension part (620) may include a bending region that bends in an optical axis direction and a perpendicular direction. In this case, the conductive tape may be disposed in the bending region. The conductive tape may be disposed on an inner surface of the extension part (620). The conductive tape may be disposed on an outer surface of the extension part (620).

The conductive tape may be formed of a conductive material. The conductive tape may be electrically connected to the second substrate (310). The conductive tape may be electrically connected with the image sensor (330). The conductive tape may be electrically connected with the driver IC (495). The conductive tape may be connected with a terminal (631) of the connecting substrate (600). The conductive tape may be electrically connected to the terminal (631) of the connecting substrate (600). The conductive tape may be in direct contact with the terminal (631) of the connecting substrate (600). The conductive tape may be used as a ground (GND). The conductive tape may be connected to a ground terminal of the connecting substrate (600). The conductive tape may be electrically connected to the first substrate (110). In this case, the number of power connection patterns on the connecting substrate (600) may be reduced. The conductive tape may be electrically connected to a ground terminal of the image sensor (330).

The camera device (10) may include an elastic member (700). The elastic member (700) may be a support member. The elastic member (700) may connect the fixed part (100) and the first movable part (200). The elastic member (700) may elastically connect the fixed part (100) and the first movable part (200). The elastic member (700) may connect the bobbin (210) and the housing (130). The elastic member (700) may elastically connect the bobbin (210) and the housing (130). The elastic member (700) may moveably support the first movable part (200) relative to the fixed part (100). The elastic member (700) may deform upon movement of the first movable part (200). The elastic member (700) may resiliently return the first movable part (200) to its initial position when the movement of the first movable part (200) ends. The elastic member (700) may include a leaf spring. The elastic member (700) may include a spring. The elastic member (700) may be resilient at least in part. The elastic member (700) may provide a resilient force to the first movable part.

The camera device (10) may include an upper elastic member (710). The elastic member (700) may include an upper elastic member (710). The upper elastic member (710) may be a top spring. The upper elastic member (710) may be disposed on top of a lower elastic member (720). The upper elastic member (710) may connect the housing (130) and the bobbin (210). The upper elastic member (710) may be coupled to the housing (130). The upper elastic member (710) may be coupled to the bobbin (210).

The upper elastic member (710) may include a plurality of upper elastic units. The upper elastic member (710) may include two upper elastic units. The upper elastic member (710) may include first and second upper elastic units (710-1, 710-2). The first and second upper elastic units (710-1, 710-2) may be spaced apart from each other. The first and second upper elastic units (710-1, 710-2) may electrically connect the third substrate (470) and the AF coil (430). In a modification, the lower elastic member (720) may include a plurality of lower elastic units. The lower elastic member (720) may include two lower elastic units. The driver IC (480) may be disposed on an inner surface of the third substrate (470). The first upper elastic unit (710-1)

may be coupled to the inner surface of the third substrate (470). The second upper elastic unit (710-2) may be coupled to an outer surface opposite the inner surface of the third substrate (470). The upper elastic member (710) may include an outer part (711) that is coupled to the housing (130). The outer part (711) of the upper elastic member (710) may be coupled to an upper surface of the housing (130). The outer part (711) of the upper elastic member (710) may be disposed on an upper surface of the housing (130). The upper elastic member (710) may include an inner part (712) that is coupled with the bobbin (210). The inner part (712) of the upper elastic member (710) may be coupled to an upper portion of the bobbin (210). The inner part (712) of the upper elastic member (710) may be disposed on an upper surface of the bobbin (210). The upper elastic member (710) may include a connecting part (713) connecting the outer part (711) and the inner part (712). The connecting part (713) may be elastic.

The connecting part (713) of the upper elastic member (710) may include a first portion (713*a*) connecting the outer part (711) and the inner part (712). The connecting part (713) of the upper elastic member (710) may include a second portion (713*b*) extending from the first portion (713*a*) to a location corresponding to the groove (212) of the bobbin (210). The second portion (713*b*) of the connecting part (713) of the upper elastic member (710) may be disposed closer to the outer part (711) of the upper elastic member (710) than to the inner part (712) of the upper elastic member (710). The distance between the second portion (713*b*) and the outer part (711) may be shorter than the distance between the second portion (173*b*) and the inner part (712). In the exemplary embodiment, the second portion (713*b*) of the connecting part (713) of the upper elastic member (710) may be formed in a circular shape with a diameter larger at an end of the second portion (713*b*) than at another portion of the second portion (713*b*), as shown in FIG. 32(*a*). This may increase the contact area with a second damper (920), which may minimize the loss of the second damper (920). As a modification, the second portion (713*c*) of the connecting part (713) of the upper elastic member (710), as shown in FIG. 32(*b*), may be formed as a straight line, i.e., the round portion of the circular shape may be omitted compared to the present exemplary embodiment. In another modification, the second portion (713*d*) of the connecting part (713) of the upper elastic member (710), as shown in FIG. 32(*c*), may include a hole (713*e*) formed at an end of the circular shape. The hole (713*e*) may be formed in a circular shape. The circular shape of the second portion (713*d*) and the circular shape of the hole (713*e*) may be concentric. The hole (713*e*) in the second portion (713*d*) may increase the damper's anti-leakage effectiveness.

The upper elastic member (710) may include a coupling part (714). The coupling part (714) may be coupled to the wire (800). The coupling part (714) may extend from the outer part (711). The coupling part (714) may include a hole (714*a*). The upper elastic member (710) may include a hole (714*a*) through which the wire (800) is disposed. The upper elastic member (710) may include a hole (714*a*) through which the wire (800) passes. The upper elastic member (710) may include a terminal part (715). The terminal part (715) may be coupled to the third substrate (470). The terminal part (715) may be connected to a terminal of the third substrate (470). The terminal part (715) may be coupled to the second terminal (472) of the third substrate (470) via a conductive member.

The camera device (10) may include a lower elastic member (720). The elastic member (700) may include a lower elastic member (720). The lower elastic member (720) may be a lower spring. The lower elastic member (720) may be disposed below the upper elastic member (710). The lower elastic member (720) may connect the housing (130) and the bobbin (210). The lower elastic member (720) may be coupled to the housing (130). The lower elastic member (720) may be coupled to the bobbin (210).

The lower elastic member (720) may include an outer part that is coupled to the housing (130). The outer part of the lower elastic member (720) may be coupled to a lower surface of the housing (130). The outer part of the lower elastic member (720) may be disposed on a lower surface of the housing (130). The lower elastic member (720) may include an inner part that is coupled to the bobbin (210). The inner part of the lower elastic member (720) may be coupled to a lower surface of the bobbin (210). The inner part of the lower elastic member (720) may be disposed on a lower surface of the bobbin (210). The lower elastic member (720) may include a connecting part connecting the outer and inner parts. The connecting part may be elastic.

The camera device (10) may include a wire (800). The wire (800) may be a wire spring. The wire (800) may be an elastic member. The wire (800) may be a leaf spring, as an example of modification. The wire (800) may connect the fixed part (100) and the second movable part (300). The wire (800) may be resiliently connected to the fixed part (100) and the second movable part (300). The wire (800) may connect the housing (130) and the second substrate (310). The wire (800) may resiliently connect the housing (130) and the second substrate (310). The wire (800) may moveably support the second movable part (300). The wire (800) may moveably support the second movable part (300) relative to the fixed part (100). The wire (800) may support movement of the image sensor (330). The wire (800) may moveably support the image sensor (330). The wire (800) may be disposed in the optical axis direction. The wire (800) may support the movement or rotation of the second movable part (300) in a direction perpendicular to the optical axis direction. The wire (800) may connect the upper elastic member (710) and the coupling member (380). The wire (800) may electrically connect the upper elastic member (710) and the coupling member (380). The wire (800) may be solderably coupled to the upper elastic member (710). The wire (800) may be solderably coupled to the coupling member (380).

The wire (800) may include a first portion that is coupled to the upper elastic member (710). In this case, the first portion may be an upper end of the wire (800). However, the first portion may be spaced apart from the upper end of the wire (800). The wire (800) may include a second portion that is coupled with the coupling member (380). In this case, the second portion may be a lower end of the wire (800). However, the second portion may be spaced apart from the lower end of the wire (800).

The camera device (10) may include a first damper (910). The first damper (910) may be an OIS damper. The first damper (910) may inhibit oscillation when driving the OIS. The first damper (910) may be viscous. The first damper (910) may connect the housing (130) and the wire (800). The first damper (910) may be disposed between the housing (130) and the wire (800). The first damper (910) may be applied between the housing (130) and the wire (800). The first damper (910) may be in contact with the housing (130). The first damper (910) may contact a hole (134) in the housing (130). The first damper (910) may be in contact with the wire (800). At least a portion of the first damper (910) may be disposed in the hole (134) of the housing (130). At least a portion of the first damper (910) may be disposed within a dam (136) of the housing (130). The first damper (910) may be coupled to the housing (130) with a wire (800) that is a fixture.

The camera device (10) may include a second damper (920). The second damper (920) may be an AF damper. The second damper (920) may inhibit oscillation during AF operation. The second damper (920) may be viscous. The second damper (920) may connect the bobbin (210) and the upper elastic member (710). The second damper (920) may be connected to a connecting part (713) of the upper elastic member (710). The second damper (920) may connect the groove (212) of the bobbin (210) and the second portion (713*b*) of the connecting part (713) of the upper elastic member (710). The second damper (920) may be disposed closer to the outer part (711) than the inner part (712) of the upper elastic member (710). The second damper (920) may be disposed between the groove (212) of the bobbin (210) and the second portion (713*b*) of the connecting part (713) of the upper elastic member (710). The second damper (920) may be applied between the groove (212) of the bobbin (210) and the second portion (713*b*) of the connecting part (713) of the upper elastic member (710). The second damper (920) may contact the groove (212) of the bobbin (210). The second damper (920) may be in contact with the second portion (713*b*) of the connecting part (713) of the upper elastic member (710).

The camera device (10) may include a third damper (930). The third damper (930) may be an AF damper. The third damper (930) may inhibit oscillation during AF operation. The third damper (930) may be disposed in addition to the second damper (920). Alternatively, the third damper (930) may be disposed with the second damper (920) omitted, i.e., at least one of the second damper (920) and the third damper (930) may be disposed. The third damper (930) may be viscous. The third damper (930) may be disposed closer to the outer part (711) than the inner part (712) of the upper elastic member (710). The distance between the third damper (930) and the outer part (711) of the upper elastic member (710) may be shorter than the distance between the second damper (920) and the outer part (711) of the upper elastic member (710). The third damper (930) may be disposed between the second damper (920) and the outer part (711) of the upper elastic member (710).

The third damper (930) may connect the bobbin (210) and the upper elastic member (710). The third damper (930) may connect the protrusion (213) of the bobbin (210) and the upper elastic member (710). The third damper (930) may connect the bobbin (210) and the connecting part (713) of the upper elastic member (710). The third damper (930) may connect the bobbin (210) and the first portion (713*a*) of the upper elastic member (710). The third damper (930) may connect the protrusion (213) of the bobbin (210) and the first portion (713*a*) of the upper elastic member (710). The third damper (930) may be connected to a portion between the second portion (713*b*) and the outer part (711) of the first portion (713*a*) of the upper elastic member (710). The third damper (930) may be disposed between the protrusion (213) of the bobbin (210) and the first portion (713*a*) of the upper elastic member (710). The third damper (930) may be applied between the protrusion (213) of the bobbin (210) and the first portion (713*a*) of the upper elastic member (710). The third damper (930) may contact the protrusion (213) of the bobbin (210). The third damper (930) may be in contact with the first portion (713*a*) of the upper elastic member (710).

The camera device (10) may include a fourth damper (940). The fourth damper (940) may be an OIS damper. The fourth damper (940) may inhibit oscillation when driving the OIS. The fourth damper (940) may be disposed in addition to the first damper (910). Alternatively, the fourth damper (940) may be disposed with the first damper (910) omitted, i.e., at least one of the first damper (910) and the fourth damper (940) may be disposed. The fourth damper (940) may be viscous. The fourth damper (940) may connect the coupling member (380) and the base (120). The fourth damper (940) may be disposed between the coupling member (380) and the base (120). The fourth damper (940) may be applied between the coupling member (380) and the base (120). The fourth damper (940) may be in contact with the coupling member (380). The fourth damper (940) may be in contact with the base (120). At least a portion of the fourth damper (940) may be disposed within the groove (123) of the base (120). The fourth damper (940) may be connected to an extension part (383) of the coupling member (380). The fourth damper (940) may be in contact with a solder part. The fourth damper (940) may cover a portion of the solder part. The fourth damper (940) may contact the coupling part (380*a*) in addition to the extension part (383).

The first to fourth dampers (910, 920, 930, 940) are each independent configurations, and one or more of the first to fourth dampers (910, 920, 930, 940) may be omitted. The first to fourth dampers (910, 920, 930, 940) may be provided in any one or any combination of two or more.

Hereinafter, operation of the camera device according to an exemplary embodiment of the present invention will be described with reference to the drawings.

Figure 55:
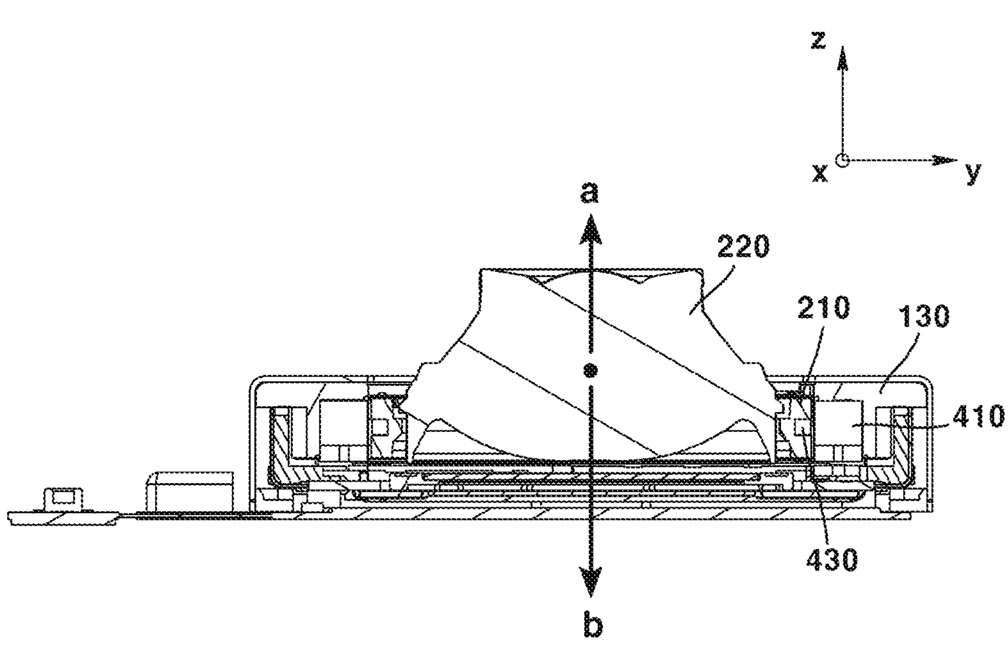
FIG. 55 is a diagram to illustrate the operation of an autofocus function of a camera device according to an exemplary embodiment.

FIG. 55 is a drawing to illustrate the operation of an autofocus function of a camera device according to an exemplary embodiment of the present invention.

When power is applied to the AF coil (430) of the camera device (10) according to this embodiment, an electromagnetic field is formed in the AF coil (430) such that the AF coil (430) can be moved in the optical axis direction (z-axis direction) through electromagnetic interaction with the AF magnet (410). In this case, the AF coil (430) may move in the optical axis direction along with the first movable part (200) including the lens (220). In this case, the lens (220) may be moved away from or closer to the image sensor (330) to adjust the focus of the subject. One or more of a current and a voltage may be applied to energize the AF coil (430). When a current in the first direction is applied to the AF coil (430) of the camera device (10) according to the present embodiment, the AF coil (430) may move in the upward direction of the optical axis direction (see a in FIG. 55) through electromagnetic interaction with the AF magnet (410). At this time, the AF coil (430) may move the lens (220) away from the image sensor (330) in the upward direction of the optical axis direction. When a current in a second direction opposite to the first direction is applied to the AF coil (430) of the camera device (10) according to the present embodiment, the AF coil (430) may move in a downward direction of the optical axis direction (see b in FIG. 55) through electromagnetic interaction with the AF magnet (410). At this time, the AF coil (430) may move the lens (220) in the downward direction of the optical axis to bring it closer to the image sensor (330).

Figure 56:
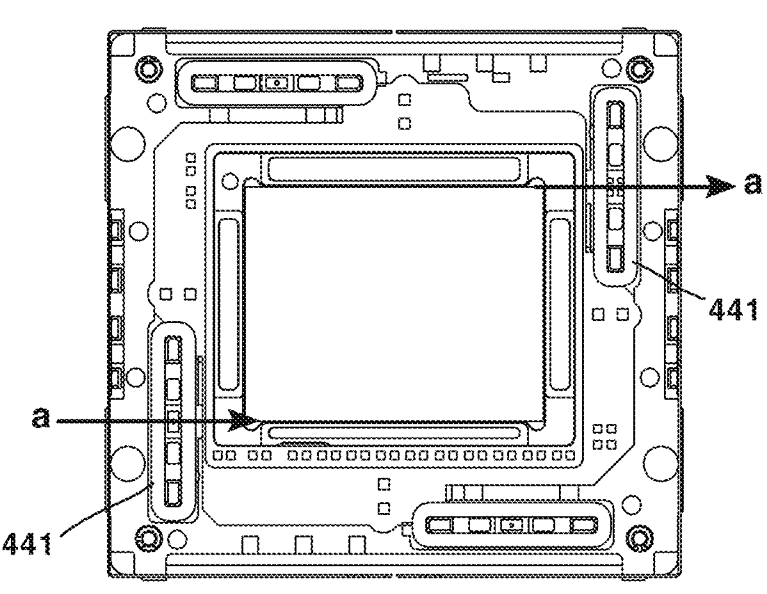
FIGS. 56 to 58 are drawings for illustrating operation of an image stabilization function of a camera device according to an embodiment. More specifically.
Figure 56:
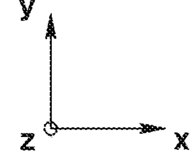
Figure 57:
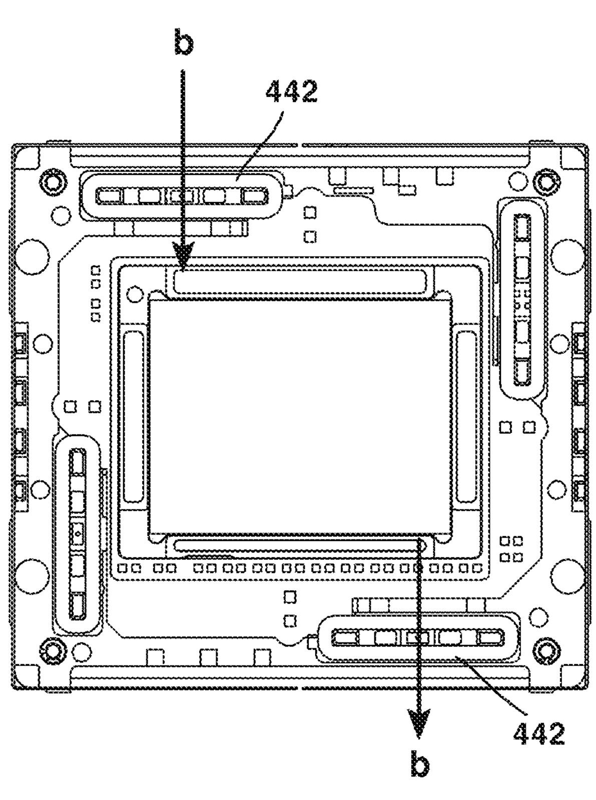
Figure 58:
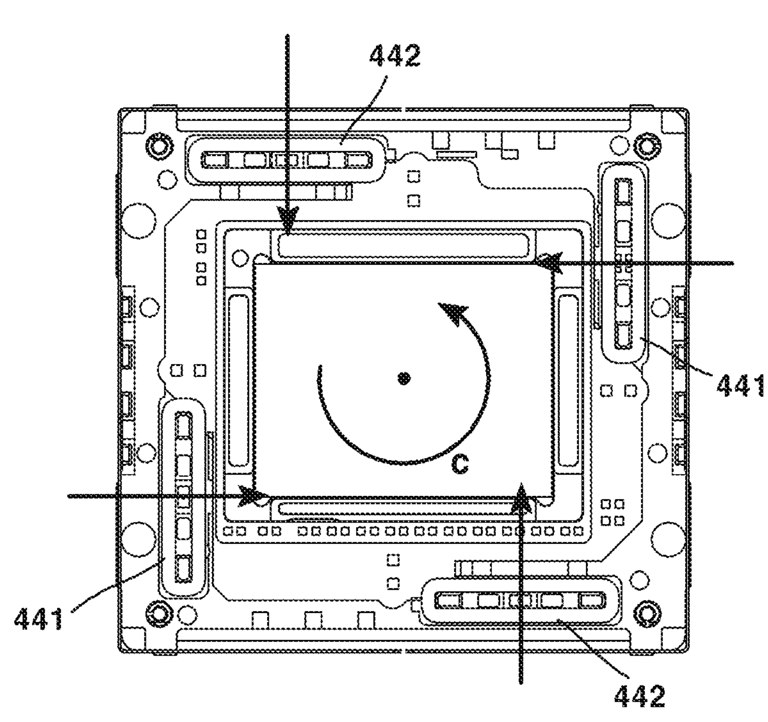
Figure 58:
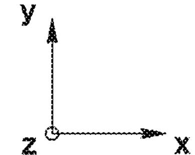

FIGS. 56 to 58 are drawings for illustrating the operation of the image stabilization function of the camera device according to an exemplary embodiment of the present invention.

When power is applied to the OIS coil (440) of the camera device (10) according to the present embodiment, an electromagnetic field is formed in the OIS coil (440) such that the OIS coil (440) can move in a direction perpendicular to the optical axis direction through electromagnetic interaction with the OIS magnet (420). Furthermore, the OIS coil (440) can be rotated about the optical axis through electromagnetic interaction with the OIS magnet (420). In this case, the OIS coil (440) may move or rotate with the second movable part (300), which includes the image sensor (330). In this embodiment, the OIS coil (440) may move the image sensor (330) to compensate for any shaking of the camera device (10) that is detected by the gyro sensor (490).

FIG. 56 is a diagram to illustrate a drive (driving) for shifting the image sensor of the camera device according to an exemplary embodiment of the present invention along the x-axis.

When a current in a first direction is applied to the first coil (441) of the camera device (10) according to the present embodiment, the first coil (441) may be moved in one of the first directions (x-axis direction) perpendicular to the optical axis direction (see a in FIG. 56) through electromagnetic interaction with the OIS magnet (420). In this case, the first coil (441) may move the image sensor (330) in one of the first directions perpendicular to the optical axis direction. Conversely, when a current in a second direction opposite to the first direction is applied to the first coil (441), the first coil (441) may move in the other direction of the first direction perpendicular to the optical axis direction (x-axis direction) through electromagnetic interaction with the OIS magnet (420). In this case, the first coil (441) may move the image sensor (330) in the other of the first directions perpendicular to the optical axis direction.

FIG. 57 is a diagram to illustrate a drive for shifting an image sensor of a camera device along a y-axis, according to an exemplary embodiment of the present invention.

When a current in the first direction is applied to the second coil (442) of the camera device (10) according to the present embodiment, the second coil (442) may move in one of the second directions perpendicular to the optical axis direction (y-axis direction) (see b in FIG. 57) through electromagnetic interaction with the OIS magnet (420). In this case, the second coil (442) can move the image sensor (330) in one of the second directions perpendicular to the optical axis direction. Conversely, when current is applied to the second coil (442) in a second direction opposite to the first direction, the second coil (442) may move in the other of the second directions perpendicular to the optical axis direction (y-axis direction) through electromagnetic interaction with the OIS magnet (420). In this case, the second coil (442) may move the image sensor (330) in the other of the second directions perpendicular to the optical axis direction.

FIG. 58 is a diagram to illustrate a drive for rolling the image sensor of the camera device according to an exemplary embodiment of the present invention about the z-axis.

When a current in a first direction is applied to the first coil (441) and the second coil (442) of the camera device (10) according to the present embodiment, the first coil (441) and the second coil (442) may rotate in a first direction about the optical axis through electromagnetic interaction with the OIS magnet (420) (see c in FIG. 58). In this case, the first coil (441) and the second coil (442) can rotate the image sensor (330) in a unidirectional (one) direction about the optical axis. In this case, the unidirectional direction may be counterclockwise. Conversely, when a current in a second direction opposite to the first direction is applied to the first coil (441) and the second coil (442), the first coil (441) and the second coil (442) may rotate in the other direction about the optical axis through electromagnetic interaction with the OIS magnet (420). In this case, the first coil (441) and the second coil (442) can rotate the image sensor (330) in the other direction about the optical axis. In this case, the other direction may be clockwise.

Hereinafter, an optical apparatus according to an exemplary embodiment of the present invention will be described with reference to the drawings.

Figure 59:
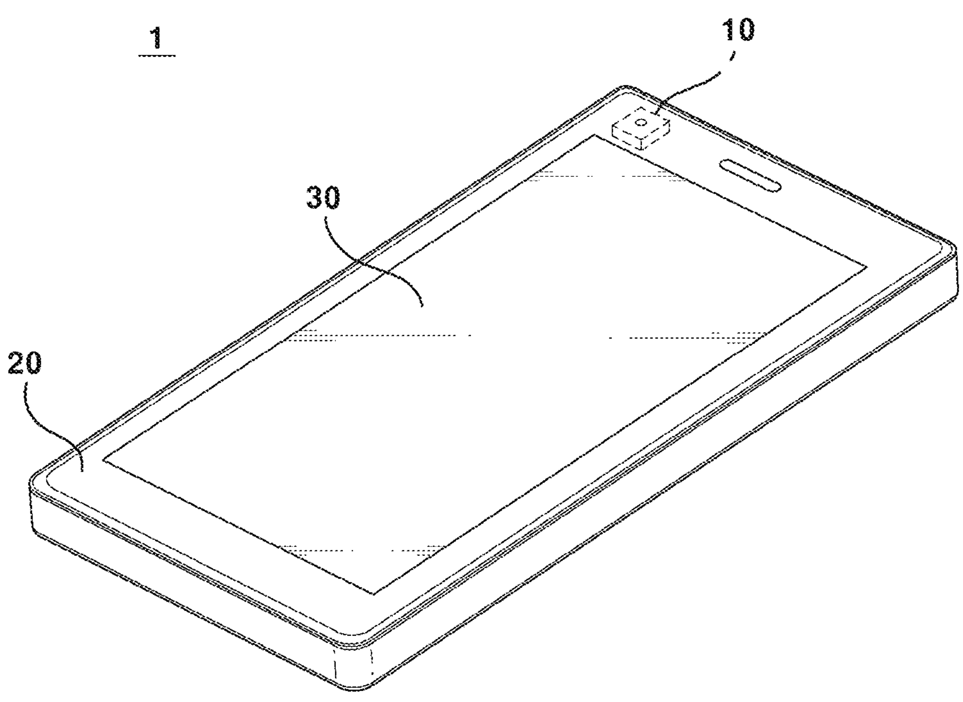
FIG. 59 is a perspective view of an optical apparatus according to an exemplary embodiment.
Figure 60:
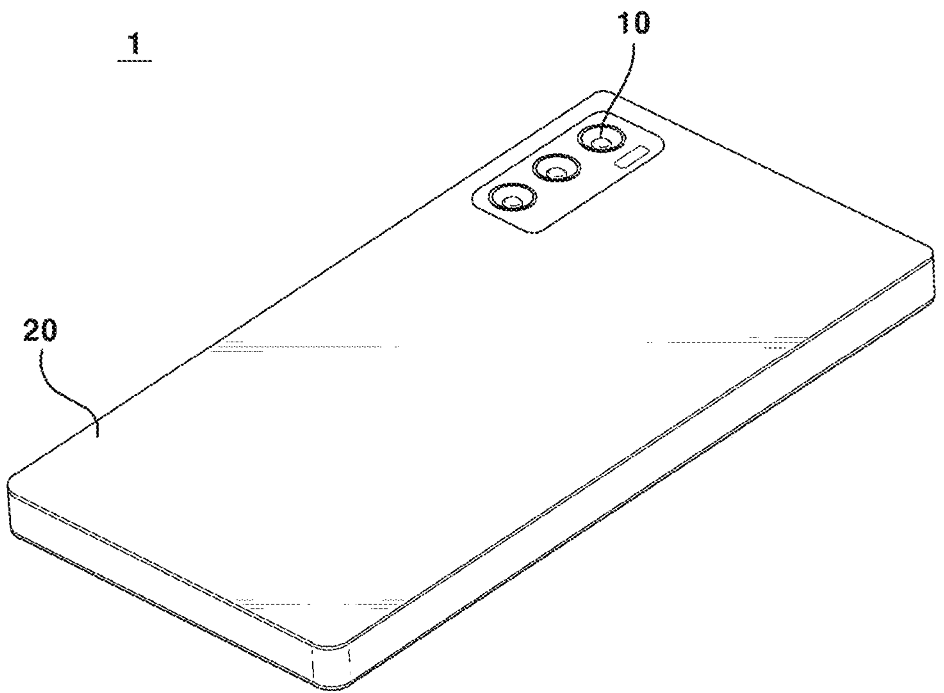
FIG. 60 is a perspective view of an optical apparatus according to an exemplary embodiment from a different orientation than FIG. 59.

FIG. 59 is a perspective view of an optical device according to an exemplary embodiment of the present invention, and FIG. 60 is a perspective view of an optical apparatus according to an exemplary embodiment of the present invention from an orientation different from FIG. 59.

The optical apparatus (1) may include one or more of the following: a mobile phone, a cellular phone, a handheld device, a mobile terminal, a smart phone, a smart pad, a handheld smart device, a digital camera, a laptop computer, a digital broadcasting device, a personal digital assistant (PDA), a portable multimedia player (PMP), and a navigation device.

The optical apparatus (1) may comprise any device for taking images or photographs. The optical apparatus (1) may include a body (20). The optical apparatus (1) may include a camera device (10). The camera device (10) may be disposed on the body (20). The camera device (10) may photograph a subject. The optical apparatus (1) may include a display (30). The display (30) may be disposed on the body (20). The display (30) may output at least one of a video and an image taken by the camera device (10). The display (30) may be disposed on a first surface of the body (20). The camera device (10) may be disposed on one or more of a first surface of the body (20) and a second surface opposite the first surface.

While embodiments of the present invention have been described with reference to the accompanying drawings, one having ordinary skill in the art to which the present invention belongs will understand that the invention may be practiced in other specific forms without altering its technical ideas or essential features. It should therefore be understood that the embodiments described above are exemplary and non-limiting in all respects.

The invention claimed is:

1. A camera device, comprising:

a base;

a cover member disposed on the base;

a housing disposed between the base and the cover member;

an image sensor disposed in the base;

a connecting substrate configured to movably support the image sensor; and a spacing member disposed between the connecting substrate and a side plate of the cover member in a direction perpendicular to an optical axis direction, wherein the spacing member is fixed to the side plate of the cover member wherein the spacing member is a wing part extending from the housing, and wherein, in the direction perpendicular to the optical axis direction, a distance between the connecting substrate and the side plate of the cover member corresponds to a thickness of the wing part of the housing.

2. The camera device of claim 1, wherein the spacing member is separate from the housing.

3. A camera device, comprising:

a base;

a cover member disposed on the base;

a housing disposed between the base and the cover member;

an image sensor disposed in the base; and a connecting substrate configured to movably support the image sensor, wherein the housing comprises a wing part disposed between the connecting substrate and a side plate of the cover member, and wherein the wing part of the housing is fixed to the side plate of the cover member, wherein the spacing member is a wing part extending from the housing, and wherein, in the direction perpendicular to the optical axis direction, a distance between the connecting substrate and the side plate of the cover member corresponds to a thickness of the wing part of the housing.

4. The camera device of claim 3, wherein the housing is coupled with the base and the cover member, and wherein, in a direction perpendicular to an optical axis direction, a distance between the connecting substrate and the side plate of the cover member is same as a thickness of the wing part of the housing.

5. The camera device of claim 3, wherein the image sensor is configured to move in a direction perpendicular to an optical axis direction, and wherein the base, the connecting substrate, the wing part of the housing, and the side plate of the cover member are sequentially disposed in the direction perpendicular to the optical axis direction.

6. The camera device of claim 5, wherein a distance between the connecting substrate and the side plate of the cover member in the direction perpendicular to the optical axis direction is greater than or equal to a thickness of the wing part of the housing.

7. The camera device of claim 3, comprising:

a first substrate; and a second substrate spaced apart from the first substrate and electrically connected with the image sensor, wherein the connecting substrate comprises a connecting part connected with the second substrate, a terminal part coupled with the first substrate, and an extension part connecting the connecting part and the terminal part.

8. The camera device of claim 7, wherein the terminal part of the connecting substrate is disposed in an optical axis direction, and wherein a plurality of terminals is disposed on a lower end of the terminal part of the connecting substrate.

9. The camera device of claim 8, wherein the plurality of terminals of the connecting substrate is disposed further inward than the wing part of the housing.

10. The camera device of claim 7, wherein the base comprises a protrusion upwardly protruding, wherein the terminal part of the connecting substrate is fixed to the protrusion by an adhesive member, and wherein at least a portion of the terminal part of the connecting substrate is disposed between the protrusion of the base and the wing part of the housing.

11. The camera device of claim 7, wherein the extension part of the connecting substrate is spaced apart from the side plate of the cover member.

12. The camera device of claim 3, wherein the housing comprises first and second lateral surfaces disposed opposite each other, and third and fourth lateral surfaces disposed opposite each other, wherein the wing part is formed on each of the first and second lateral surfaces of the housing, and wherein the housing comprises a protrusion protruding outwardly from each of the third and fourth lateral surfaces of the housing and contacted with the cover member.

13. The camera device of claim 3, wherein the housing is fixed to the base or the cover member.

14. The camera device of claim 3, comprising:

a bobbin disposed in the housing; and a lens coupled with the bobbin, wherein the bobbin comprises a protrusion protruding from an inner peripheral surface of the bobbin, wherein the lens comprises a groove formed on an outer peripheral surface of the lens, wherein the groove of the lens comprises a first groove extending in an optical axis direction from a lower surface of the lens, and a second groove extending from the first groove in a direction perpendicular to the optical axis direction and spaced apart from a lower end of the first groove, and wherein at least a portion of the protrusion of the bobbin is disposed on the second groove of the lens.

15. The camera device of claim 14, comprising:

a first magnet and a first coil configured to move the image sensor with respect to the base in the direction perpendicular to the optical axis direction; and a second magnet and a second coil configured to move the lens in the optical axis direction.

16. The camera device of claim 14, comprising:

a sensing magnet disposed on the bobbin;

a third substrate disposed on the housing; and a sensor disposed on the third substrate and configured to detect the sensing magnet, wherein, in the direction perpendicular to the optical axis direction, a portion of the third substrate is disposed between the connecting substrate and the wing part of the housing.

17. An optical apparatus comprising:

a body;

the camera device of claim 3 disposed on the body; and a display disposed on the body and configured to output a video or an image taken by the camera device.

18. A camera device, comprising:

a first substrate;

a cover member disposed on the first substrate and comprising an upper plate and a side plate;

a housing disposed in the cover member;

an image sensor movably disposed in the housing; and a connecting substrate electrically connecting the image sensor and the first substrate, wherein the housing comprises a wing part disposed between the connecting substrate and a side plate of the cover member, wherein the connecting substrate comprises a terminal part coupled with the first substrate, wherein the base comprises a protrusion upwardly protruding, wherein the terminal part of the connecting substrate is fixed to the protrusion by an adhesive member, and wherein at least a portion of the terminal part of the connecting substrate is disposed between the protrusion of the base and the wing part of the housing wherein the spacing member is a wing part extending from the housing, and wherein, in the direction perpendicular to the optical axis direction, a distance between the connecting substrate and the side plate of the cover member corresponds to a thickness of the wing part of the housing.

19. The camera device of claim 18, wherein the image sensor is configured to move in a direction perpendicular to an optical axis direction, and wherein the connecting substrate, the wing part of the housing and the side plate of the cover member are sequentially disposed in the direction perpendicular to the optical axis direction.

* * * * *